(12) United States Patent
Zhou et al.

(10) Patent No.: US 12,089,220 B2
(45) Date of Patent: Sep. 10, 2024

(54) RESOURCE MANAGEMENT FOR WIRELESS COMMUNICATIONS USING A POWER SAVING STATE

(71) Applicant: Comcast Cable Communications, LLC, Philadelphia, PA (US)

(72) Inventors: Hua Zhou, Herndon, VA (US); Esmael Dinan, Herndon, VA (US); Hyoungsuk Jeon, Oakton, VA (US); Ali Cirik, Herndon, VA (US); Alireza Babaei, Fairfax, VA (US); Kyungmin Park, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/516,970

(22) Filed: Jul. 19, 2019

(65) Prior Publication Data

US 2020/0029316 A1 Jan. 23, 2020

Related U.S. Application Data

(60) Provisional application No. 62/700,470, filed on Jul. 19, 2018.

(51) Int. Cl.
*H04W 72/23* (2023.01)
*H04W 74/0833* (2024.01)

(52) U.S. Cl.
CPC ....... *H04W 72/23* (2023.01); *H04W 74/0833* (2013.01)

(58) Field of Classification Search
CPC .............. H04W 72/042; H04W 74/0833
See application file for complete search history.

(56) References Cited

U.S. PATENT DOCUMENTS

| | | |
|---|---|---|
| 9,674,727 B2 | 6/2017 | Damnjanovic et al. |
| 2011/0243278 A1 | 10/2011 | Cheng |
| 2013/0195025 A1 | 8/2013 | Chatterjee et al. |
| 2014/0044083 A1 | 2/2014 | Kim et al. |
| 2015/0189574 A1 | 7/2015 | Ng et al. |
| 2015/0327107 A1 | 11/2015 | Kim et al. |
| 2015/0381255 A1 | 12/2015 | Kuo |

(Continued)

FOREIGN PATENT DOCUMENTS

| | | |
|---|---|---|
| EP | 3525516 A1 | 8/2019 |
| WO | 2017136706 A1 | 8/2017 |

(Continued)

OTHER PUBLICATIONS

R1-1709016 3GPP TSG RAN WG1 Meeting #89, Hangzhou, China, May 15-19, 2017, Source: InterDigital Inc., Title: Control Channels Monitoring with Multiple CORESETs.

(Continued)

*Primary Examiner* — Alpus Hsu
*Assistant Examiner* — Camquyen Thai
(74) *Attorney, Agent, or Firm* — Banner & Witcoff, Ltd.

(57) ABSTRACT

Wireless communications using a power saving state are described. A wireless device and/or a base station may provide improved resource management such as by monitoring a reduced resource set in a power saving state. The wireless device may monitor an initial resource set in a non-power saving state and a reduced resource set in a power saving state.

21 Claims, 39 Drawing Sheets

(56) References Cited

U.S. PATENT DOCUMENTS

| | | | |
|---|---|---|---|
| 2016/0302092 | A1* | 10/2016 | Sartori .................. H04L 5/0064 |
| 2016/0373233 | A1 | 12/2016 | Pelletier et al. |
| 2017/0264417 | A1* | 9/2017 | Eriksson .............. H04L 5/0096 |
| 2018/0020503 | A1 | 1/2018 | Deenoo et al. |
| 2018/0034525 | A1 | 2/2018 | Park et al. |
| 2018/0049168 | A1* | 2/2018 | Ryu ...................... H04L 5/0094 |
| 2018/0115357 | A1 | 4/2018 | Park et al. |
| 2018/0124687 | A1 | 5/2018 | Park et al. |
| 2018/0124822 | A1 | 5/2018 | Wang et al. |
| 2018/0132266 | A1 | 5/2018 | Chen et al. |
| 2018/0139787 | A1 | 5/2018 | Islam et al. |
| 2018/0145797 | A1* | 5/2018 | Yeo ....................... H04L 1/1896 |
| 2018/0176937 | A1 | 6/2018 | Chen et al. |
| 2018/0183551 | A1 | 6/2018 | Chou et al. |
| 2018/0192405 | A1* | 7/2018 | Gong ................... H04W 88/025 |
| 2018/0205516 | A1 | 7/2018 | Jung et al. |
| 2018/0227805 | A1 | 8/2018 | Jang et al. |
| 2018/0242307 | A1 | 8/2018 | Chen et al. |
| 2018/0249460 | A1 | 8/2018 | Seo et al. |
| 2018/0270713 | A1 | 9/2018 | Park et al. |
| 2018/0278383 | A1 | 9/2018 | Kim et al. |
| 2018/0332505 | A1* | 11/2018 | Kim ..................... H04L 5/0053 |
| 2018/0367386 | A1* | 12/2018 | Liao ..................... H04L 5/0053 |
| 2019/0037577 | A1 | 1/2019 | Sun et al. |
| 2019/0104477 | A1 | 4/2019 | MolavianJazi et al. |
| 2019/0110217 | A1* | 4/2019 | Nam .................. H04W 72/0406 |
| 2019/0132882 | A1 | 5/2019 | Li et al. |
| 2019/0141677 | A1 | 5/2019 | Harrison et al. |
| 2019/0191360 | A1* | 6/2019 | Sun ....................... H04W 48/12 |
| 2019/0223097 | A1* | 7/2019 | Yi ...................... H04W 52/0216 |
| 2019/0261394 | A1* | 8/2019 | Li ........................... H04W 72/23 |
| 2019/0305867 | A1* | 10/2019 | Tseng .................... H04W 24/10 |
| 2019/0313437 | A1* | 10/2019 | Jung .................... H04L 5/0042 |
| 2019/0342898 | A1* | 11/2019 | Nam .................. H04W 72/0446 |
| 2019/0349806 | A1* | 11/2019 | Nam ..................... H04L 5/0091 |

FOREIGN PATENT DOCUMENTS

| | | | |
|---|---|---|---|
| WO | 2017161590 | A1 | 9/2017 |
| WO | 2017196243 | A1 | 11/2017 |
| WO | 2018029382 | A1 | 2/2018 |
| WO | 2018084544 | A1 | 5/2018 |
| WO | 2018144155 | A1 | 8/2018 |

OTHER PUBLICATIONS

R1-1714117 3GPP TSG RAN WG1 Meeting #90, Prague, Czech Republic, Aug. 21-25, 2017, Source: InterDigital Inc., Title: Remaining details of BWP.
R2-1802001 3GPP TSG RAN WG2 Meeting #101, Athens, Greece, Feb. 26-Mar. 2, 2018, Source: vivo, Title: Restart Scell inactive timer due to configuration grant.
R1-142925 3GPP TSG RAN WG1 Meeting ™78, Dresden, Germany, Aug. 18-22, 2014, Source: Fujitsu, Title: Discussion of on/off transitions and related procedures.
Oct. 18, 2019-European Extended Search Report-EP 19187310.8.
R1-1808612 3GPP TSG RAN WG1 Meeting #94, Gothenburg, Sweden, Aug. 20-24, 2018, Source: Apple Inc., Title: On DL Signals and Channels for NR-U.
R1-1808683 3GPP TSG RAN WG1 Meeting #94, Gothenburg, Sweden, Aug. 20-24, 2018, Source: Intel Corporation, Title: Enhancements to NR DL signals and channels for unlicensed operation.
R1-1809477 3GPP TSG RAN WG1 Meeting #94, Gothenburg, Sweden, Aug. 20-24, 2018, Source: Qualcomm Incorporated, Title: DL signals and channels for NR-U.
R1-1810154 3GPP TSG RAN WG1 Meeting #94bis, Chengdu, China, Oct. 8-12, 2018, Source: Huawei, HiSilicon, Title: Power consumption reduction based on time/frequency/antenna adaptation.
R1-1810338 3GPP TSG RAN WG1 Meeting #94bis, Chengdu, China, Oct. 8-12, 2018, Source: ZTE, Title: Consideration on UE adaptation to the traffic and UE power consumption characteristics.
R1-1810413 3GPP TSG RAN WG1 Meeting #94bis, Chengdu, China, Oct. 8-12, 2018, Source: vivo, Title: Techniques on UE adaptation to the traffic and UE power consumption characteristics.
R1-1810448 3GPP TSG RAN WG1 Meeting #94bis, Chengdu, China, Oct. 8-12, 2018, Source: MediaTek Inc., Title: UE adaptation to the traffic and UE power consumption characteristics.
R1-1810468 3GPP TSG RAN WG1 Meeting #94bis, Chengdu, China, Oct. 8-12, 2018, Source: Panasonic, Title: Discussion on UE traffic adaptation and power consumption characteristics.
R1-1810562 3GPP TSG RAN WG1 Meeting #94bis, Chengdu, China, Oct. 8-12, 2018, Source: CATT, Title: UE Power Saving Scheme with Multi-dimensional Adaptation.
R1-1810795 3GPP TSG RAN WG1 Meeting #94bis, Chengdu, China, Oct. 8-12, 2018, Source: Intel Corporation, Title: UE Adaptation to the traffic and UE power consumption characteristics.
R1-1810892 3GPP TSG RAN WG1 Meeting #94bis, Chengdu, China, Oct. 8-12, 2018, Source: Samsung, Title: Discussion on UE adaptation schemes.
R1-1811050 3GPP TSG RAN WG1 Meeting #94bis, Chengdu, China, Oct. 8-12, 2018, Source: CMCC, Title: Considerations for UE power saving.
R1-1811127 3GPP TSG RAN WG1 Meeting #94bis, Chengdu, China, Oct. 8-12, 2018, Source: Apple Inc., Title: Network-indication based Approaches for UE Power Saving.
R1-1812232 3GPP TSG RAN WG1 Meeting #95, Spokane, USA, Nov. 12-16, 2018, Source: Huawei, HiSilicon, Title: Design of power saving signal.
R1-1812331 3GPP TSG RAN WG1 Meeting #95, Spokane, USA, Nov. 12-16, 2018, Source: vivo, Title: Discussion on triggering adaptation of UE power consumption characteristics.
R1-1812362 3GPP TSG RAN WG1 Meeting #95, Spokane, USA, Nov. 12-16, 2018, Source: MediaTek Inc., Title: Triggering adaptation for UE power saving.
R1-1812422 3GPP TSG RAN WG1 Meeting #95, Spokane, USA, Nov. 12-16, 2018, Source: ZTE, Title: Considerations on triggering for UE power saving.
R1-1812514 3GPP TSG RAN WG1 Meeting #95, Spokane, USA, Nov. 12-16, 2018, Source: Intel Corporation, Title: Triggering UE adaptation to power consumption characteristics.
R1-1812591 3GPP TSG RAN WG1 Meeting #95, Spokane, USA, Nov. 12-16, 2018, Source: LG Electronics, Title: Discussion on power saving for CA operation.
R1-1812642 3GPP TSG RAN WG1 Meeting #95, Spokane, USA, Nov. 12-16, 2018, Source: CATT, Title: UE Power saving schemes with power saving signal/channel/procedures.
R1-1812750 3GPP TSG RAN WG1 Meeting #95, Spokane, USA, Nov. 12-16, 2018, Source: SONY, Title: Conditions and procedures for adaptation of power consumption characteristics.
R1-1812825 3GPP TSG RAN WG1 Meeting #95, Spokane, USA, Nov. 12-16, 2018, Source: OPPO, Title: Triggering Adaptation of UE Power Consumption Characteristics.
R1-1812890 3GPP TSG RAN WG1 Meeting #95, Spokane, USA, Nov. 12-16, 2018, Source: CMCC, Title: Considerations on power saving signal design.
R1-1812926 3GPP TSG RAN WG1 Meeting #95, Spokane, USA, Nov. 12-16, 2018, Source: Apple Inc., Title: Power Saving Techniques based on Explicit Indication.
R1-1813012 3GPP TSG RAN WG1 Meeting #95, Spokane, USA, Nov. 12-16, 2018, Source: Samsung, Title: Triggering adaptation schemes.
R1-1813076 3GPP TSG RAN WG1 Meeting #95, Spokane, USA, Nov. 12-16, 2018, Source: Spreadtrum Communications, Title: Discussion on triggering adaptation for UE power saving.
R1-1813183 3GPP TSG RAN WG1 Meeting #95, Spokane, USA, Nov. 12-16, 2018, Source: Ericsson, Title: Triggers of NR UE power saving.
R1-1813244 3GPP TSG RAN WG1 Meeting #95, Spokane, USA, Nov. 12-16, 2018, Source: InterDigital, Inc., Title: Discussion on Triggering of Power Mode Adaptation.
R1-1813448 3GPP TSG RAN WG1 Meeting #95, Spokane, USA, Nov. 12-16, 2018, Source: Qualcomm Incorporated, Title: Triggering Adaptation of UE Power Consumption Characteristics.

(56) References Cited

OTHER PUBLICATIONS

R1-1813495 3GPP TSG RAN WG1 Meeting #95, Spokane, USA, Nov. 12-16, 2018, Source: Panasonic, Title: Discussion on UE traffic adaptation procedures.
R1-1813516 3GPP TSG RAN WG1 Meeting #95, Spokane, USA, Nov. 12-16, 2018, Source: ASUSTeK, Title: Triggering adaptation of UE power consumption.
R1-1813621 3GPP TSG RAN WG1 Meeting #95, Spokane, USA, Nov. 12-16, 2018, Source: Nokia, Nokia Shanghai Bell, Title: On UE Power Saving Triggering Mechanisms.
R1-1813625 3GPP TSG RAN WG1 Meeting #95, Spokane, USA, Nov. 12-16, 2018, Source: Convida Wireless, Title: Triggering Adaptation of UE Power Consumption Characteristics.
R2-1700019 3GPP TSG RAN WG2 NR Ad Hoc, Spokane, USA, Jan. 17-19, 2017, Source: Samsung, Title: Random Access in NR—Flexible UE Bandwidth Aspects.
R2-1700023 3GPP TSG RAN WG2 NR Ad Hoc, Spokane, USA, Jan. 17-19, 2017, Source: ASUSTeK, Title: Consideration on use cases of 2-step RACH procedure.
R2-1700024 3GPP TSG RAN WG2 NR Ad Hoc, Spokane, USA, Jan. 17-19, 2017, Source: ASUSTeK, Title: Consideration on fallback of 2-step RACH procedure.
R2-1700089 3GPP TSG RAN WG2 NR Ad Hoc, Spokane, USA, Jan. 17-19, 2017, Source: Huawei, HiSilicon, Title: Considerations on RACH procedure in NR.
R2-1700103 3GPP TSG RAN WG2 NR Ad Hoc, Spokane, USA, Jan. 17-19, 2017, Source: National Instruments, Title: Considerations on the Random-Access Procedure in Massive MIMO NR.
R2-1700137 3GPP TSG RAN WG2 NR Ad Hoc, Spokane, USA, Jan. 17-19, 2017, Source: SONY, Title: 2-step RACH to 4-step RACH fallback.
R2-1700155 3GPP TSG RAN WG2 NR Ad Hoc, Spokane, USA, Jan. 17-19, 2017, Source: ZTE, ZTE Microelectronics, Title: Consideration on the two-step RACH in NR.
R2-1700202 3GPP TSG RAN WG2 NR Ad Hoc, Spokane, USA, Jan. 17-19, 2017, Source: CATT, Title: Design principles for random access procedure in NR.
R2-1700203 3GPP TSG RAN WG2 NR Ad Hoc, Spokane, USA, Jan. 17-19, 2017, Source: CATT, Title: Random access procedure in NR.
R2-1700204 3GPP TSG RAN WG2 NR Ad Hoc, Spokane, USA, Jan. 17-19, 2017, Source: CATT, Title: Impact of NR physical layer design on RA.
R2-1700205 3GPP TSG RAN WG2 NR Ad Hoc, Spokane, USA, Jan. 17-19, 2017, Source: CATT, Title: Consideration on 2-step RA.
R2-1700237 3GPP TSG RAN WG2 NR Ad Hoc, Spokane, USA, Jan. 17-19, 2017, Source: InterDigital Communications, Title: 2-Step Random Access Procedure in NR.
R2-1700335 3GPP TSG RAN WG2 NR Ad Hoc, Spokane, USA, Jan. 17-19, 2017, Source: Intel Corporation, Title: Further considerations of random access in NR.
R2-1700355 3GPP TSG RAN WG2 NR Ad Hoc, Spokane, USA, Jan. 17-19, 2017, Source: ASUSTeK, Title: Discussion on latency of random access in NR.
R2-1700356 3GPP TSG RAN WG2 NR Ad Hoc, Spokane, USA, Jan. 17-19, 2017, Source: ASUSTeK, MediaTek Inc., Title: Consideration on use cases of 2-step RACH procedure.
R2-1700357 3GPP TSG RAN WG2 NR Ad Hoc, Spokane, USA, Jan. 17-19, 2017, Source: Samsung, Title: Consideration on 2-step RACH.
R2-1700619 3GPP TSG RAN WG2 NR Ad Hoc, Spokane, USA, Jan. 17-19, 2017, Source: NTT DOCOMO, Inc., Title: Remaining RAN2 aspects on random access procedure for NR.
May 13, 2019—European Search Report—19151142.7.
Huawei et al: "Independent and joint control of CSI-RS transmission and CSI reporting for NR MIMO", Jan. 16, 2017.
Huawei Hisilicon: "Independent and joint control of CSI-RS transmission and CSI reporting for NR MIMO", Nov. 13, 2016.
Mar. 25, 2019—European Search Report—EP 19150331.7.
Jan. 1, 2018—3GPP Standard; 3GPP TS 38.331—3rd Generation Partnership Project; Technical Specification Gorup Radio Access Network; NR; Radio Resource Control (RRC) Protocol specific (Release 15).
Sep. 17, 2017—3GPP TSG-RAN WG1 NR Ad Hoc #3—Ericsson "On semi-persistent CSI reporting on PUSCH".
3GPP TS 36.211 V14.4.0 (Sep. 2017), Technical Specification, 3rd Generation Partnership Project; Technical Specification Group Radio Access Network; Evolved Universal Terrestrial Radio Access (E-UTRA); Physical Channels and Modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.212 V14.4.0 (Sep. 2017), Technical Specification, 3rd Generation Partnership Project; Technical Specification Group Radio Access Network; Evolved Universal Terrestrial Radio Access (E-UTRA); Multiplexing and Channel Coding (Release 14).
3GPP TS 36.213 V14.4.0 (Sep. 2017), Technical Specification, 3rd Generation Partnership Project; Technical Specification Group Radio Access Network; Evolved Universal Terrestrial Radio Access (E-UTRA); Physical Layer Procedures (Release 14).
3GPP TS 36.300 V14.4.0 (Sep. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 36.321 V14.4.0 (Sep. 2017), Technical Specification, 3rd Generation Partnership Project; Technical Specification Group Radio Access Network; Evolved Universal Terrestrial Radio Access (E-UTRA); Medium Access Control (MAC) protocol Specification (Release 14).
3GPP TS 38.212 V15.0.0 (Dec. 2017), Technical Specification, 3rd Generation Partnership Project; Technical Specification Group Radio Access Network; NT; Multiplexing and Channel Coding (Release 15).
3GPP TS 38.213 V2.0.0 (Dec. 2017), Technical Specification, 3rd Generation Partnership Project; Technical Specification Group Radio Access Network; NR; Physical Layer Procedures for Control (Release 15).
3GPP TS 38.300 V2.0.0 (Dec. 2017), Technical Specification, 3rd Generation Partnership Project; Technical Specification Group Radio Access Network; NR; NR and NG-RAN Overall Description; Stage 2 (Release 15).
3GPP TS 38.321 V2.0.0 (Dec. 2017), Technical Specification, 3rd Generation Partnership Project; Technical Specification Group Radio Access Network; NR; Medium Access Control (MAC) Protocol Specification (Release 15).
3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TSG RAN WG1 Meeting #90bis, Prague, Czech Republic, Oct. 9-13, 2017, Title: RAN1 Chairman's Notes.
3GPP TS 38.213 V1.2.1 (Dec. 2017), Technical Specification, 3rd Generation Partnership Project; Technical Specification Group Radio Access Network; NR; Physical Layer Procedures for Control (Release 15).
3GPP TS 38.214 V1.2.1 (Dec. 2017), Technical Specification, 3rd Generation Partnership Project; Technical Specification Group Radio Access Network; NR; Physical Layer Procedures for Data (Release 15).
R2-180xxxx 3GPP TSG RAN WG2 Meeting #101, Sanya, China, Apr. 16-20, 2018, Source: Nokia, Nokia Shanghai Bell, Title: Running MAC CR for euCA.
R1-1803571 3GPP TSG RAN WG1 Meeting #92bis, Sanya, China, Apr. 16-20, 2018, Source: MCC Support, Title: Final Report of 3GPP TSG RAN WG1 #92 v1.0.0.
R1-1721510 3GPP TSG RAN WG1 Meeting #91, Reno, USA, Nov. 27-Dec. 1, 2017, Source: NTT DOCOMO, Inc., Title: Offline summary for AI 7.3.3.4 UL data transmission procedure.

(56) References Cited

OTHER PUBLICATIONS

R1-1709907 3GPP TSG-RAN WG1 NR Ad Hoc, Qingdao, China, Jun. 27-30, 2017, Source: Xinwei, Title: Discussion on Beam Failure Recovery.
R1-1709929 3GPP TSG-RAN WG1 NR Ad Hoc, Qingdao, China, Jun. 27-30, 2017, Source: Huawei, HiSilicon, Title: General views on beam failure recovery.
R1-1710058 3GPP TSG-RAN WG1 NR Ad Hoc, Qingdao, China, Jun. 27-30, 2017, Source: CATT, Title: Considerations on DL beam failure and recovery.
R1-1710283 3GPP TSG-RAN WG1 NR Ad Hoc, Qingdao, China, Jun. 27-30, 2017, Source: LG Electronics, Title: Discussion on beam failure recovery.
R1-1710400 3GPP TSG-RAN WG1 NR Ad Hoc, Qingdao, China, Jun. 27-30, 2017, Source: vivo, Title: Beam failure recovery procedure.
R1-1710596 3GPP TSG-RAN WG1 NR Ad Hoc, Qingdao, China, Jun. 27-30, 2017, Source: Lenovo, Motorola Mobility, Title: Discussion of beam recovery procedure.
R1-1710810 3GPP TSG-RAN WG1 NR Ad Hoc, Qingdao, China, Jun. 27-30, 2017, Source: MediaTek Inc., Title: Mechanism for flexible beam failure recovery.
R1-1710926 3GPP TSG-RAN WG1 NR Ad Hoc, Qingdao, China, Jun. 27-30, 2017, Source: InterDigital, Inc., Title: On Remaining Details of Beam Failure Recovery.
R1-1711017 3GPP TSG-RAN WG1 NR Ad Hoc, Qingdao, China, Jun. 27-30, 2017, Source: Ericsson, Title: Mechanism to recover from beam failure.
R1-1711291 3GPP TSG-RAN WG1 NR Ad Hoc, Qingdao, China, Jun. 27-30, 2017, Source: Nokia, Alcatel-Lucent Shanghai Bell, Title: Beam Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1715439 3GPP TSG RAN WG1 Meeting NR Ad Hoc, Nagoya, Japan, Sep. 18-21, 2017, Source: ZTE, Sanechips, Title: Remaining details on CSI reporting.
R1-1715858 3GPP TSG RAN WG1 Meeting NR Ad Hoc, Nagoya, Japan, Sep. 18-21, 2017, Source: LG Electronics, Title: Discussions on CSI reporting.
R1-1715939 3GPP TSG RAN WG1 Meeting NR Ad Hoc, Nagoya, Japan, Sep. 18-21, 2017, Source: Samsung, Title: CSI reporting and UCI multiplexing.
R1-1716349 3GPP TSG RAN WG1 Meeting NR Ad Hoc, Nagoya, Japan, Sep. 18-21, 2017, Source: Ericsson, Title: On CSI reporting.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1716901 3GPP TSG RAN WG1 Meeting NR Ad Hoc, Nagoya, Japan, Sep. 18-21, 2017, Source: Samsung, Ericsson, Huawei, HiSilicon, ZTE, Sanechips, Mediatek, NTT DOCOMO, Nokia, Nokia Shanghai Bell, KDDI, Vodafone, CEWiT, IITH, IITM, Tejas Networks, Verizon, Deutsche Telekom, Softbank, CHTTL, NEC, WILUS, Sharp, China Unicom, ITL, KRRI, CMCC, ASTRI, KT Corporation, BT, Sprint, LG Electronics, AT&T, Title: WF for Open Issues on CSI Reporting.
R1-1717300 3GPP TSG RAN WG1 Meeting #90bis, Prague, Czech Republic, Oct. 9-13, 2017, Source: Huawei, HiSilicon, Title: Details of CSI reporting on PUCCH/PUSCH.
R1-1717367 3GPP TSG RAN WG1 Meeting #90bis, Prague, Czech Republic, Oct. 9-13, 2017, Source: Intel Corporation, Title: Remaining issues on CSI reporting.
R1-1717423 3GPP TSG RAN WG1 Meeting #90bis, Prague, Czech Republic, Oct. 9-13, 2017, Source: ZTE, Sanechips, Title: Remaining details on CSI reporting.
R1-1717471 3GPP TSG RAN WG1 Meeting #90bis, Prague, Czech Republic, Oct. 9-13, 2017, Source: vivo, Title: Discussion on CSI reporting.
R1-1717604 3GPP TSG RAN WG1 Meeting #90bis, Prague, Czech Republic, Oct. 9-13, 2017, Source: Samsung, Title: CSI reporting and UCI multiplexing.
R1-1717811 3GPP TSG RAN WG1 Meeting #90bis, Prague, Czech Republic, Oct. 9-13, 2017, Source: CATT, Title: Remaining issues on CSI reporting.
R1-1717940 3GPP TSG RAN WG1 Meeting #90bis, Prague, Czech Republic, Oct. 9-13, 2017, Source: LG Electronics, Title: Discussions on CSI reporting.
R1-1718191 3GPP TSG RAN WG1 Meeting #90bis, Prague, Czech Republic, Oct. 9-13, 2017, Source: NTT DOCOMO, Inc., Title: Remaining Issues on Feedback Design for CSI Type I and Type II.
U.S. Appl. No. 16/237,368, Selection of Grant and CSI, filed Dec. 31, 2018.
U.S. Appl. No. 16/240,412, Methods and Sytems for Information Reporting, filed Jan. 4, 2019.
U.S. Appl. No. 16/244,917, Power Control for Channel State Information, filed Jan. 10, 2019.
U.S. Appl. No. 16/577,847, Activation and Deactivation of Powre Saving Operation, filed Sep. 20, 2019.
U.S. Appl. No. 16/586,515, Power Control for Retransmissions, filed Sep. 27, 2019.
R1-1718337 3GPP TSG RAN WG1 Meeting #90bis, Prague, Czech Republic, Oct. 9-13, 2017, Source: MediaTek, Inc., Title: Remaining details for CSI reporting.
R1-1718432 3GPP TSG RAN WG1 Meeting #90bis, Prague, Czech Republic, Oct. 9-13, 2017, Source: Ericsson, Title: On remaining details of CSI reporting.
R1-1718442 3GPP TSG RAN WG1 Meeting #90bis, Prague, Czech Republic, Oct. 9-13, 2017, Source: Ericsson, Title: On semi-persistent CSI reporting on PUSCH.
R1-1718443 3GPP TSG RAN WG1 Meeting #90bis, Prague, Czech Republic, Oct. 9-13, 2017, Source: Ericsson, Title: On aperiodic and semi-persistent CSI reporting on PUCCH.
R1-1718481 3GPP TSG RAN WG1 Meeting #90bis, Prague, Czech Republic, Oct. 9-13, 2017, Source: InterDigital, Inc., Title: Remaining issues on CSI reporting.
R1-1718510 3GPP TSG RAN WG1 Meeting #90bis, Prague, Czech Republic, Oct. 9-13, 2017, Source: Nokia, Nokia Shanghai Bell, Title: Remaining details on CSI reporting for Type II and Type I codebook.
R1-1718540 3GPP TSG RAN WG1 Meeting #90bis, Prague, Czech Republic, Oct. 9-13, 2017, Source: Qualcomm Incorporated, Title: On Remaining Issues of CSI Reporting.
R1-1718910 3GPP TSG RAN WG1 Meeting #90bis, Prague, Czech Republic, Oct. 9-13, 2017, Source: ZTE, Sanechips, Title: Summary of CSI measurement.
R1-1719142 3GPP TSG RAN WG1 Meeting #90bis, Prague, Czech Republic, Oct. 9-13, 2017, Source: Ericsson, Title: Offline session notes CSI reporting (AI 7.2.2.2).
R1-1719425 3GPP TSG RAN WG1 Meeting #91, Reno, USA, Nov. 27-Dec. 1, 2017, Source: Huawei, HiSilicon, Title: Remaining issues for CSI reporting.
R1-1719434 3GPP TSG RAN WG1 Meeting #91, Reno, USA, Nov. 27-Dec. 1, 2017, Source: Huawei, HiSilicon, Title: Remaining details of UL power control design.
R1-1719435 3GPP TSG RAN WG1 Meeting #91, Reno, USA, Nov. 27-Dec. 1, 2017, Source: Huawei, HiSilicon, Title: Designs on power headroom calculation and reporting.
R1-1719488 3GPP TSG RAN WG1 Meeting #91, Reno, USA, Nov. 27-Dec. 1, 2017, Source: Mitsubishi Electric, Title: UL transmission power control.
R1-1719532 3GPP TSG RAN WG1 Meeting #91, Reno, USA, Nov. 27-Dec. 1, 2017, Source: ZTE, Sanechips, Title: Remaining details on CSI reporting.

(56) References Cited

OTHER PUBLICATIONS

R1-1719547 3GPP TSG RAN WG1 Meeting #91, Reno, USA, Nov. 27-Dec. 1, 2017, Source: ZTE, Sanechips, Title: On NR Power Control Framework.
R1-1719564 3GPP TSG RAN WG1 Meeting #91, Reno, USA, Nov. 27-Dec. 1, 2017, Source: MediaTek Inc., Title: Remaining details for CSI reporting.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1719653 3GPP TSG RAN WG1 Meeting #91, Reno, USA, Nov. 27-Dec. 1, 2017, Source: AT&T, Title: Dynamic Power Control and Coverage Impact.
R1-1719696 3GPP TSG RAN WG1 Meeting #91, Reno, USA, Nov. 27-Dec. 1, 2017, Source: Spreadtrum Communications, Title: Remaining issues on CSI feedback.
R1-1719768 3GPP TSG RAN WG1 Meeting #91, Reno, USA, Nov. 27-Dec. 1, 2017, Source: vivo, Title: Remaining details on CSI reporting.
R1-1719779 3GPP TSG RAN WG1 Meeting #91, Reno, USA, Nov. 27-Dec. 1, 2017, Source: vivo, Title: Remaining issues on NR UL power control.
R1-1719820 3GPP TSG RAN WG1 Meeting #91, Reno, USA, Nov. 27-Dec. 1, 2017, Source: Huawei, HiSilicon, Title: Power control design for SUL and LNC.
R1-1719906 3GPP TSG RAN WG1 Meeting #91, Reno, USA, Nov. 27-Dec. 1, 2017, Source: LG Electronics, Title: Discussions on CSI reporting.
R1-1719932 3GPP TSG RAN WG1 Meeting #91, Reno, USA, Nov. 27-Dec. 1, 2017, Source: LG Electronics, Title: Remaining issues on UL data transmission procedure.
R1-1719944 3GPP TSG RAN WG1 Meeting #91, Reno, USA, Nov. 27-Dec. 1, 2017, Source: LG Electronics, Title: Discussion on UL power control for NR non-CA case.
R1-1719968 3GPP TSG RAN WG1 Meeting #91, Reno, USA, Nov. 27-Dec. 1, 2017, Source: OPPO, Title: On uplink power control for NR.
R1-1719989 3GPP TSG RAN WG1 Meeting #91, Reno, USA, Nov. 27-Dec. 1, 2017, Source: OPPO, Title: Discussion on Remaining Issues for LTE-NR Dual Connectivity.
R1-1720070 3GPP TSG RAN WG1 Meeting #91, Reno, USA, Nov. 27-Dec. 1, 2017, Source: Intel Corporation, Title: Remaining issues on CSI reporting.
R1-1720104 3GPP TSG RAN WG1 Meeting #91, Reno, USA, Nov. 27-Dec. 1, 2017, Source: Intel Corporation, Title: Remaining Details On UL Power Control Framework.
R1-1720105 3GPP TSG RAN WG1 Meeting #91, Reno, USA, Nov. 27-Dec. 1, 2017, Source: Intel Corporation, Title: Remaining aspects on power sharing between LTE and NR.
R1-1720181 3GPP TSG RAN WG1 Meeting #91, Reno, USA, Nov. 27-Dec. 1, 2017, Source: CATT, Title: Remaining details on CSI reporting.
R1-1720215 3GPP TSG RAN WG1 Meeting #91, Reno, USA, Nov. 27-Dec. 1, 2017, Source: CATT, Title: Remaining Aspects of NR Power Control.
R1-1720289 3GPP TSG RAN WG1 Meeting #91, Reno, USA, Nov. 27-Dec. 1, 2017, Source: Samsung, Title: CSI reporting and UCI multiplexing.
R1-1720361 3GPP TSG RAN WG1 Meeting #91, Reno, USA, Nov. 27-Dec. 1, 2017, Source: Samsung, Title: Remaining Issues on UL Power Control.
R1-1720363 3GPP TSG RAN WG1 Meeting #91, Reno, USA, Nov. 27-Dec. 1, 2017, Source: Samsung, Title: On PHR Requirements and Calculation.
R1-1720371 3GPP TSG RAN WG1 Meeting #91, Reno, USA, Nov. 27-Dec. 1, 2017, Source: Panasonic, Title: Discussion on NR power control framework.
R1-1720560 3GPP TSG RAN WG1 Meeting #91, Reno, USA, Nov. 27-Dec. 1, 2017, Source: InterDigital, Inc., Title: Power Control for NR DC.
R1-1720595 3GPP TSG RAN WG1 Meeting #91, Reno, USA, Nov. 27-Dec. 1, 2017, Source: CMCC, Title: Power Control for NR DC.
R1-1720612 3GPP TSG RAN WG1 Meeting #91, Reno, USA, Nov. 27-Dec. 1, 2017, Source: Sharp, APT, Title: Power Control for NR DC.
R1-1720628 3GPP TSG RAN WG1 Meeting #91, Reno, USA, Nov. 27-Dec. 1, 2017, Source: InterDigital, Inc., Title: Remaining issues on CSI reporting.
R1-1720646 3GPP TSG RAN WG1 Meeting #91, Reno, USA, Nov. 27-Dec. 1, 2017, Source: HTC, Title: Remaining issues on UL power control for NR.
R1-1720661 3GPP TSG RAN WG1 Meeting #91, Reno, USA, Nov. 27-Dec. 1, 2017, Source: Qualcomm Incorporated, Title: Remaining Details on CSI Reporting.
R1-1720706 3GPP TSG RAN WG1 Meeting #91, Reno, USA, Nov. 27-Dec. 1, 2017, Source: Qualcomm Incorporated, Title: Remaining Issues on Power Control for NR.
R1-1720711 3GPP TSG RAN WG1 Meeting #91, Reno, USA, Nov. 27-Dec. 1, 2017, Source: InterDigital, Inc., Title: Consideration for UL Power Control Framework.
R1-1720734 3GPP TSG RAN WG1 Meeting #91, Reno, USA, Nov. 27-Dec. 1, 2017, Source: Ericsson, Title: On remaining details of CSI reporting.
R1-1720746 3GPP TSG RAN WG1 Meeting #91, Reno, USA, Nov. 27-Dec. 1, 2017, Source: Ericsson, Title: On semi-persistent CSI reporting on PUSCH.
R1-1720802 3GPP TSG RAN WG1 Meeting #91, Reno, USA, Nov. 27-Dec. 1, 2017, Source: NTT DOCOMO, Inc., Title: Remaining Issues on CSI reporting.
R1-1720832 3GPP TSG RAN WG1 Meeting #91, Reno, USA, Nov. 27-Dec. 1, 2017, Source: NTT DOCOMO, Inc., Title: Remaining details on LTE-NR power sharing.
R1-1720889 3GPP TSG RAN WG1 Meeting #91, Reno, USA, Nov. 27-Dec. 1, 2017, Source: Nokia, Nokia Shanghai Bell, Title: Remaining details on CSI reporting.
Jan. 17, 2020—European Extended Search Report—EP 19198650.4.
Nov. 4, 2020, European Office Action, EP 19187310.8.
Jul. 27, 2021—European Office Action—EP 19187310.8.
R1-1720903 3GPP TSG RAN WG1 Meeting #91, Reno, USA, Nov. 27-Dec. 1, 2017, Source: ASUSTek, Title: Power control on SRS for beam management.
R1-1720915 3GPP TSG RAN WG1 Meeting #91, Reno, USA, Nov. 27-Dec. 1, 2017, Source: China Telecom, Title: Discussion on Power Offset for SUL.
R1-1720928 3GPP TSG RAN WG1 Meeting #91, Reno, USA, Nov. 27-Dec. 1, 2017, Source: Motorola Mobility, Lenovo, Title: On non-CA NR UL power control.
R1-1721027 3GPP TSG RAN WG1 Meeting #91, Reno, USA, Nov. 27-Dec. 1, 2017, Source: Ericsson, Title: On Carrier aggregation related aspects.
R1-1721028 3GPP TSG RAN WG1 Meeting #91, Reno, USA, Nov. 27-Dec. 1, 2017, Source: Ericsson, Title: Remaining issues for NR power control framework.
R1-1721030 3GPP TSG RAN WG1 Meeting #91, Reno, USA, Nov. 27-Dec. 1, 2017, Source: Ericsson, Title: Power headroom reporting.
R1-1721031 3GPP TSG RAN WG1 Meeting #91, Reno, USA, Nov. 27-Dec. 1, 2017, Source: Ericsson, Title: Remaining issues of closed loop power control in NR.
R1-1721032 3GPP TSG RAN WG1 Meeting #91, Reno, USA, Nov. 27-Dec. 1, 2017, Source: Ericsson, Title: Remaining issues of PUSCH power control.
R1-1721033 3GPP TSG RAN WG1 Meeting #91, Reno, USA, Nov. 27-Dec. 1, 2017, Source: Ericsson, Title: Remaining issues of PUCCH power control.
R1-1721034 3GPP TSG RAN WG1 Meeting #91, Reno, USA, Nov. 27-Dec. 1, 2017, Source: Ericsson, Title: Remaining issues of SRS power control.

(56) References Cited

OTHER PUBLICATIONS

R1-1721038 3GPP TSG RAN WG1 Meeting #91, Reno, USA, Nov. 27-Dec. 1, 2017, Source: Nokia, Nokia Shanghai Bell, Title: Remaining details on NR power control framework.
3GPP TS 38.212 V1.2.1 (Dec. 2017), Technical Specification, 3rd Generation Partnership Project; Technical Specification Group Radio Access Network; NR; Multiplexing and Channel Coding (Release 15).
R1-1721371 3GPP TSG RAN WG1 Meeting #91, Reno, USA, Nov. 27-Dec. 1, 2017, Source: ZTE, Sanechips, Title: Summary of remaining issues on CSI measurement.
R1-1721451 3GPP TSG RAN WG1 Meeting #91, Reno, USA, Nov. 27-Dec. 1, 2017, Source: Ericsson, Title: Summary of views on CSI reporting.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803301 3GPP TSG RAN WG1 Meeting #92, Athens, Greece, Feb. 26-Mar. 2, 2018, Source: Ericsson, Title: Summary of CSI reporting v3.
R2-1706680 3GPP TSG-RAN WG2 Nr Ad Hoc, Qingdao, China, Jun. 27-30, 2017, Source: AT&T, Title: Beam Failure Recovery Mechanism and RLF.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1806774 3GPP TSG RAN WG2 Meeting #102, Busan, Korea, May 21-25, 2018, Source: Nokia, Nokia Shanghai Bell, Title: Finalization of dormant Scell state.
R2-1806924 3GPP TSG RAN WG2 Meeting #102, Busan, Korea, May 21-25, 2018, Source: Qualcomm Incorporated, Title: SCell Dormant State Transitions based on New Timers & MAC-CEs.
R2-1807481 3GPP TSG RAN WG2 Meeting #102, Busan, Korea, May 21-25, 2018, Source: Huawei, HiSilicon, Title: Remaining issues of temporary CQI reporting.
R2-1808570 3GPP TSG RAN WG2 Meeting #102, Busan, Korea, May 21-25, 2018, Source: Qualcomm Incorporated, Title: Dormant BWP for fast SCell activation.
R2-1808809 3GPP TSG RAN WG2 Meeting #102, Busan, Korea, May 21-25, 2018, Source: Ericsson, Title: CR on Dormat SCell state transition Mac Ce.
R2-1810063 3GPP TSG RAN WG2 NR Ad Hoc, Busan, Korea, Jul. 2-6, 2018, Source: Ericsson, Title: Dormant SCell state in NR.
3GPP TSG-RAN WG2 NR Ad Hoc, Qingdao, China, Jun. 27-30, 2017, Source: RAN2 Chairman (Intel), Title: Chairman Notes.
3GPP TS 38.211 V2.0.0 (Dec. 2017), Technical Specification, 3rd Generation Partnership Project; Technical Specification Group Radio Access Network; NR; Physical Channels and Modulation (Release 15).
3GPP TS 38.214 V2.0.0 (Dec. 2017), Technical Specification, 3rd Generation Partnership Project; Technical Specification Group Radio Access Network; NR; Physical Layer Procedures for Data (Release 15).
3GPP TS 38.331 V1.0.0 (Dec. 2017), Technical Specification, 3rd Generation Partnership Project; Technical Specification Group Radio Access Network; NR; Radio Resource Control (RRC) Protocol Specification (Release 15).

RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
3GPP TS 38.331 V0.4.0 (Dec. 2017), Technical Specification, 3rd Generation Partnership Project; Technical Specification Group Radio Access Network; NR; Radio Resource Control (RRC) Protocol Specification (Release 15).
R1-18xxxx 3GPP TSG RAN WG1 Meeting #95, Spokane, USA, Nov. 12-16, 2018, Source: OPPO, Title: Summary of RAN1#95 Tdocs on UCI enhancements for URLLC.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
Lagent, et al., "New Radio Beam-Based Access to Unlicensed Spectrum: Design Challenges and Solutions," InterDigital Communications, Inc., Melville, New York, USA, Sep. 27, 2018.
R1-1701260 3GPP TSG RAN WG1 NR Ad Hoc, Spokane, USA, Jan. 16-20, 2017, Source: ZTE, ZTE Microelectronics, Title: WF on 2-step RACH.
R1-1613547 3GPP TSG RAN WG1 Metting #87, Reno, USA, Nov. 14-18, 2016, Source: Nokia, InterDigital, Title: Way Forward on Two-Step RACH Fallback.
R1-1613548 3GPP TSG RAN WG1 Metting #87, Reno, USA, Nov. 14-18, 2016, Source: Nokia, Title: Way Forward on Two-Step RACH Procedure.
R1-1613685 3GPP TSG RAN WG1 Metting #87, Reno, USA, Nov. 14-18, 2016, Source: Nokia, ASB, MediaTek, Ericson, Title: Way Forward on Two-Step RACH Procedure.
R1-1611274 3GPP TSG RAN WG1 Metting #87, Reno, USA, Nov. 14-18, 2016, Source: ZTE Corporation, ZTE Microelectronics, Title: On 2-Step RACH Procedure in NR.
R1-1611694 3GPP TSG RAN WG1 Metting #87, Reno, USA, Nov. 14-18, 2016, Source: Huawei, HiSilicon, Title: Considerations on NR Rach Preamble and Channel Design.
R1-1612033 3GPP TSG RAN WG1 Metting #87, Reno, USA, Nov. 14-18, 2016, Source: Qualcomm Incorporated, Title: 2 step and 4 step RACH.
R1-1612068 3GPP TSG RAN WG1 Metting #87, Reno, USA, Nov. 14-18, 2016, Source: Qualcomm Incorporated, Title: UE Power Evaluation for DRX with Wake-Up Signaling.
R1-1612142 3GPP TSG RAN WG1 Metting #87, Reno, USA, Nov. 14-18, 2016, Source: MediaTek Inc., Title: Considerations on 2-step RACH physical channel design.
R1-1612218 3GPP TSG RAN WG1 Metting #87, Reno, USA, Nov. 14-18, 2016, Source: ETRI, Title: On 2-step RACH procedure for high speed train scenario for NR.
R1-1612299 3GPP TSG RAN WG1 Metting #87, Reno, USA, Nov. 14-18, 2016, Source: Nokia, Alcatel-Lucent Shanghai Bell, Title: Random access principles for new radio.
Apr. 12, 2022—European Office Action—EP 19187310.8.
R2-1814940 3GPP TSG RAN WG2 Meeting #103bis, Chengdu, China, Oct. 8-12, 2018, Source: Nokia, Nokia Shanghai Bell, Title: Correction to preamble power ramping.
R2-1815281 3GPP TSG RAN WG2 Meeting #103bis, Chengdu, China, Oct. 8-12, 2018, Source: LG Electronics Inc., Title: Remaining issue with Power Ramping Counter.
RP-181463 3GPP TSG RAN Meeting #80, La Jolla, USA, Jun. 11-14, 2018, Source: CATT, CMCC, vivo, CATR, Qualcomm, MediaTek, Title: New SID: Study on UE Power Saving in NR.
R1-1700035 3GPP TSG RAN WG1 NR Ad Hoc, Spokane, USA, Jan. 16-20, 2017, Source: Huawei, HiSilicon, Title: Further Consideration on two-step RACH.

(56) References Cited

OTHER PUBLICATIONS

R1-1700105 3GPP TSG RAN WG1 NR Ad Hoc, Spokane, USA, Jan. 16-20, 2017, Source: ZTE, ZTE Microelectronics, Title: 2-step Random Access Procedure.
R1-1700172 3GPP TSG RAN WG1 NR Ad Hoc, Spokane, USA, Jan. 16-20, 2017, Source: MediaTek Inc., Title: On 2-step random access procedure and physical channel in NR.
R1-1700186 3GPP TSG RAN WG1 NR Ad Hoc, Spokane, USA, Jan. 16-20, 2017, Source: CATT, Title: Further considerations on a 2-step RA Procedure.
R1-1700300 3GPP TSG RAN WG1 NR Ad Hoc, Spokane, USA, Jan. 16-20, 2017, Source: Ericsson, Title: NR two-step random access procedure.
R1-1700311 3GPP TSG RAN WG1 NR Ad Hoc, Spokane, USA, Jan. 16-20, 2017, Source: AT&T, Title: 2-Step RA Procedure for NR.
R1-1700426 3GPP TSG RAN WG1 NR Ad Hoc, Spokane, USA, Jan. 16-20, 2017, Source: ITRI, Title: Discussion on 2-step RA procedure issues.
R1-1700464 3GPP TSG RAN WG1 NR Ad Hoc, Spokane, USA, Jan. 16-20, 2017, Source: LG Electronics, Title: Discussion on 2 step RACH.
R1-1700577 3GPP TSG RAN WG1 NR Ad Hoc, Spokane, USA, Jan. 16-20, 2017, Source: ETRI, Title: On 2-step RA procedure for NR.
R1-1700587 3GPP TSG RAN WG1 NR Ad Hoc, Spokane, USA, Jan. 16-20, 2017, Source: HTC, Title: Design considerations for 2-step RACH.
R1-1700652 3GPP TSG RAN WG1 NR Ad Hoc, Spokane, USA, Jan. 16-20, 2017, Source: Nokia, Alcatel-Lucent Shanghai Bell, Title: On 2-step Random Access Procedure.
R1-1700668 3GPP TSG RAN WG1 NR Ad Hoc, Spokane, USA, Jan. 16-20, 2017, Source: Sony, Title: Discussions on 2 Steps RACH Procedure.
R1-1700703 3GPP TSG RAN WG1 NR Ad Hoc, Spokane, USA, Jan. 16-20, 2017, Source: InterDigital Communications, Title: 2-step random access procedure.
R1-1700792 3GPP TSG RAN WG1 NR Ad Hoc, Spokane, USA, Jan. 16-20, 2017, Source: Qualcomm Incorporated, Title: 2-step RACH procedure consideration.
R1-1700880 3GPP TSG RAN WG1 NR Ad Hoc, Spokane, USA, Jan. 16-20, 2017, Source: Motorola Mobility, Title: Physical channel design for 2-step RACH.
R1-1700892 3GPP TSG RAN WG1 NR Ad Hoc, Spokane, USA, Jan. 16-20, 2017, Source: Samsung, Title: NR 2-step random access procedure.
R1-1701275 3GPP TSG RAN WG1 NR Ad Hoc, Spokane, USA, Jan. 16-20, 2017, Source: ZTE, ZTE Microelectronics, MediaTek, Title: WF on 2-Step RACH.
R1-1703139 3GPP TSG RAN WG1 Meeting #88, Athens, Greece, Feb. 13-17, 2017, Source: Sony, Title: Wake Up Radio for NR.
R1-1704282 3GPP TSG RAN WG1 Meeting #88bis, Spokane, USA, Apr. 3-7, 2017, Source: Huawei, HiSilicon, Title: Considerations on 'wake-up signal' for eFeMTC.
R1-1704290 3GPP TSG RAN WG1 Meeting #88bis, Spokane, USA, Apr. 3-7, 2017, Source: Huawei, HiSilicon, Title: On 'wake-up signal' for paging and connected-mode DRX.
R1-1704531 3GPP TSG RAN WG1 Meeting #88bis, Spokane, USA, Apr. 3-7, 2017, Source: CATT, Title: UE Wakeup Mechanism and On-Demand Access for efeMTC UE Power Saving.
R1-1704532 3GPP TSG RAN WG1 Meeting #88bis, Spokane, USA, Apr. 3-7, 2017, Source: CATT, Title: UE Wakeup Mechanism and On-Demand Access for fNB-IoT UE Power Saving.
R1-1704693 3GPP TSG RAN WG1 Meeting #88bis, Spokane, USA, Apr. 3-7, 2017, Source: Intel Corporation, Title: DL Power Consumption Reduction for efeMTC.
R1-1704698 3GPP TSG RAN WG1 Meeting #88bis, Spokane, USA, Apr. 3-7, 2017, Source: Intel Corporation, Title: DL Power Consumption Reduction for feNB-IOT.
R1-1704845 3GPP TSG RAN WG1 Meeting #88bis, Spokane, USA, Apr. 3-7, 2017, Source: LG Electronics, Title: UE power consumption reduction by new physical channel in MTC.
R1-1704847 3GPP TSG RAN WG1 Meeting #88bis, Spokane, USA, Apr. 3-7, 2017, Source: LG Electronics, Title: UE power consumption reduction by new physical channel in NB-IoT.
R1-1705012 3GPP TSG RAN WG1 Meeting #88bis, Spokane, USA, Apr. 3-7, 2017, Source: Qualcomm Incorporated, Title: Efficient monitoring of DL control channels.
R1-1705017 3GPP TSG RAN WG1 Meeting #88bis, Spokane, USA, Apr. 3-7, 2017, Source: Qualcomm Incorporated, Title: Efficient monitoring of DL control channels.
R1-1705038 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705043 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705182 3GPP TSG RAN WG1 Meeting #88bis, Spokane, USA, Apr. 3-7, 2017, Source: Ericsson, Title: Power consumption reduction for paging and connected-mode DRX.
R1-1705192 3GPP TSG RAN WG1 Meeting #88bis, Spokane, USA, Apr. 3-7, 2017, Source: Ericsson, Title: Power consumption reduction for paging and connected-mode DRX.
R1-1705204 3GPP TSG RAN WG1 Meeting #88bis, Spokane, USA, Apr. 3-7, 2017, Source: Sony, Title: MTC UE Power Consumption Reduction in Idle Mode Paging.
R1-1705305 3GPP TSG RAN WG1 Meeting #88bis, Spokane, USA, Apr. 3-7, 2017, Source: Samsung, Title: Power consumption reduction for paging and connected-mode DRX for eMTC.
R1-1705309 3GPP TSG RAN WG1 Meeting #88bis, Spokane, USA, Apr. 3-7, 2017, Source: Samsung, Title: Power consumption reduction for paging and connected-mode DRX for NB-IoT.
R1-1705494 3GPP TSG RAN WG1 Meeting #88bis, Spokane, USA, Apr. 3-7, 2017, Source: ZTE, ZTE Microelectronics, Title: Power consumption reduction for physical channels for MTC.
R1-1705495 3GPP TSG RAN WG1 Meeting #88bis, Spokane, USA, Apr. 3-7, 2017, Source: ZTE, ZTE Microelectronics, Title: Power consumption reduction for physical channels for NB-IoT.
R1-1706882 3GPP TSG RAN WG1 Meeting #89, Hangzhou, P.R. China, May 15-19, 2017, Source: Ericsson, Title: Downlink channel power efficiency for MTC.
R1-1707018 3GPP TSG RAN WG1 Meeting #89, Hangzhou, P.R. China, May 15-19, 2017, Source: Huawei, HiSilicon, Title: On 'wake-up signal' for eFeMTC.
R1-1707101 3GPP TSG RAN WG1 Meeting #89, Hangzhou, P.R. China, May 15-19, 2017, Source: ZTE, Title: Power consumption reduction for physical channels for MTC.
R1-1707315 3GPP TSG RAN WG1 Meeting #89, Hangzhou, P.R. China, May 15-19, 2017, Source: Intel Corporation, Title: Analysis of impact of Wake-up signaling on power consumption and resource efficiency for efeMTC.
R1-1707455 3GPP TSG RAN WG1 Meeting #89, Hangzhou, P.R. China, May 15-19, 2017, Source: CATT, Title: UE Wakeup Mechanism and On-Demand Access for efeMTC UE Power Saving.
R1-1707568 3GPP TSG RAN WG1 Meeting #89, Hangzhou, P.R. China, May 15-19, 2017, Source: LG Electronics, Title: UE power consumption reduction by new physical signal/channel in MTC.
R1-1707862 3GPP TSG RAN WG1 Meeting #89, Hangzhou, P.R. China, May 15-19, 2017, Source: Nokia, Alcatel-Lucent Shanghai Bell, Title: Signalling for efficient decoding of physical channels.
R1-1708311 3GPP TSG RAN WG1 Meeting #89, Hangzhou, P.R. China, May 15-19, 2017, Source: Sierra Wireless, Title: Sldle Mode Power Efficiency Reduction.
R1-1708796 3GPP TSG RAN WG1 Meeting #89, Hangzhou, P.R. China, May 15-19, 2017, Source: Qualcomm Incorporated, Title: Efficient monitoring of DL control channels.
R1-1712106 3GPP TSG RAN WG1 Meeting #90, Prague, Czech Republic, Aug. 21-25, 2017, Source: Huawei, HiSilicon, Title: On power-saving signal for eFeMTC.
R1-1804405 3GPP TSG RAN WG1 Meeting #92, Sanya, China, Apr. 16-20, 2018, Source: Samsung, Title: Potential physical layer procedures for NR-U.

(56) References Cited

OTHER PUBLICATIONS

R1-1808272 3GPP TSG RAN WG1 Meeting #94, Gothenburg, Sweden, Aug. 20-24, 2018, Source: MediaTek Inc., Title: On downlink transmission detection in NR-U.

R1-1808319 3GPP TSG RAN WG1 Meeting #94, Gothenburg, Sweden, Aug. 20-24, 2018, Source: ZTE, Title: Considerations on DL reference signals and channels design for NR-U.

\* cited by examiner

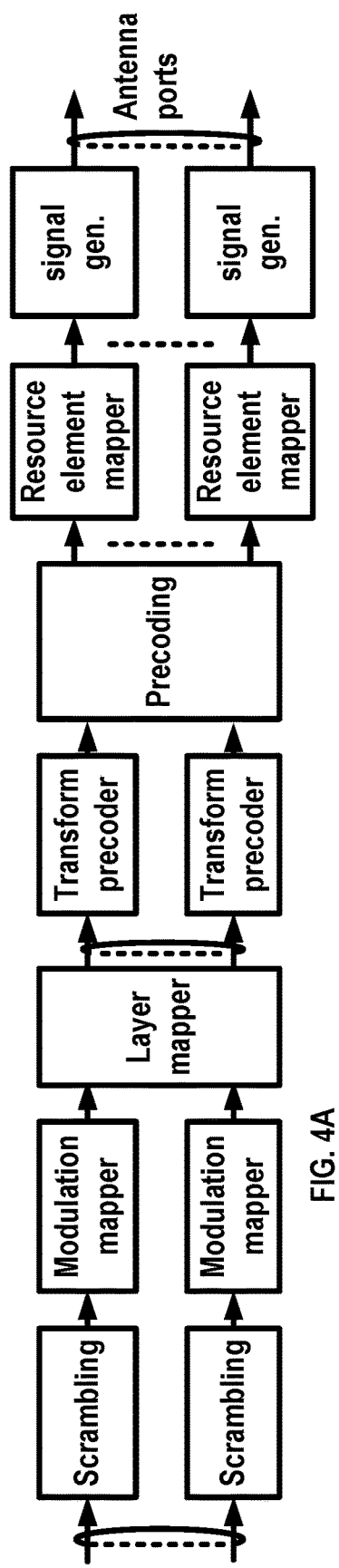
FIG. 4A
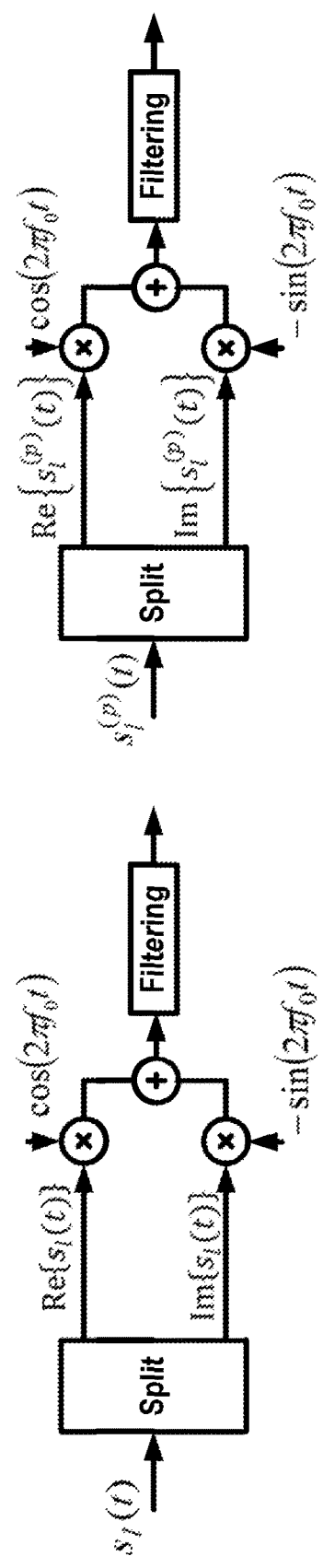
FIG. 4B
FIG. 4D
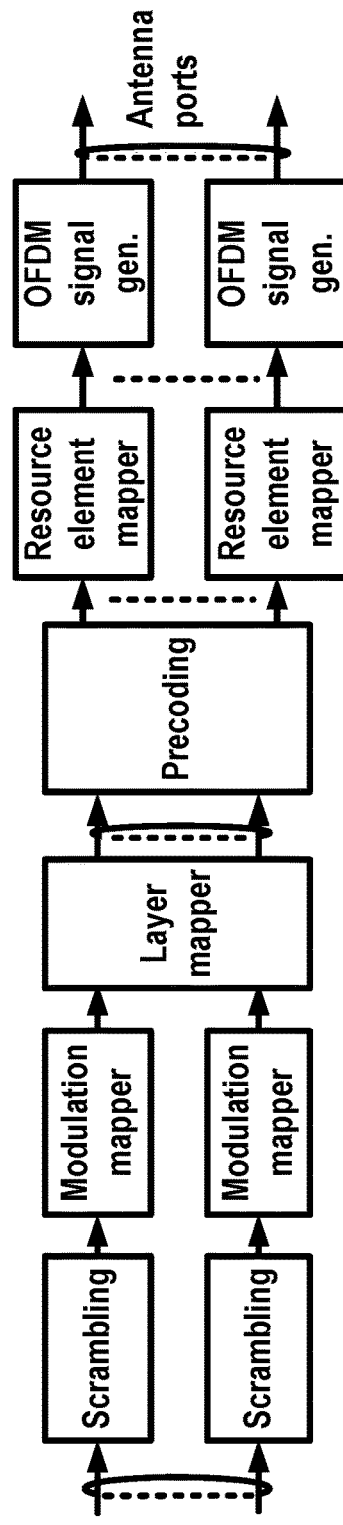
FIG. 4C

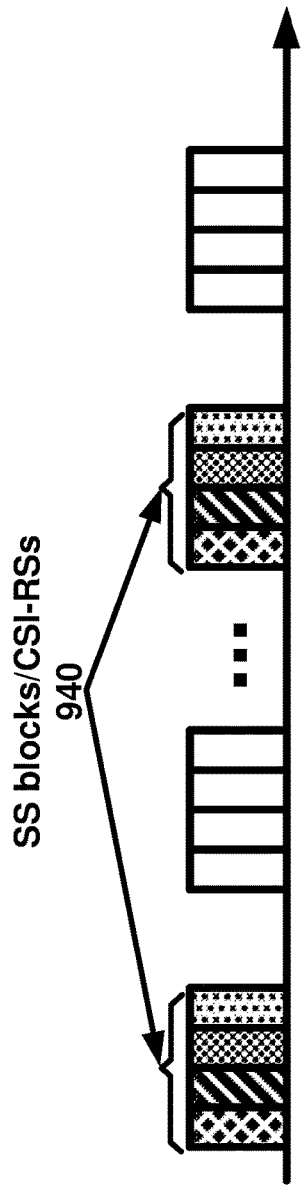
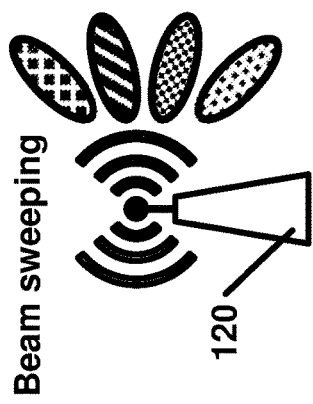
FIG. 9A
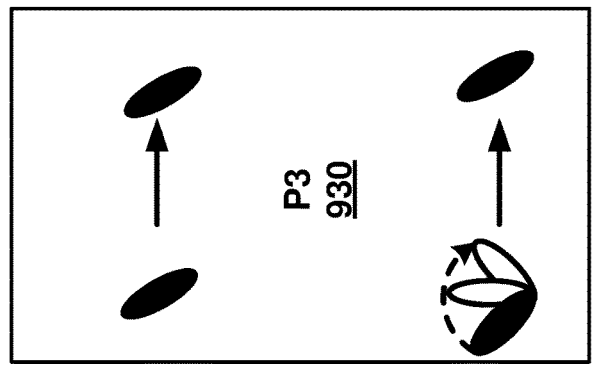
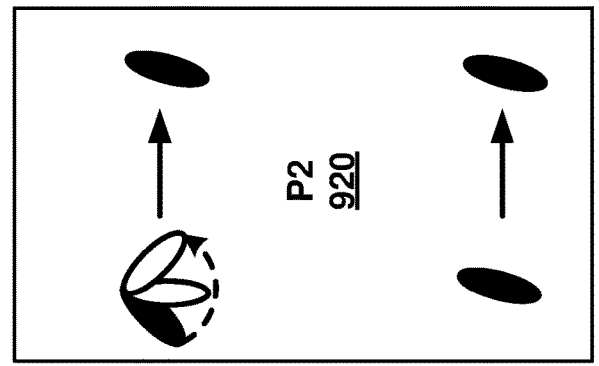
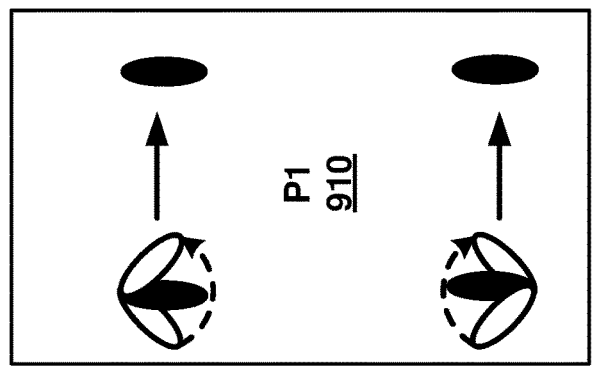
FIG. 9B

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

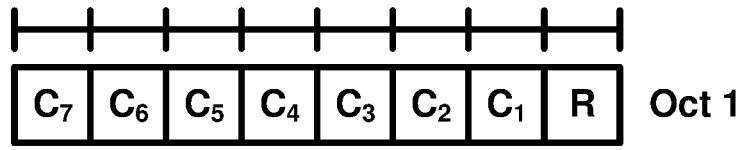
FIG. 21A
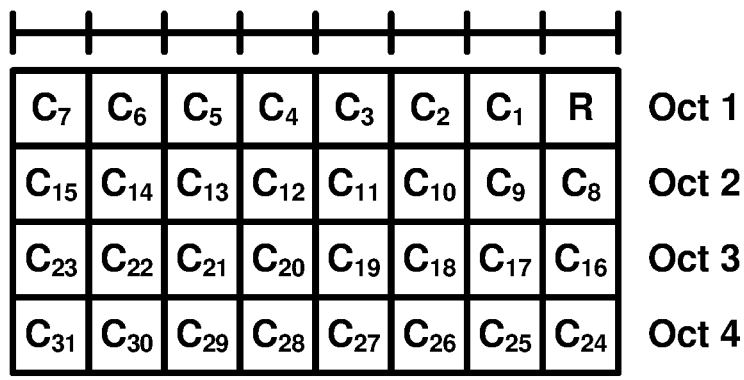
FIG. 21B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 21C

RESOURCE MANAGEMENT FOR WIRELESS COMMUNICATIONS USING A POWER SAVING STATE

CROSS-REFERENCE TO RELATED APPLICATIONS

This application claims the benefit of U.S. Provisional Application No. 62/700,470, titled "Channel State Information Report" and filed on Jul. 19, 2018. The above-referenced application is hereby incorporated by reference in its entirety.

BACKGROUND

Wireless communications may have various resource usage requirements. For example, different devices, at different locations, and/or at different times, may require different resource usages. Resource management for one or more devices may suffer from deficiencies such as inefficient resource usage, increased power consumption, delayed resource usage transition, and/or lack of synchronization with one or more other devices for resource usage.

SUMMARY

The following summary presents a simplified summary of certain features. The summary is not an extensive overview and is not intended to identify key or critical elements.

Wireless communications may use various mechanisms for power saving, synchronization of network operations, and/or flexible resource utilization. For example, a device (e.g., a wireless device and/or a base station) may perform reduced activities, processing, and/or communication if operating in a power saving state as opposed to an active state. A device may monitor a reduced resource set in a power saving state. A device may reduce an amount of channel state information to be transmitted to a base station in a power saving state. A device may use reduced resources for transmission of channel state data in a power saving state. A device may transmit channel state information corresponding to a resource that was previously under utilization by the device in an active state. A device may maintain some resource units in a power saving state (e.g., a dormant state), for example, if the device is operating in an active state, to enable quicker activation of the resource units. A device may flexibly activate and deactivate transmission and reception points based on an amount of data to be transmitted and/or received. A device (e.g., a wireless device and/or a base station) may perform one or more of these various mechanisms for improved resource management for wireless communications.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 9A shows an example channel state information reference signal (CSI-RS) and/or synchronization signal (SS) block transmission in a multi-beam system.

FIG. 9B shows an example downlink beam management procedure.

FIG. 18 shows an example of LCIDs for DL-SCH.

FIG. 19 shows an example of LCIDs for UL-SCH.

FIG. 21A shows an example of an SCell hibernation MAC control element (CE).

FIG. 21B shows an example of an SCell hibernation MAC CE.

FIG. 21C shows an example of MAC CEs for SCell state transitions.

DETAILED DESCRIPTION

Figure 1:
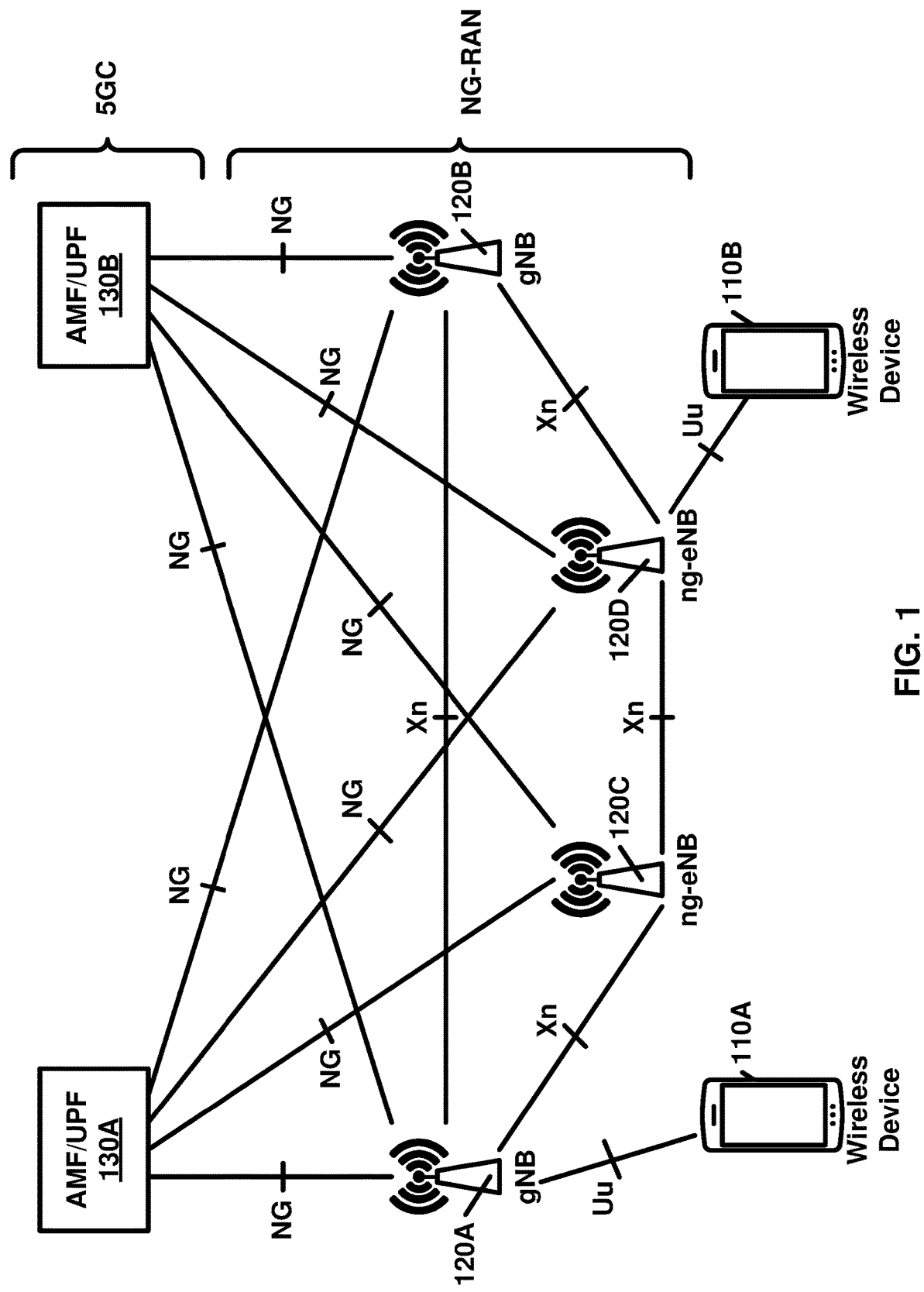
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to resource management for wireless communications.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CE Control Element
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRI CSI-RS resource indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LI Layer Indicator
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node j
NACK Negative Acknowledgement
NAS Non-Access Stratum
NGCP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
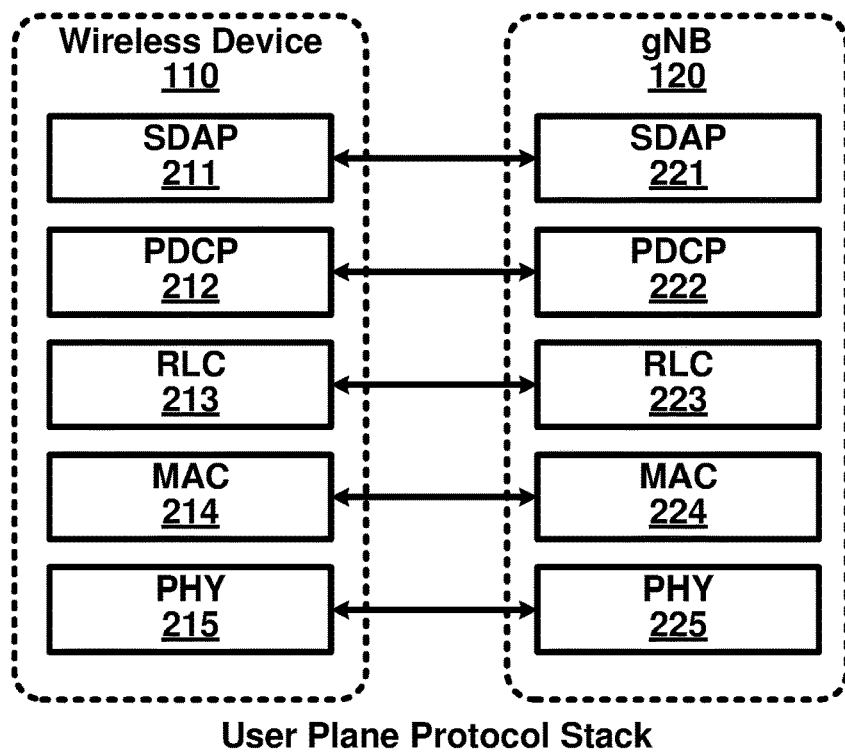
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
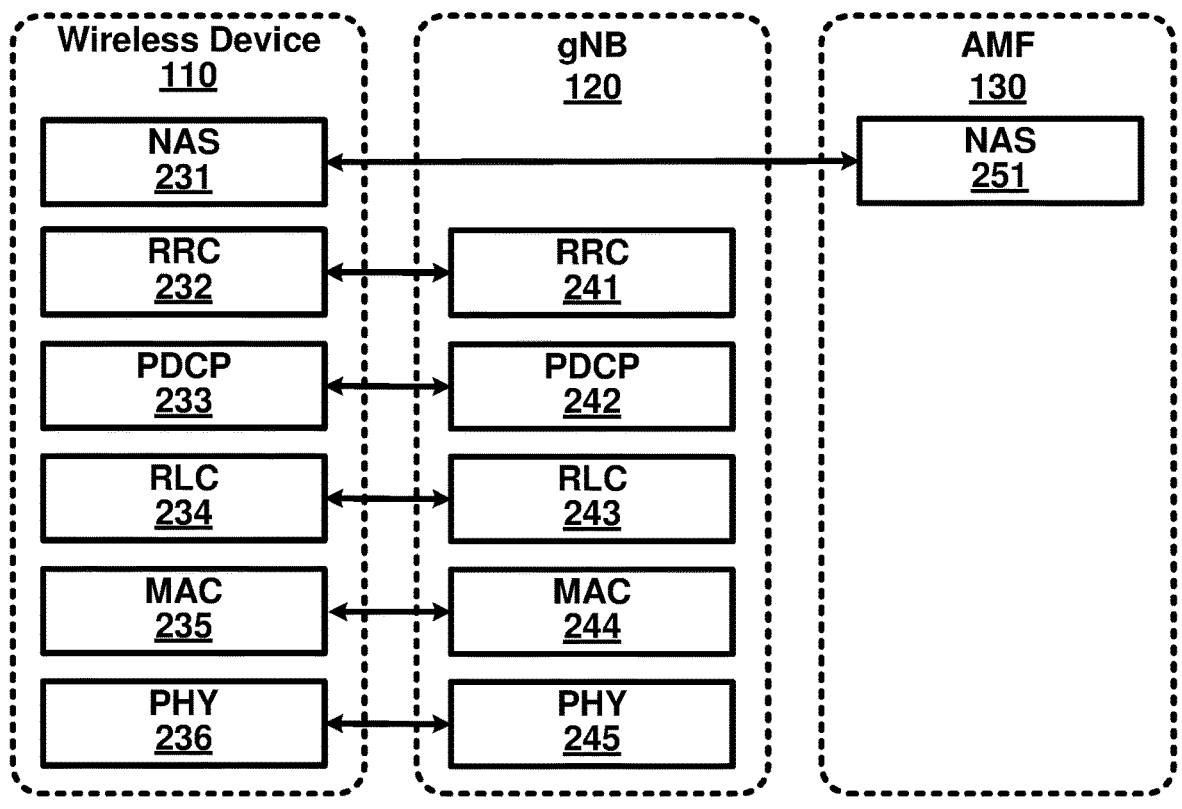
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
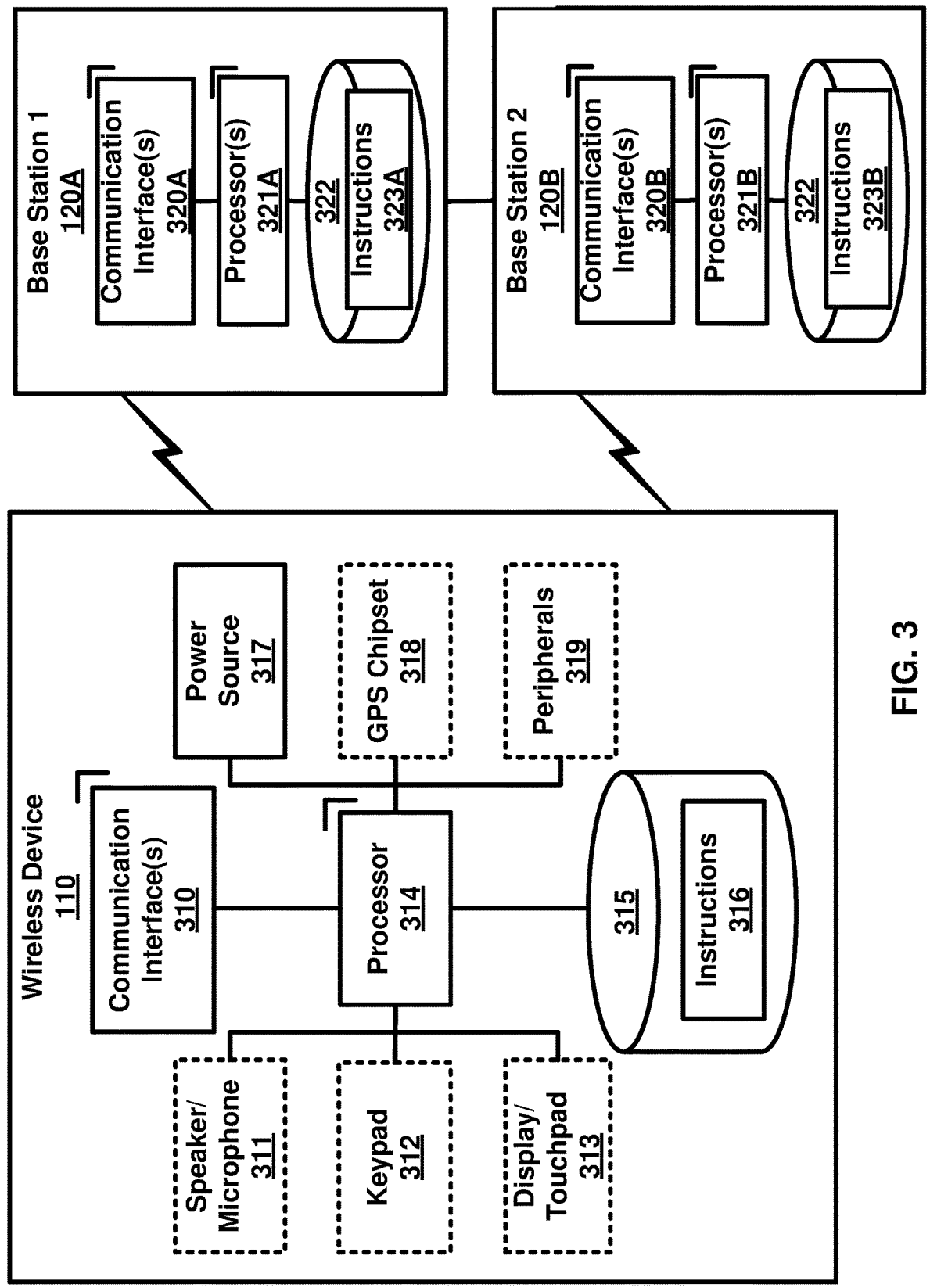
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
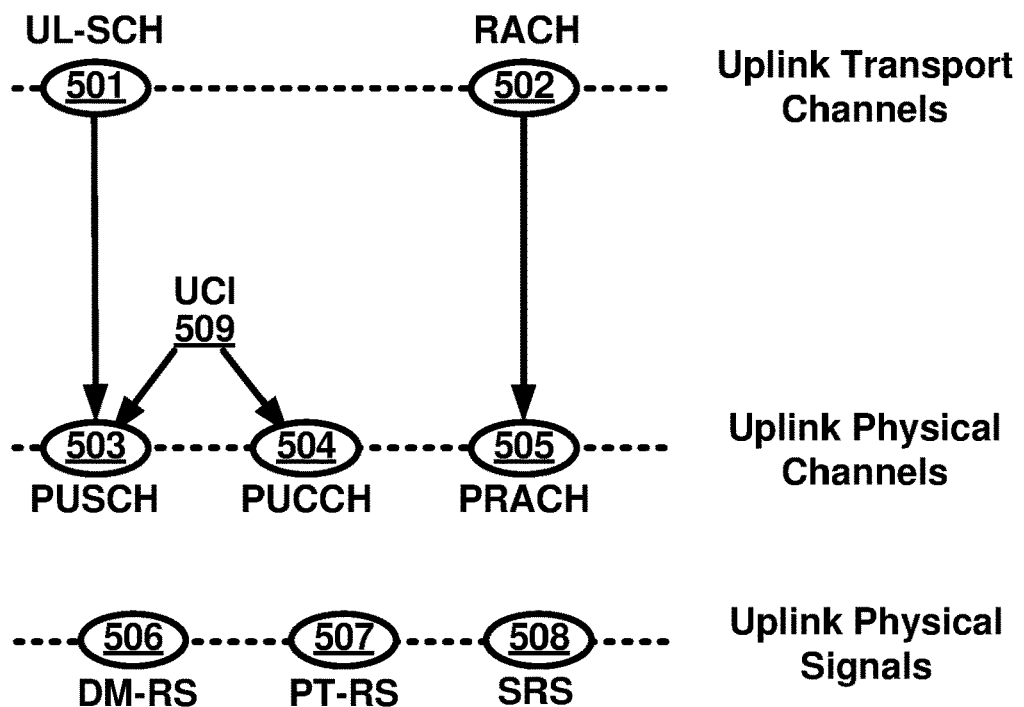
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
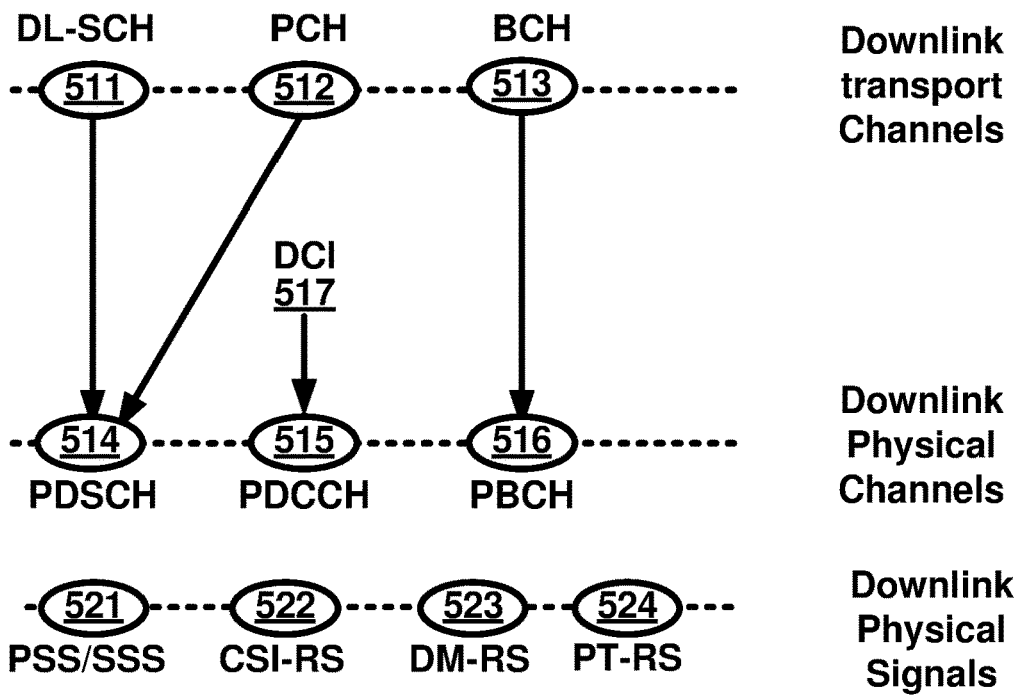
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
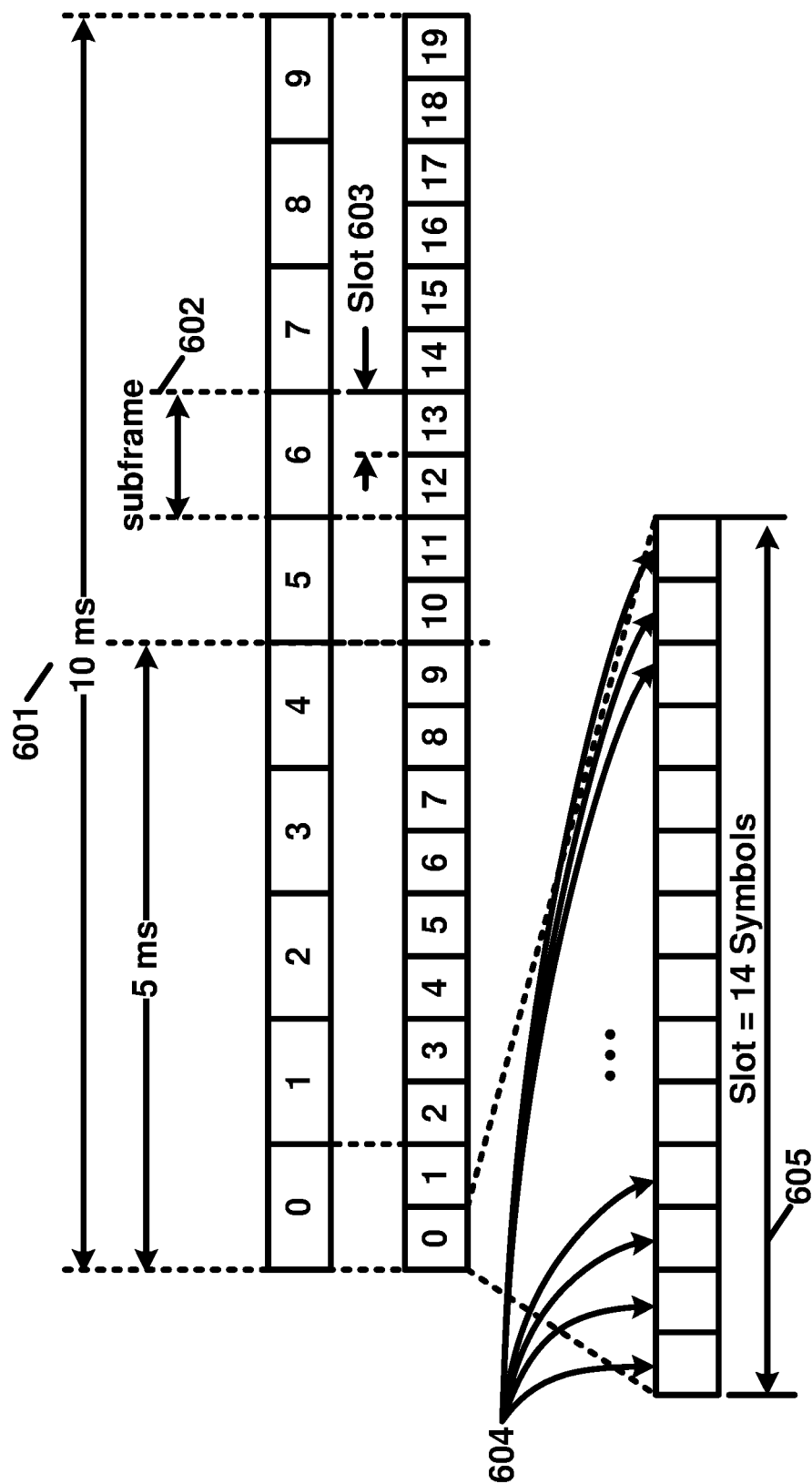
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
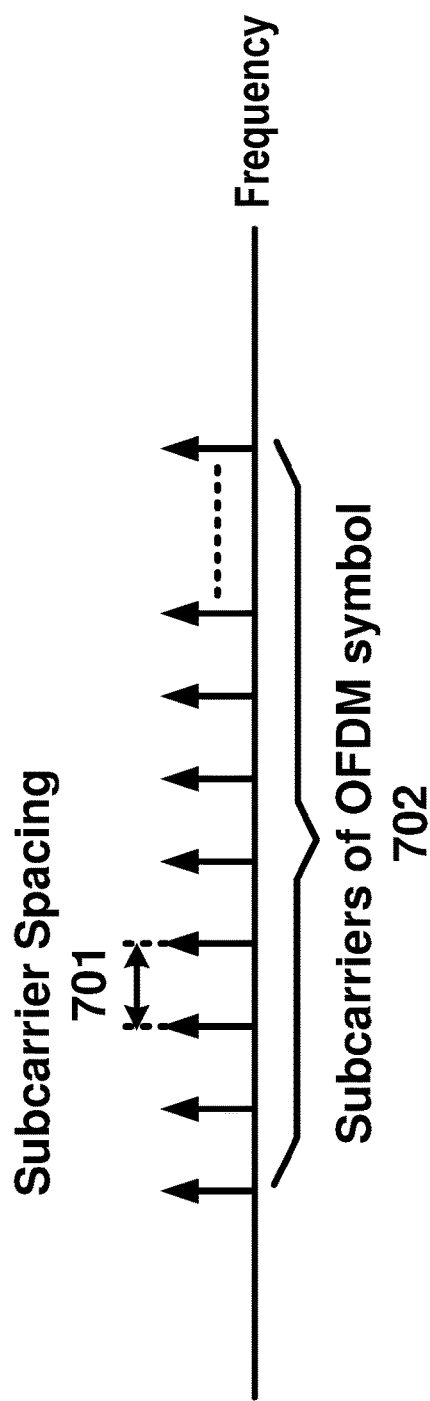
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
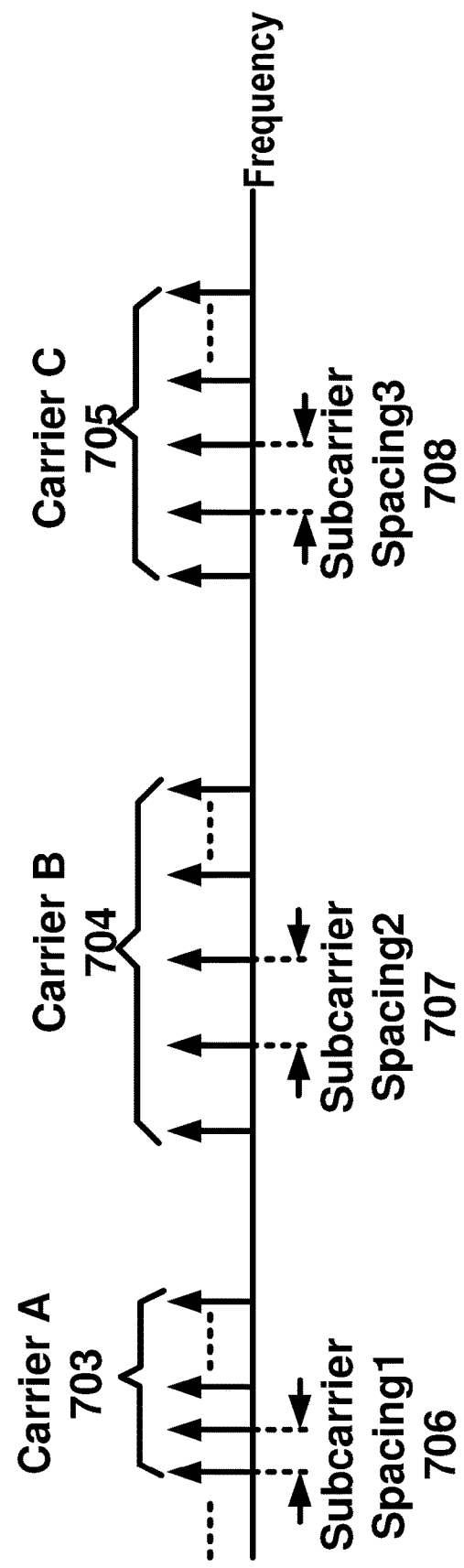

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
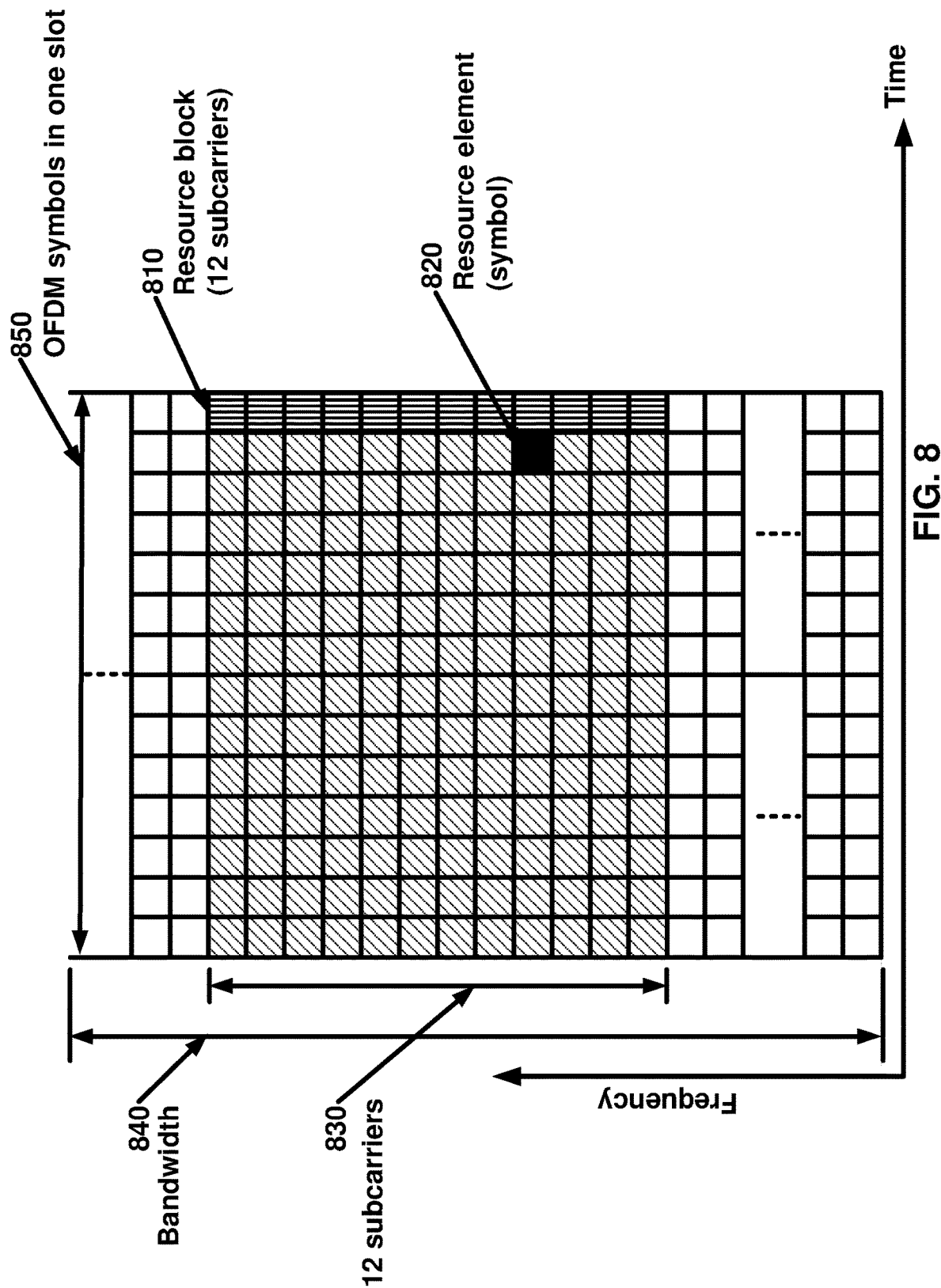
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
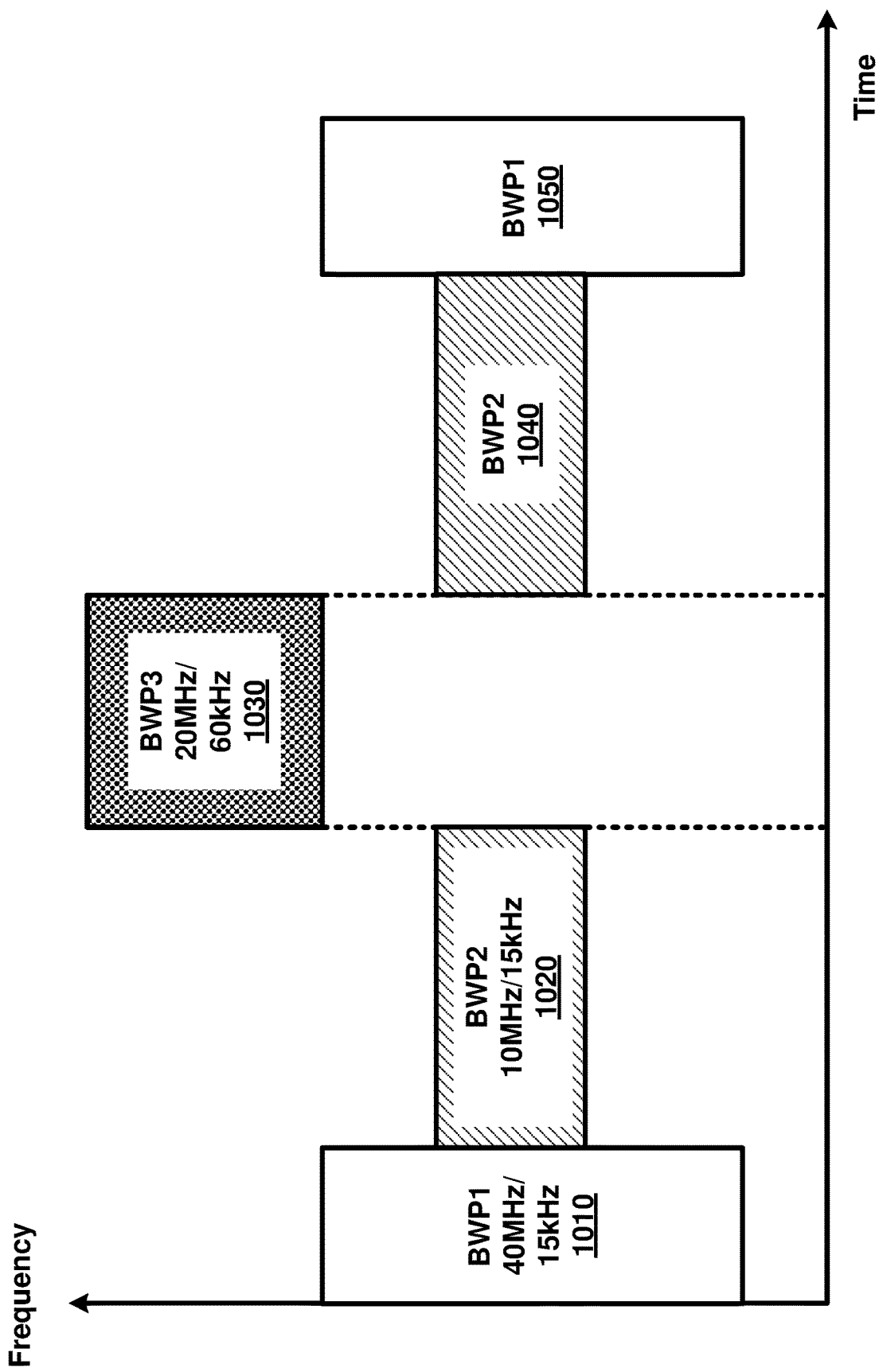
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may refrain from configuring a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided with a default DL BWP, a default BWP may be an initial active DL BWP.

A default BWP may not be configured for one or more wireless devices. A first (or initial) BWP may serve as a default BWP, for example, if a default BWP is not configured.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
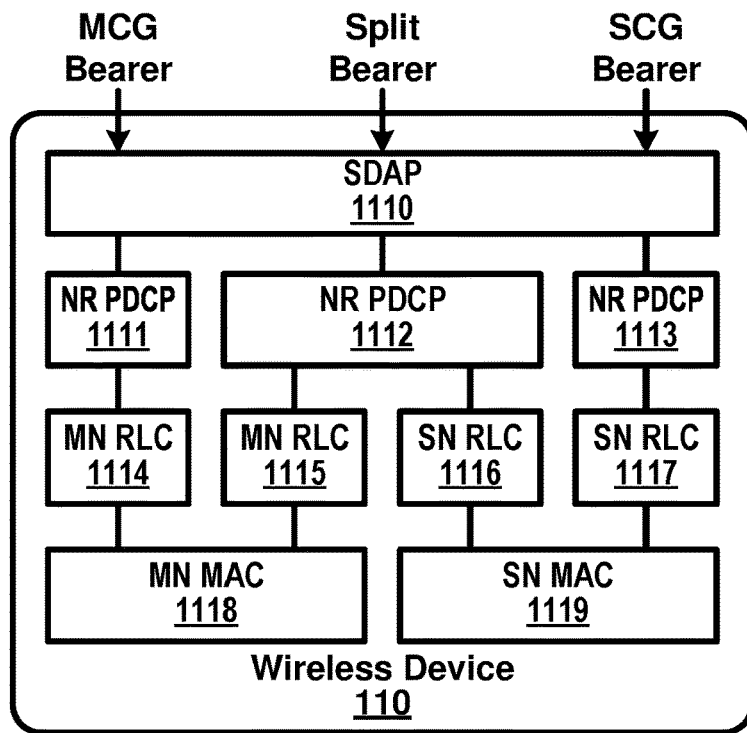
FIG. 11A and FIG. 11B show examples of multi connectivity.
Figure 11B:
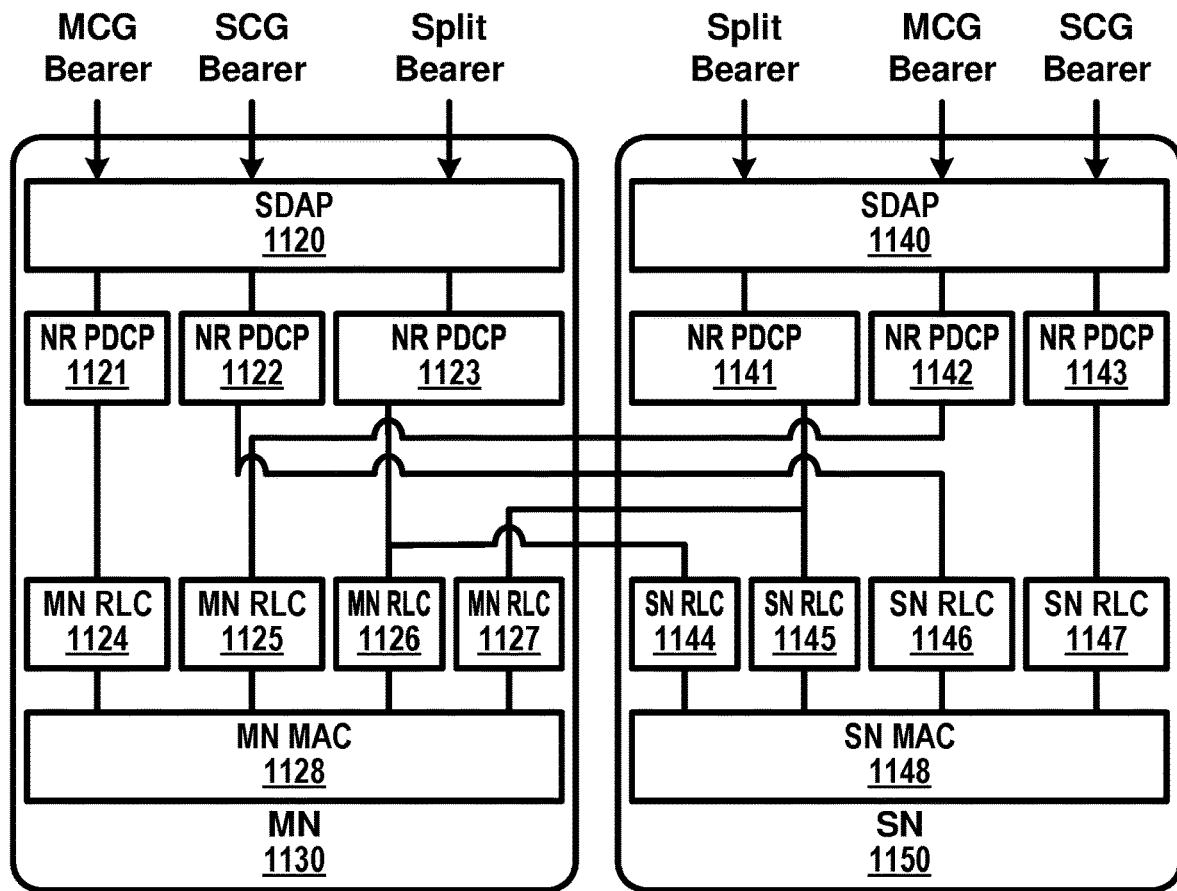

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
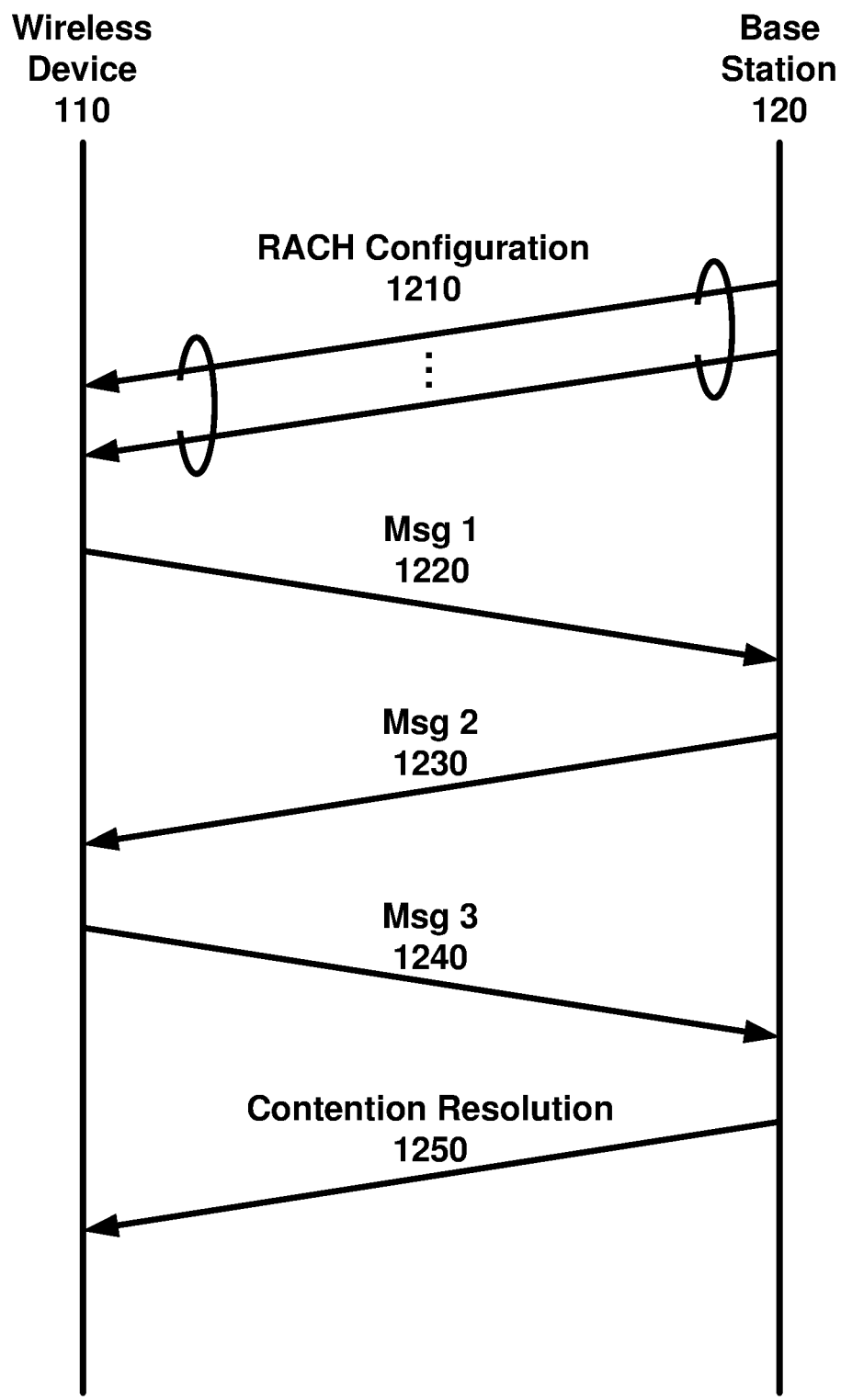
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg 1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
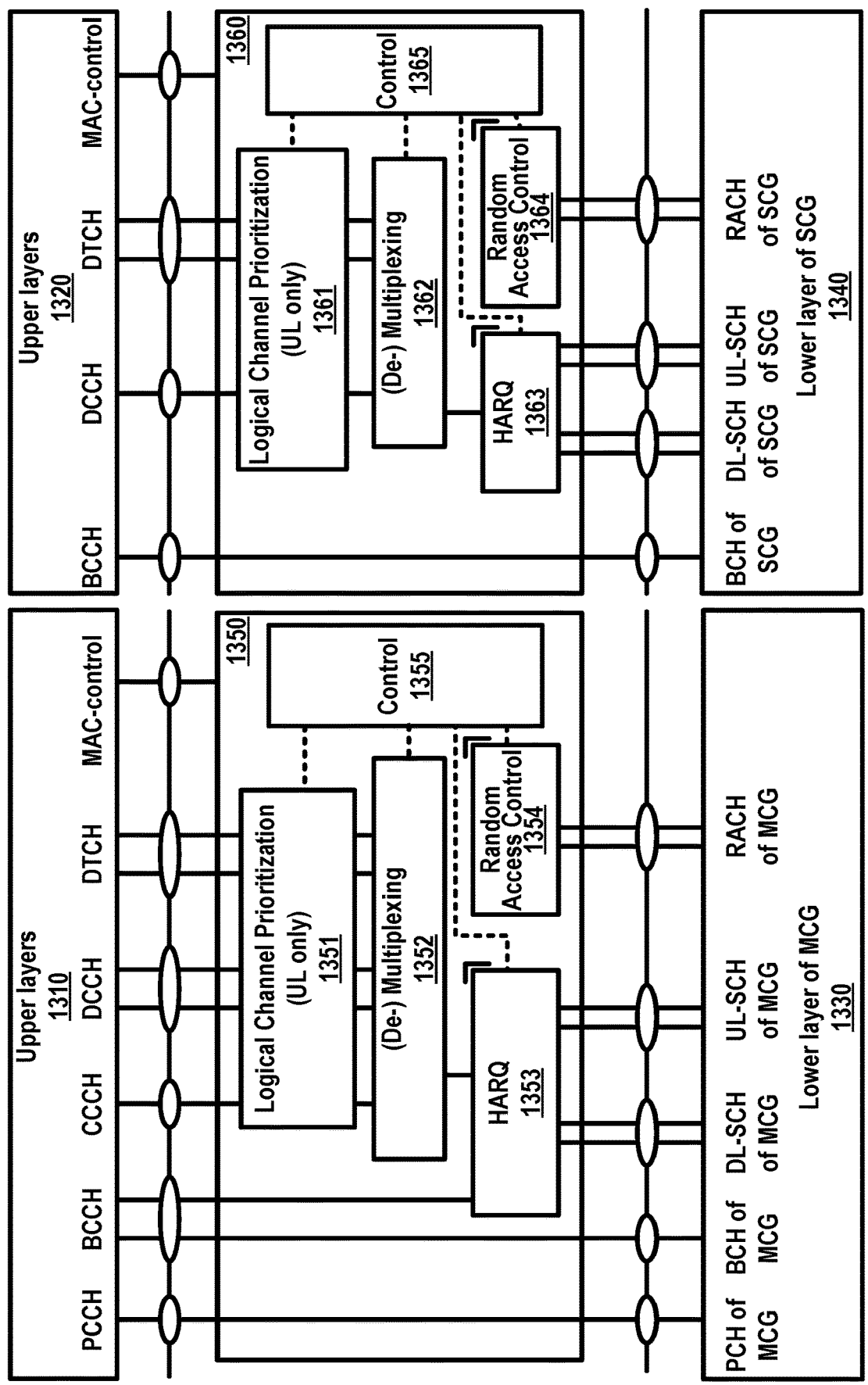
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
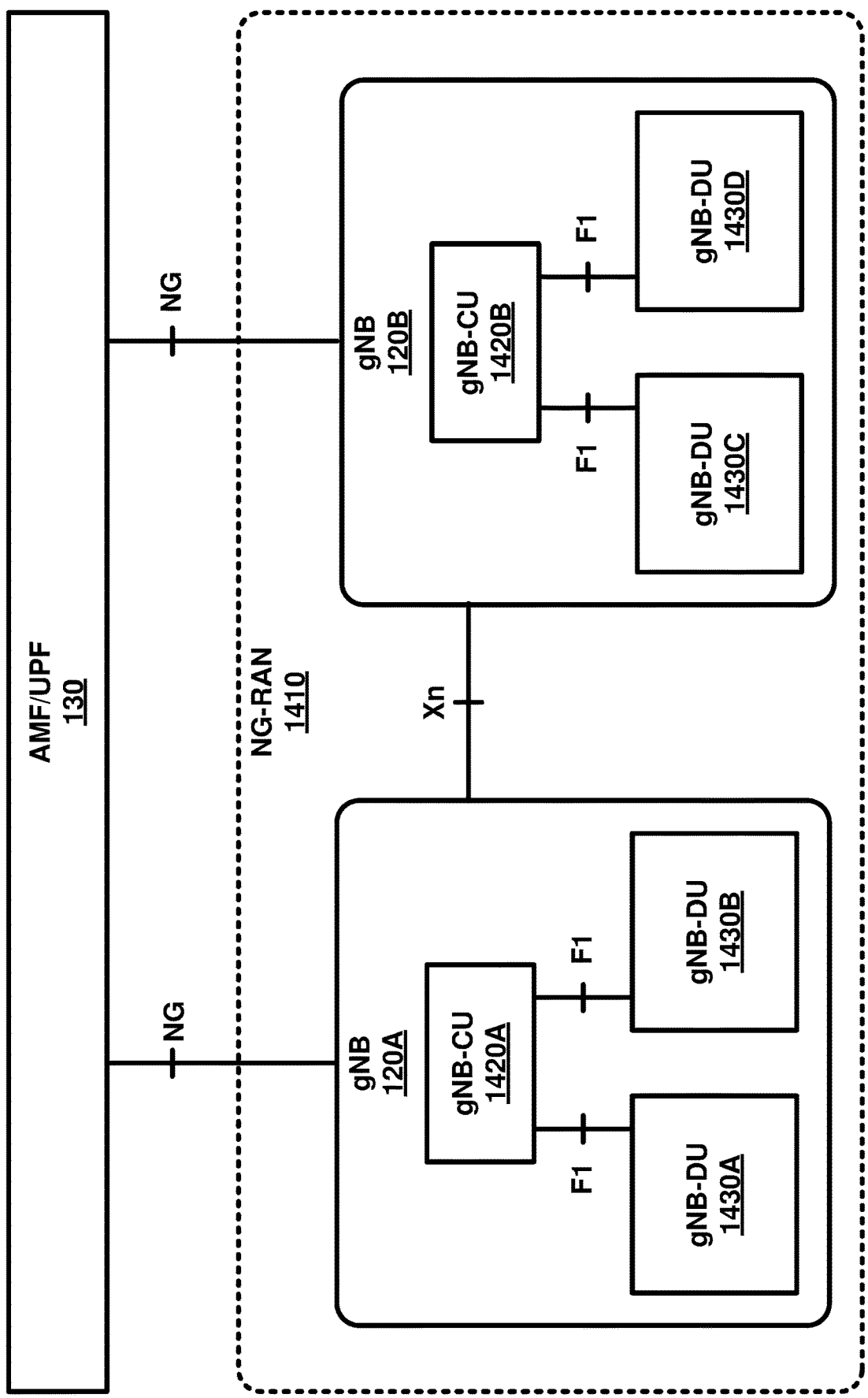
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
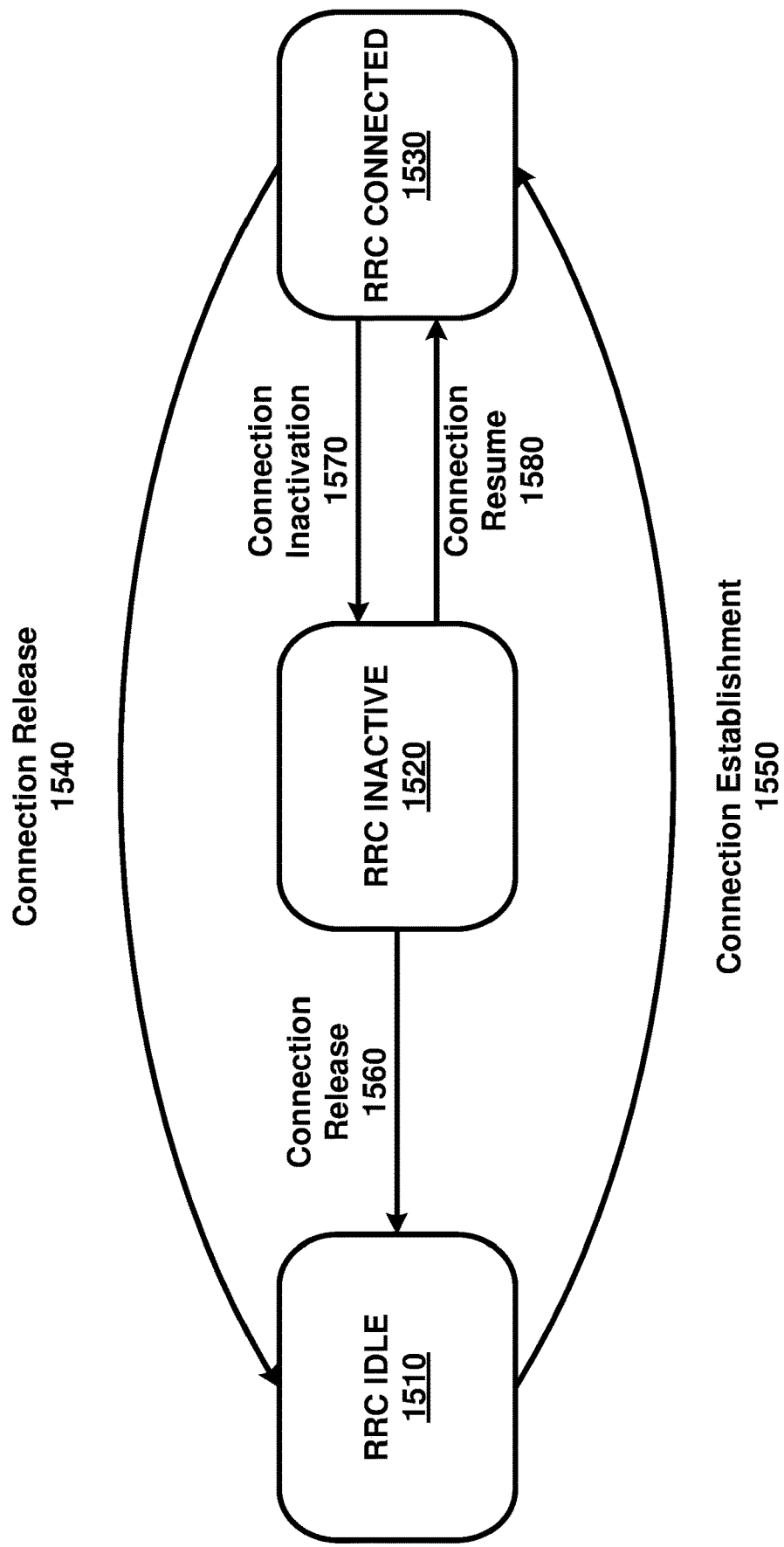
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; an RB allocation; a time resource allocation; a bandwidth part indicator; a HARQ process number; one or more MCS; one or more NDI; one or more RV; MIMO related information; a downlink assignment index (DAI); a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; an RB allocation; a time resource allocation; an MCS; an NDI; a phase rotation of the uplink DMRS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) on the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different CORESETs, for example, to support a wide bandwidth operation. A base station may transmit one or more RRC messages comprising configuration parameters of one or more CORESETs. A CORESET may comprise at least one of: a first OFDM symbol; a number of consecutive OFDM symbols; a set of resource blocks; and/or a CCE-to-REG mapping. A base station may send (e.g., transmit) a PDCCH in a dedicated CORESET for particular purpose, for example, for beam failure recovery confirmation. A wireless device may monitor a PDCCH for detecting DCI in one or more configured CORESETs, for example, to reduce the power consumption.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

Figure 16A:
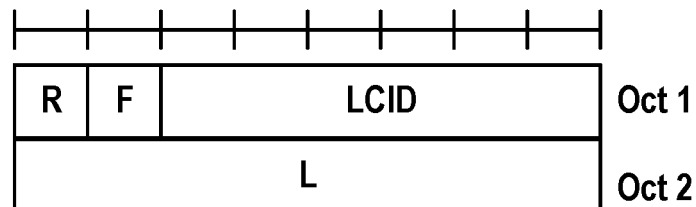
FIG. 16A, FIG. 16B and FIG. 16C show examples of MAC subheaders.

FIG. 16A shows an example of a MAC subheader comprising an eight-bit L field. The LCID field may have six bits in length. The L field may have eight bits in length.

Figure 16B:
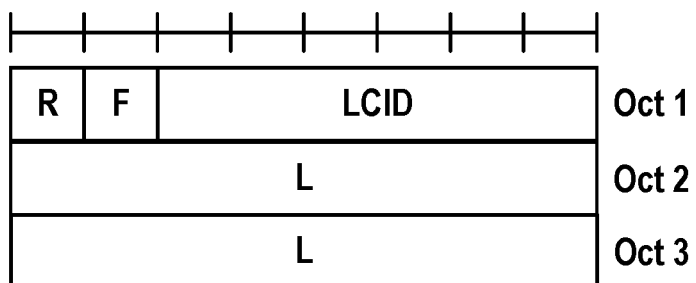

FIG. 16B shows an example of a MAC subheader with a sixteen-bit L field. The LCID field may have six bits in length. The L field may have sixteen bits in length. A MAC subheader may comprise: a R field comprising two bits in length; and an LCID field comprising multiple bits in length (e.g., if the MAC subheader corresponds to a fixed sized MAC CE), and/or padding.

Figure 16C:
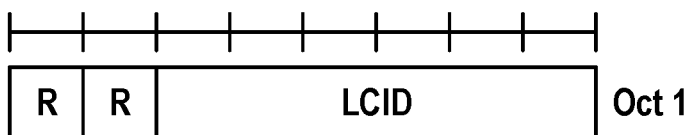

FIG. 16C shows an example of the MAC subheader. The LCID field may comprise six bits in length, and the R field may comprise two bits in length.

Figure 17A:
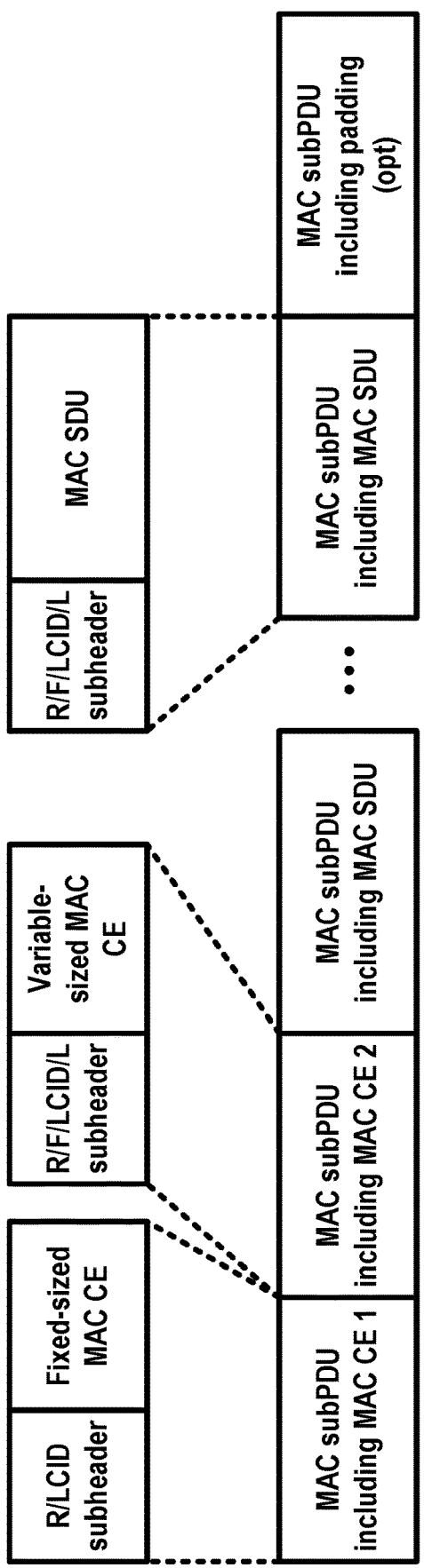
FIG. 17A and FIG. 17B show examples of MAC PDUs.

FIG. 17A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

Figure 17B:
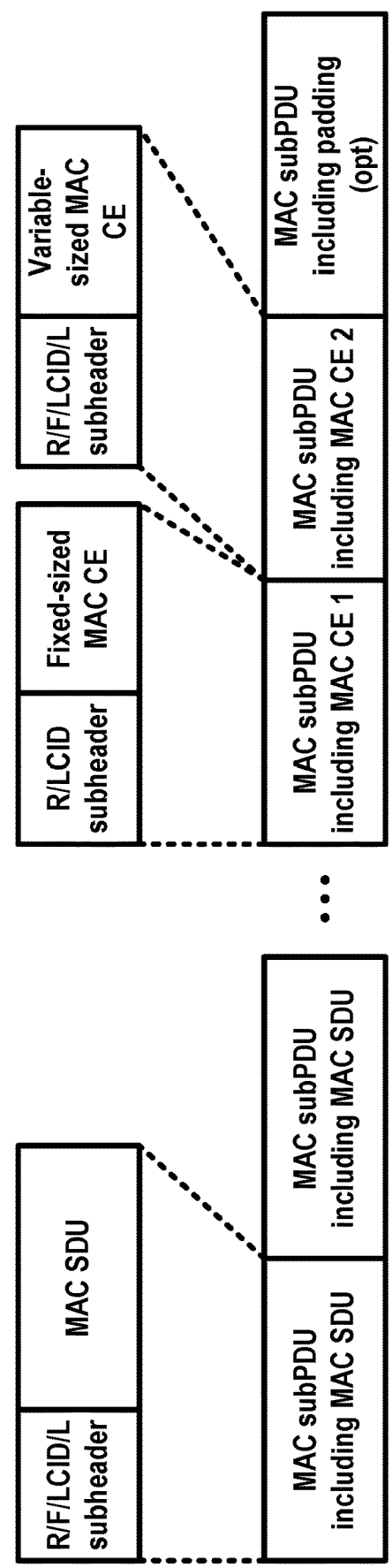

FIG. 17B shows an example of a UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 18 shows first examples of LCIDs. FIG. 19 shows second examples of LCIDs. In each of FIG. 18 and FIG. 19, the left columns comprise indices, and the right columns comprises corresponding LCID values for each index.

FIG. 18 shows an example of an LCID that may be associated with the one or more MAC CEs. A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

FIG. 19 shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may refrain from performing certain operations, for example, if an SCell is deactivated. The wireless device may refrain from performing one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 20A:
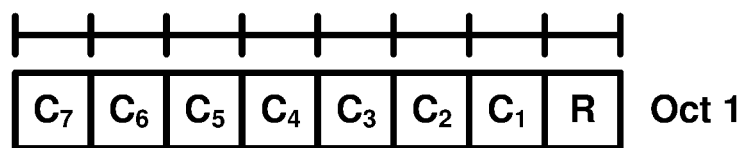
FIG. 20A and FIG. 20B show examples of secondary cell (SCell) Activation/Deactivation MAC CE.

FIG. 20A shows an example of an SCell activation/deactivation MAC CE that may comprise one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 20B:
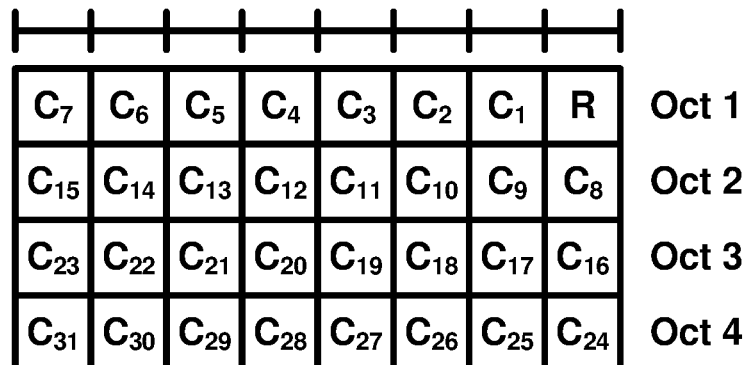

FIG. 20B shows an example of an SCell Activation/Deactivation MAC CE of four octets. A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station and/or a wireless device may use a power saving mechanism (e.g., hibernation mechanism) of an SCell, for example, if CA is configured. A power saving mechanism may improve battery performance (e.g., runtimes), reduce power consumption of the wireless device, and/or expedite SCell activation and/or SCell addition. The SCell may be transitioned (e.g., switched and/or adjusted) to dormant state if the wireless device initiates a power saving state for (e.g., hibernates) the SCell. The wireless device may, for example, if the SCell is transitioned to dormant state: stop transmitting SRS on the SCell, report CQI/PMI/RI/PTI/CRI for the SCell according to or based on a periodicity configured for the SCell in dormant state, not transmit on an UL-SCH on the SCell, not transmit on a RACH on the SCell, not monitor the PDCCH on the SCell, not monitor the PDCCH for the SCell, and/or not transmit PUCCH on the SCell. Not transmitting, not monitoring, not receiving, and/or not performing an action may comprise, for example, refraining from transmitting, refraining from monitoring, refraining from receiving, and/or refraining from performing an action, respectively. Reporting CSI for an SCell, that has been transitioned to a dormant state, and not monitoring the PDCCH on/for the SCell, may provide the base station an "always-updated" CSI for the SCell. The base station may use a quick and/or accurate channel adaptive scheduling on the SCell, based on the always-updated CSI, if the SCell is transitioned back to active state. Using the always-updated CSI may speed up an activation procedure of the SCell. Reporting CSI for the SCell and not monitoring the PDCCH on and/or for the SCell (e.g., that may have been transitioned to a dormant state), may provide advantages such as increased battery efficiency, reduced power consumption of the wireless device, and/or increased timeliness and/or accuracy of channel feedback information feedback. A PCell/PSCell and/or a PUCCH SCell, for example, may not be configured or transitioned to a dormant state.

A base station may activate, hibernate, or deactivate at least one of one or more configured SCells. A base station may send (e.g., transmit) to a wireless device, for example, one or more messages comprising parameters indicating at least one SCell being set to an active state, a dormant state, or an inactive state. A base station may transmit, for example, one or more RRC messages comprising parameters indicating at least one SCell being set to an active state, a dormant state, or an inactive state. A base station may transmit, for example, one or more MAC control elements (CEs) comprising parameters indicating at least one SCell being set to an active state, a dormant state, or an inactive state.

The wireless device may perform (e.g., if the SCell is in an active state): SRS transmissions on the SCell, CQI/PMI/RI/CRI reporting for the SCell, PDCCH monitoring on the SCell, PDCCH monitoring for the SCell, and/or PUCCH/SPUCCH transmissions on the SCell. The wireless device may (e.g., if the SCell is in an inactive state): not transmit SRS on the SCell, not report CQI/PMI/RI/CRI for the SCell, not transmit on an UL-SCH on the SCell, not transmit on a RACH on the SCell, not monitor PDCCH on the SCell, not monitor a PDCCH for the SCell; and/or not transmit a PUCCH/SPUCCH on the SCell. The wireless device may (e.g., if the SCell is in dormant state): not transmit SRS on the SCell, report CQI/PMI/RI/CRI for the SCell, not transmit on a UL-SCH on the SCell, not transmit on a RACH on the SCell, not monitor a PDCCH on the SCell, not monitor a PDCCH for the SCell, and/or not transmit a PUCCH/SPUCCH on the SCell.

A base station may send (e.g., transmit), for example, a first MAC CE (e.g., an activation/deactivation MAC CE). The first MAC CE may indicate, to a wireless device, activation or deactivation of at least one SCell. A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. A wireless device receiving a MAC CE may ignore the $C_i$ field, for example, if there is no SCell configured with SCell index i. An R field may indicate a reserved bit. The R field may be set to zero.

A base station may transmit a MAC CE (e.g., a hibernation MAC CE) that may generally be referred to herein as a second MAC CE. The second MAC CE may be the same as or different from other MAC CEs described herein, but is generally referred to herein as the second MAC CE. The second MAC CE may indicate activation and/or hibernation of at least one SCell to a wireless device. The second MAC CE may be associated with, for example, a second LCID different from a first LCID of the first MAC CE (e.g., the activation/deactivation MAC CE). The second MAC CE may have a fixed size. The second MAC CE may comprise a single octet comprising seven C-fields and one R-field.

FIG. 21A shows an example of a MAC CE (e.g., the second MAC CE referenced above) comprising a single octet. The second MAC CE may comprise four octets comprising 31 C-fields and one R-field. FIG. 21B shows an example of the second MAC CE comprising four octets. A second MAC CE (e.g., comprising four octets) may be associated with a third LCID. The third LCID may be different from the second LCID for the second MAC CE and/or the first LCID for activation/deactivation MAC CE. The second MAC CE (e.g., comprising one octet) may be used, for example, if there is no SCell with a serving cell index greater than a value (e.g., 7 or any other value). The second MAC CE (e.g., comprising four octets) may be used, for example, if there is an SCell with a serving cell index greater than a value (e.g., 7 or any other value). A second MAC CE may indicate a dormant/activated status of an SCell, for example, if a second MAC CE is received and a first MAC CE is not received. The $C_i$ field of the second MAC CE may indicate a dormant/activated status of an SCell with SCell index i if there is an SCell configured with SCell index i, otherwise the MAC entity may ignore the $C_i$ field. A wireless device may transition an SCell associated with SCell index i into dormant state, for example, if $C_i$ of the second MAC CE is set to "1". The wireless device may activate an SCell associated with SCell index i, for example, if $C_i$ of the second MAC CE is set to "0". The wireless device may activate the SCell with SCell index i, for example, if $C_i$ of the second MAC CE is set to "0" and the SCell with SCell index i is in dormant state. The wireless device may ignore the $C_i$ field of the second MAC CE, for example, if the $C_i$ field is set to "0" and the SCell with SCell index i is not in dormant state.

FIG. 21C shows example configurations of a field of the first MAC CE. The field may comprise, for example, a $C_i$ field of the first MAC CE (e.g., an activation/deactivation MAC CE), a $C_i$ field of the second MAC CE (e.g., a hibernation MAC CE), and corresponding resulting SCell status (e.g., activated/deactivated/dormant). The wireless device may deactivate an SCell associated with SCell index i, for example, if $C_i$ of hibernation MAC CE is set to 0, and $C_i$ of the activation/deactivation MAC CE is set to 0. The wireless device may activate an SCell associated with SCell index i, for example, if $C_i$ of hibernation MAC CE is set to 0, and $C_i$ of the activation/deactivation MAC CE is set to 1. The wireless device may ignore the hibernation MAC CE and the activation/deactivation MAC CE, for example, if $C_i$ of hibernation MAC CE is set to 1, and $C_i$ of the activation/deactivation MAC CE is set to 0. The wireless device may transition an SCell associated with SCell index I to a dormant state, for example, if $C_i$ of hibernation MAC CE is set to 1, and $C_i$ of the activation/deactivation MAC CE is set to 1.

Figure 22:
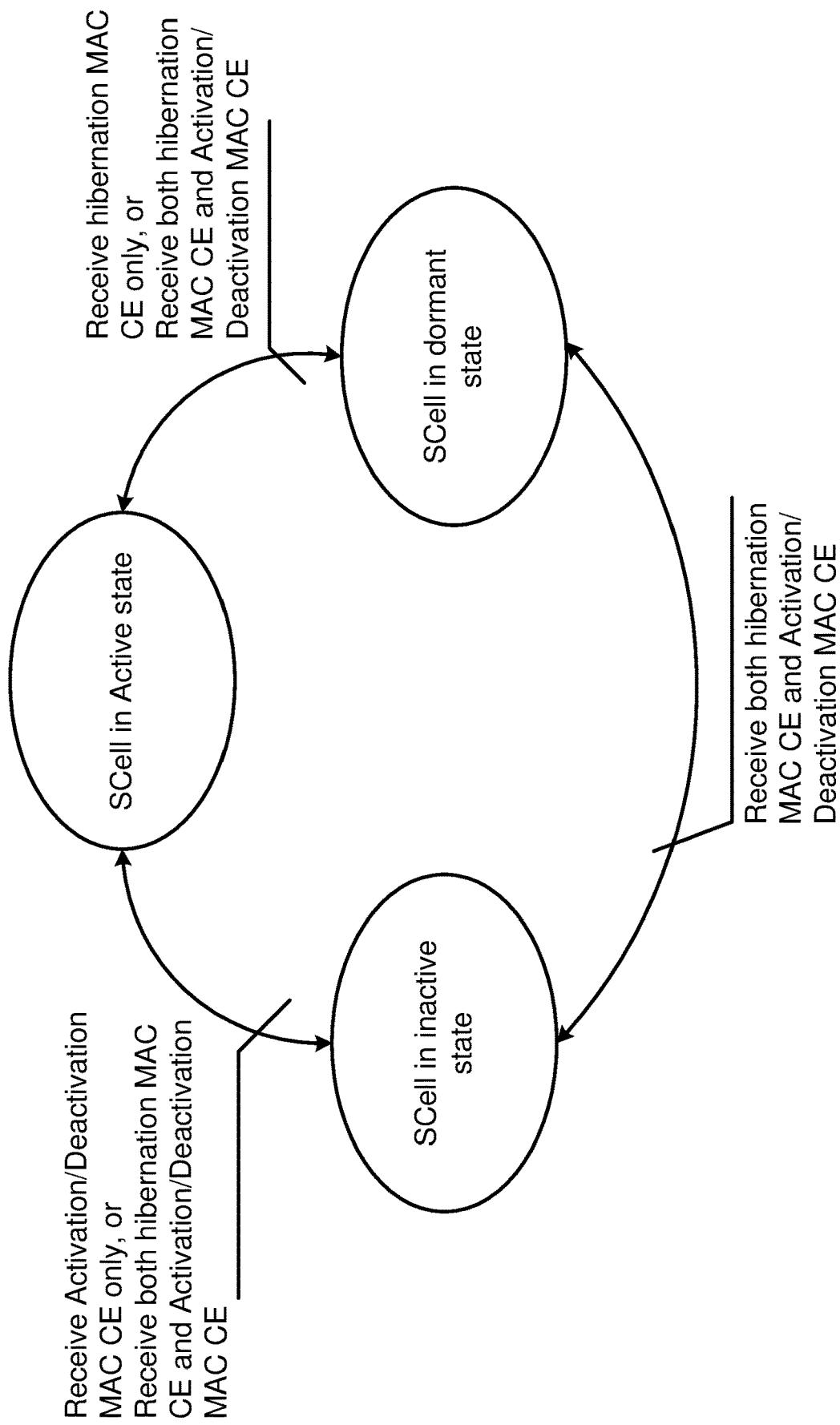
FIG. 22 shows an example for SCell state transition.

FIG. 22 shows an example of SCell state transitions. The SCell state transitions may be based on an activation/deactivation MAC CE and/or a hibernation MAC CE. A first MAC CE (e.g., activation/deactivation MAC CE) and a second MAC CE (e.g., hibernation MAC CE) may indicate possible state transitions of the SCell with SCell index i if there is an SCell configured with SCell index i, and if both the first MAC CE and the second MAC CE are received, otherwise the MAC entity may ignore the $C_i$ fields. The $C_i$ fields of the two MAC CEs may be interpreted according to FIG. 21C. A first MAC CE (e.g., activation/deactivation MAC CE) or a second MAC CE (e.g., hibernation MAC CE) may indicate possible state transitions of the SCell with SCell index i, for example, if there is an SCell configured with SCell index i, and if one of the first MAC CE and the second MAC CE is received. A MAC entity of a wireless device may, for example, deactivate an SCell, for example, if the MAC entity receives a MAC CE(s) (e.g., activation/deactivation MAC CE) indicating deactivation of an SCell. The MAC entity may, based on the MAC CE(s): deactivate the SCell, stop an SCell deactivation timer associated with the SCell, and/or flush all HARQ buffers associated with the SCell.

A base station may activate, hibernate, and/or deactivate at least one of one or more SCells, for example, if the base station is configured with the one or more SCells. A MAC entity of a base station and/or a wireless device may maintain an SCell deactivation timer (e.g., sCellDeactivationTimer), for example, per a configured SCell and/or except for an SCell configured with PUCCH/SPUCCH, if any. The MAC entity of the base station and/or the wireless device may deactivate an associated SCell, for example, if an SCell deactivation timer expires. A MAC entity of a base station and/or a wireless device may maintain dormant SCell deactivation timer (e.g., dormantSCellDeactivationTimer), for example, per a configured SCell and/or except for an SCell configured with PUCCH/SPUCCH, if any. The MAC entity of the base station and/or the wireless device may deactivate an associated SCell, for example, if the dormant SCell deactivation timer expires (e.g., if the SCell is in dormant state).

A MAC entity of a base station and/or a wireless device may, for example, maintain an SCell hibernation timer (e.g., sCellHibernationTimer), for example, per a configured SCell and/or except for an SCell configured with PUCCH/SPUCCH, if any. The MAC entity of the base station and/or the wireless device may hibernate an associated SCell, for example, if the SCell hibernation timer expires (e.g., if the SCell is in active state). The SCell hibernation timer may take priority over the SCell deactivation timer, for example, if both the SCell deactivation timer and the SCell hibernation timer are configured. A base station and/or a wireless device may ignore the SCell deactivation timer regardless of the SCell deactivation timer expiry, for example, if both the SCell deactivation timer and the SCell hibernation timer are configured.

Figure 23:
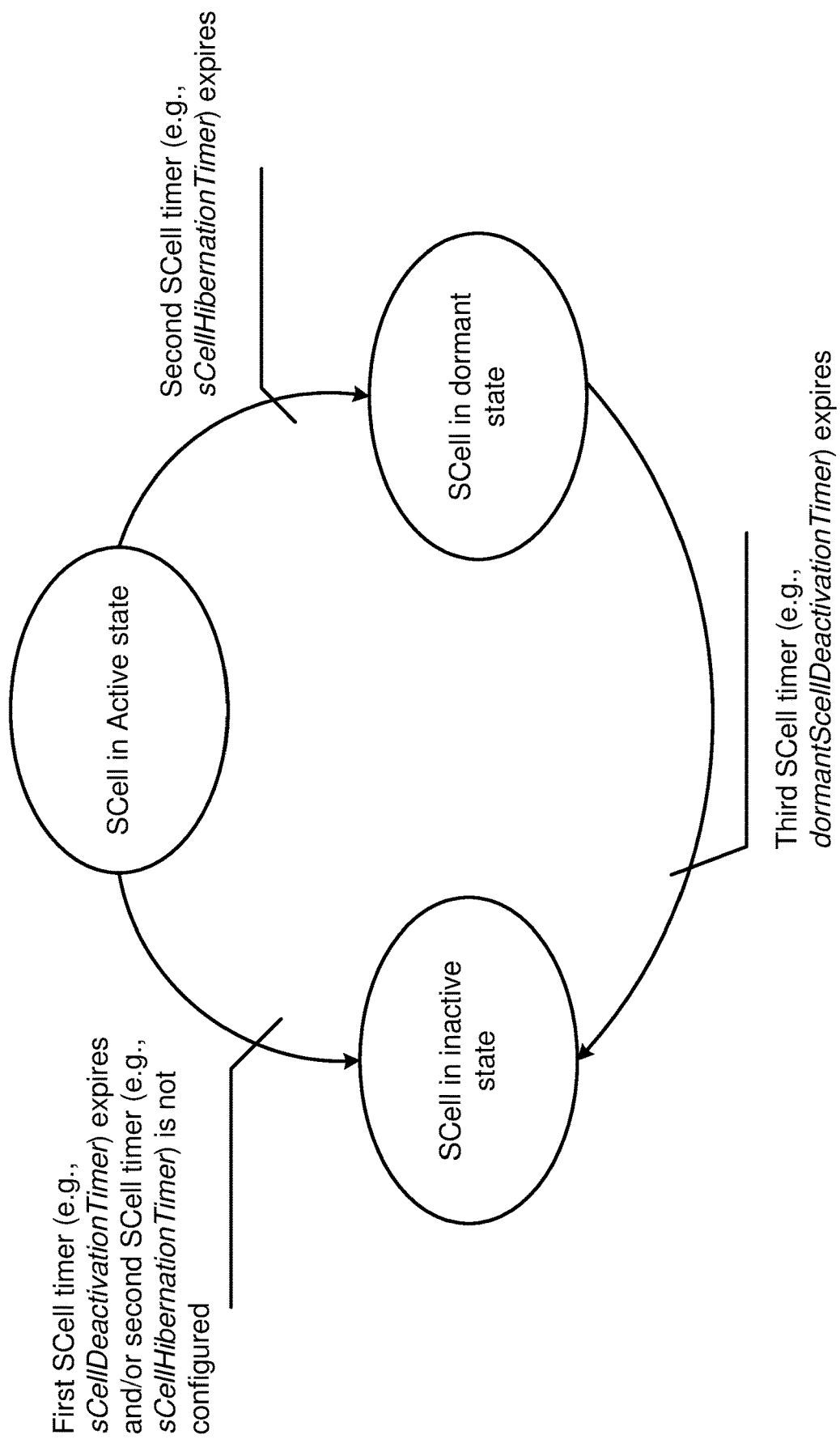
FIG. 23 shows an example for SCell state transition.

FIG. 23 shows an example of SCell states (e.g., state transitions, state switching, etc.). The SCell state transitions may be based on, for example, a first SCell timer (e.g., an SCell deactivation timer or sCellDeactivationTimer), a second SCell timer (e.g., an SCell hibernation timer or sCellHibernationTimer), and/or a third SCell timer (e.g., a dormant SCell deactivation timer or dormantSCellDeactivationTimer). A base station (e.g., a MAC entity of a base station) and/or a wireless device (e.g., a MAC entity of a wireless device) may, for example, implement the SCell state transitions based on expiration of the first SCell timer, the second SCell timer, and/or the third SCell. The base station and/or the wireless device may, for example, implement the SCell state transitions based on whether or not a timer (e.g., the second SCell timer) is configured. A base station (e.g., a MAC entity of a base station) and/or a wireless device (e.g., a MAC entity of a wireless device) may (e.g., if an SCell deactivation timer expires and an SCell hibernation timer is not configured): deactivate an SCell, stop the SCell deactivation timer associated with the SCell, and/or flush all HARQ buffers associated with the SCell.

A wireless device (e.g., MAC entity of a wireless device) may activate an SCell, for example, if the MAC entity is configured with an activated SCell at SCell configuration. A wireless device (e.g., MAC entity of a wireless device) may activate an SCell, for example, if the wireless device receives a MAC CE(s) activating the SCell. The wireless device (e.g., MAC entity of a wireless device) may start or restart an SCell deactivation timer associated with an SCell, for example, based on or in response to activating the SCell. The wireless device (e.g., MAC entity of a wireless device) may start or restart an SCell hibernation timer (e.g., if configured) associated with an SCell, for example, based on or in response to activating the SCell. A wireless device (e.g., MAC entity of a wireless device) may trigger a PHR procedure, for example, based on or in response to activating an SCell.

A wireless device (e.g., MAC entity of a wireless device) and/or a base station (e.g., a MAC entity of a base station) may (e.g., if a first PDCCH on an SCell indicates an uplink grant or downlink assignment, or a second PDCCH on a serving cell scheduling the SCell indicates an uplink grant or a downlink assignment for the SCell, or a MAC PDU is transmitted in a configured uplink grant or received in a configured downlink assignment) restart an SCell deactivation timer associated with an activated SCell and/or restart an SCell hibernation timer (e.g., if configured) associated with the SCell. An ongoing random access (RA) procedure on an SCell may be aborted, for example, if, the SCell is deactivated.

A wireless device (e.g., MAC entity of a wireless device) and/or a base station (e.g., a MAC entity of a base station) may (e.g., if configured with an SCell associated with an SCell state set to dormant state upon the SCell configuration, or if receiving MAC CE(s) for transitioning the SCell to dormant state): set (e.g., transition) the SCell to dormant state, stop an SCell deactivation timer associated with the SCell, stop an SCell hibernation timer (if configured) associated with the SCell, start or restart a dormant SCell deactivation timer associated with the SCell, and/or flush all HARQ buffers associated with the SCell. The wireless device (e.g., MAC entity of a wireless device) and/or a base station (e.g., a MAC entity of a base station) may (e.g., if the SCell hibernation timer associated with the activated SCell expires): hibernate the SCell, stop the SCell deactivation timer associated with the SCell, stop the SCell hibernation timer associated with the SCell, and/or flush all HARQ buffers associated with the SCell. The wireless device (e.g., MAC entity of a wireless device) and/or a base station (e.g., a MAC entity of a base station) may (e.g., if a dormant SCell deactivation timer associated with a dormant SCell expires): deactivate the SCell and/or stop the dormant SCell deactivation timer associated with the SCell. Ongoing RA procedure on an SCell may be aborted, for example, if the SCell is in dormant state.

A base station (e.g., a gNB) may configure a wireless device (e.g., a UE) with UL BWPs and DL BWPs to enable BA on a PCell. The base station may further configure the wireless device with at least DL BWP(s) (e.g., there may be no UL BWPs in the UL) to enable BA on an SCell, if CA is configured. An initial active BWP may be a first BWP used for initial access, for example, for the PCell. A first active BWP may be a second BWP configured for the wireless device to operate on the SCell, upon the SCell being activated. A base station and/or a wireless device may independently switch a DL BWP and an UL BWP, for example, if operating in a paired spectrum (e.g., FDD). A base station and/or a wireless device may simultaneously switch a DL BWP and an UL BWP, for example, if operating in an unpaired spectrum (e.g., TDD).

A base station and/or a wireless device may switch a BWP between configured BWPs, for example, based on a DCI or a BWP inactivity timer. A base station and/or a wireless device may switch an active BWP to a default BWP, for example, based on or in response to an expiry of a BWP inactivity timer, if configured, associated with a serving cell. The default BWP may be configured by the network.

One UL BWP for each uplink carrier and one DL BWP, for example, may be active at a time in an active serving cell, for example, for FDD systems that are configured with BA. One DL/UL BWP pair, for example, may be active at a time in an active serving cell, for example, for TDD systems. Operating on the one UL BWP and the one DL BWP (or the one DL/UL BWP pair) may, for example, improve wireless device battery consumption. BWPs other than the one active UL BWP and the one active DL BWP that the wireless device may work on may be deactivated. On deactivated BWPs, the wireless device may: not monitor PDCCH and/or not transmit on a PUCCH, PRACH, and/or UL-SCH.

A serving cell may be configured with any number of BWPs (e.g., up to four, or up to any other number of BWPs). There may be, for example, one or any other number of active BWPs at any point in time for an activated serving cell.

BWP switching for a serving cell may be used, for example, to activate an inactive BWP and/or deactivate an active BWP (e.g., at a time t). The BWP switching may be controlled, for example, by a PDCCH indicating a downlink assignment and/or an uplink grant. The BWP switching may be controlled, for example, by a BWP inactivity timer (e.g., bwp-InactivityTimer). The BWP switching may be controlled, for example, by a MAC entity based on or in response to initiating an RA procedure. One or more BWPs may be initially active, without receiving a PDCCH indicating a downlink assignment or an uplink grant, for example, if an SpCell is added or an SCell is activated. The active BWP for a serving cell may be indicated by RRC message and/or PDCCH. A DL BWP may be paired with an UL BWP, and BWP switching may be common for both UL and DL, for example, for unpaired spectrum.

Figure 24:
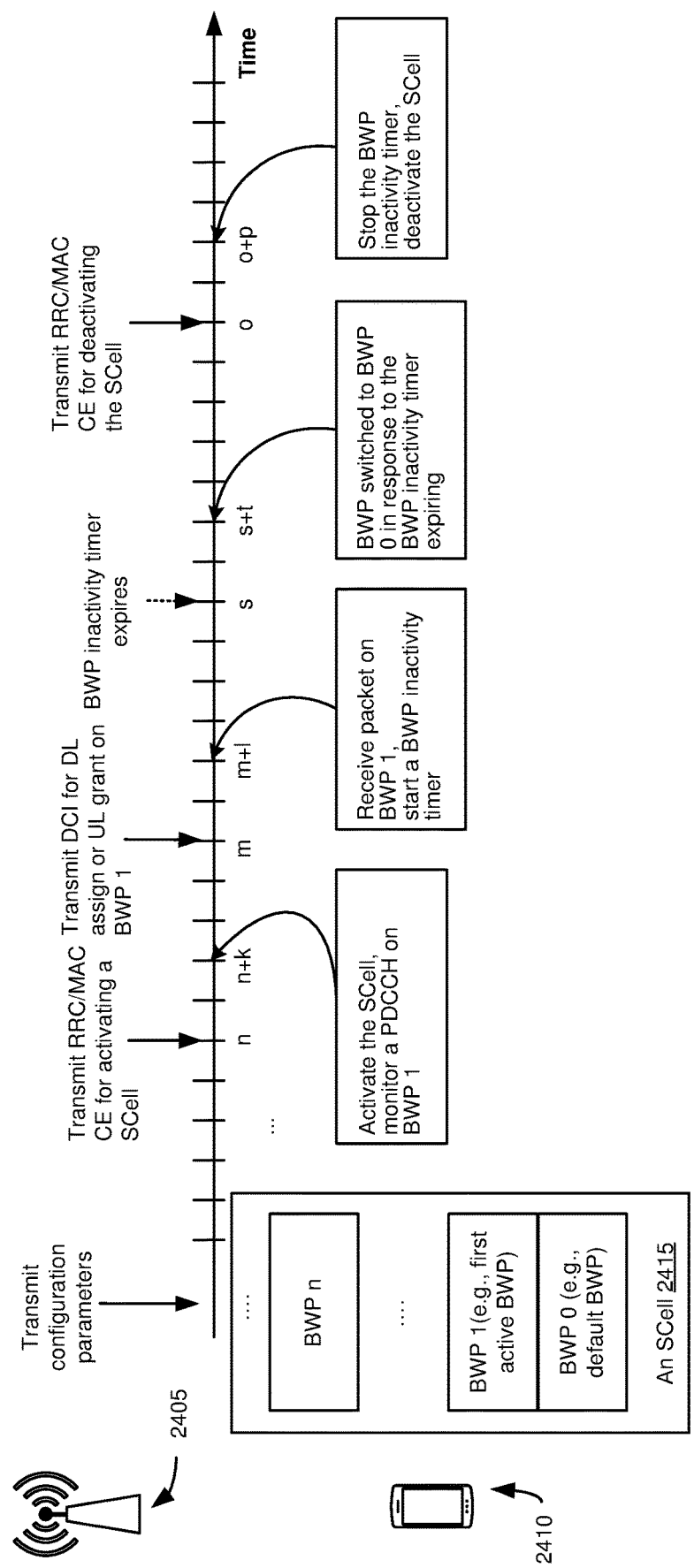
FIG. 24 shows an example of BWP switching for an SCell.

FIG. 24 shows an example of BWP switching for an SCell. A base station 2405 may send (e.g., transmit) one or more messages, to a wireless device 2410. The one or more messages may be for configuring BWPs corresponding to the SCell 2415. The one or more messages may comprise, for example, one or more RRC messages (e.g., RRC connection reconfiguration message, and/or RRC connection reestablishment message, and/or RRC connection setup message). The configured BWPs may comprise BWP 0, BWP 1, . . . BWP n. The BWP 0 may be configured as a default BWP. The BWP 1 may be configured as a first active BWP. At time n, the base station 2405 may send (e.g., transmit) an RRC message and/or a MAC CE for activating the SCell. At or after time n+k, and based on the reception of the RRC message and/or the MAC CE, the wireless device 2410 may activate the SCell and start monitoring a PDCCH on the BWP 1 (e.g., the first active BWP). At or after time m, the base station 2405 may send (e.g., transmit) DCI for DL assignment or UL grant on the BWP 1. At or after time m+1, the wireless device 2410 may receive a packet on the BWP 1 and may start a BWP inactivity timer (e.g., bwp-InactivityTimer). At time s, the BWP inactivity timer may expire. At or after time s+t, a BWP may switch to BWP 0 based on expiration of the BWP inactivity timer. BWP switching may comprise, for example, activating the BWP 0 and deactivating the BWP 1. At time o, the base station 2405 may send (e.g, transmit) an RRC message and/or a MAC CE for deactivating an SCell. At or after time o+p, the wireless device 2410 may stop the BWP inactivity timer and deactivate the SCell 2415.

A MAC entity may perform operations, on an active BWP for an activated serving cell (e.g., configured with a BWP), comprising: transmitting on an UL-SCH; transmitting on a RACH, monitoring a PDCCH, transmitting on a PUCCH, receiving DL-SCH, and/or (re-) initializing any suspended configured uplink grants of configured grant Type 1 according to a stored configuration, if any. On an inactive BWP for each activated serving cell configured with a BWP, a MAC entity may, for example: not transmit on an UL-SCH, not transmiton a RACH, not monitor a PDCCH, not transmit on a PUCCH, not transmit a SRS, not receive a DL-SCH, clear any configured downlink assignment and configured uplink grant of configured grant Type 2, and/or suspend any configured uplink grant of configured Type 1. A wireless device may perform the BWP switching to a BWP indicated by the PDCCH, for example, if a MAC entity receives a PDCCH for a BWP switching of a serving cell and a RA procedure associated with this serving cell is not ongoing.

A bandwidth part indicator field value may indicate an active DL BWP, from a configured DL BWP set, for DL receptions for example, if the bandwidth part indicator field is configured in DCI format 1_1. A bandwidth part indicator field value, may indicate an active UL BWP, from a configured UL BWP set, for UL transmissions, for example, if the bandwidth part indicator field is configured in DCI format 0_1. A wireless device may be provided by a higher layer parameter, a default DL BWP among the configured DL BWPs (e.g., Default-DL-BWP), for a PCell. A default BWP may be an initial active DL BWP, for example, if a wireless device is not provided a default DL BWP by higher layer parameter Default-DL-BWP.

A wireless device may be provided by a higher layer parameter a timer value corresponding to a BWP inactivity timer for the Pcell (e.g., bwp-InactivityTimer). The wireless device may increment the timer, if running, for example, every interval of 1 millisecond (or any other first duration) for frequency range 1 (or any other first frequency range) or every 0.5 milliseconds (or any other second duration) for frequency range 2 (or any other second frequency range), for example, if: the wireless device does not detect a DCI format 1_1 for paired spectrum operation, or the wireless device does not detect a DCI format 1_1 or DCI format 0_1 for unpaired spectrum operation, during the interval.

Wireless device procedures on an SCell may be similar to or the same as procedures on a PCell, for example, if the wireless device is configured for the SCell with a higher layer parameter indicating a default DL BWP among configured DL BWPs (e.g., Default-DL-BWP), and/or if the wireless device is configured with a higher layer parameter indicating a timer value (e.g., bwp-InactivityTimer). The wireless device procedures on the SCell may use the timer value for the SCell and the default DL BWP for the SCell. The wireless device may use, as first active DL BWP and first active UL BWP on the SCell or secondary cell, an indicated DL BWP and an indicated UL BWP on the SCell, respectively, if a wireless device is configured, for example, by a higher layer parameter for the DL BWP (e.g., Active-BWP-DL-SCell), and/or by a higher layer parameter for the UL BWP on the SCell or secondary cell (e.g., Active-BWP-UL-SCell).

In some wireless communications technologies/systems, a base station and/or a wireless device may, maintain an SCell in an active state, a dormant state, or an inactive state. In some wireless communications systems/technologies, a base station and/or a wireless device may maintain an SCell in an active state or an inactive state. In at least some configurations of wireless communications technologies/systems, at most one BWP, of one or more BWPs, of the SCell may be in active state, for example, if the SCell is in an active state. All the one or more BWPs of the SCell may be in inactive state, for example, if the SCell is in an inactive state. As described herein, using, causing, and/or transitioning (e.g., switching and/or adjusting) an SCell to dormant state may, for example, reduce power consumption of a wireless device and/or provide up-to-date channel information feedback of an SCell to a base station. The up-to-date channel information feedback of the SCell may allow the base station to have a quick and accurate channel adaptive scheduling for the SCell, for example, if the SCell is activated.

At least some CA and/or BWP management mechanisms may not indicate the status and/or state of BWP(s) of an SCell, configured with multiple BWPs, for example, if the SCell is transitioned (e.g., switched and/or adjusted) to a dormant state. At least some CA or BWP management mechanisms may result in misalignment of a BWP status between a base station and a wireless device, for example, if an SCell is transitioned to a dormant state. Misalignment of the BWP status between the base station and the wireless device may cause extra data transmission delay and/or connection delay. At least some CA or BWP management mechanisms may result in extra power consumption at a wireless device if an SCell is transitioned to dormant state. As described herein, wireless communication resource management (e.g., BWP status management) using a power saving state (e.g., dormant state) may provide enhancements for a wireless device and/or a base station, for example, if an SCell is in dormant state, inactive state, or active state. Such BWP status management may, for example, alleviate issues related to misalignment of BWP status between a wireless device and a base station and/or reduce power consumption at a wireless device (e.g., if an SCell is transitioned to dormant state). Such BWP status management may, for example, reduce signaling overhead, and increase system throughput. Techniques for conservation of power in wireless communications may use, for example, DRX, SCell activation/deactivation, bandwidth part (BWP) switching, wakeup signals/channel, multiple TRPs, and/or other power saving mechanisms.

In some wireless communications technologies/systems, a wireless device may monitor a power saving channel for receiving a power saving command. The wireless device may stop monitoring (e.g., stop PDCCH monitoring), based on or in response to receiving the power saving command (e.g., in a DRX on duration). Monitoring the power saving channel in this manner may result in increased power consumption. As described herein, to reduce power consumption, monitoring the power saving channel and monitoring a normal PDCCH may be separately and/or independently configured (e.g., based on a control resource set of the monitoring). For example, a base station may configure first control resource sets for a normal power state and second control resource sets for a power saving state for a wireless device. In a normal power state, the wireless device may monitor the first control resource sets for reception of DCI for a DL assignment or an UL grant. In power saving state (e.g., which may be triggered based on the wireless device receiving a power saving command), the wireless device may stop monitoring the first control resource sets and start monitoring the second control resource set. The second control resource set may comprise less time and/or frequency resources than the first control resource sets. As a result, the wireless device may reduce power consumption in the power saving state by only monitoring a control resource set of a reduced size relative to a control resource set for another state (e.g., a non-power saving state, a normal power state, an active state, etc.), and/or the base station may improve downlink resource utilization efficiency.

In some wireless communications technologies/systems, a base station may configure a wireless resource (e.g., a BWP) of the cell as a power saving resource (e.g., a dormant resource such as a dormant BWP) of the cell for CSI report in a power saving state (e.g., a dormant state). The wireless device may send (e.g., transmit) a CSI report for the power saving resource (e.g., dormant BWP) based on or in response to the cell being in the power saving state (e.g., dormant state). Continuing to transmit CSI reports for the power saving resource (e.g., dormant BWP) in the power saving state (e.g., dormant state) may not be efficient and quick for reactivation of the cell. As described herein, state management (e.g., BWP state management) may be improved if power saving operation is supported. For example, a power saving resource (e.g., dormant BWP) may be dynamically changed based on an active state of a BWP, if a cell is activated or deactivated. The wireless device may operate on a first wireless resource (e.g., first BWP) of a cell, wherein the first wireless resource (e.g., first BWP) may be in an active state. The wireless device may transition the first wireless resource (e.g., first BWP) to a power saving state (e.g., dormant state), based on or in response to the cell being switched into the power saving state (e.g., dormant state). Based on or in response to transitioning the first wireless resource (e.g., first BWP) into the power saving state (e.g., dormant state), the wireless device may send (e.g., transmit) one or more CSI reports for the first wireless resource (e.g., first BWP). As a result, the wireless device may continue to transmit CSI reports for the first wireless resource (e.g., first BWP) of a cell even if the cell is transitioned to a power saving state (e.g., dormant state), wherein the first wireless resource (e.g., first BWP) may be an active wireless resource (e.g., active BWP) before the transition. Based on a CSI report received from a wireless device, a base station may be enabled to quickly activate the first wireless resource (e.g., first BWP) and transmit on the first wireless resource (e.g., first BWP) of the cell if the cell is activated again, which may reduce latency for resource (e.g., BWP) and/or cell activation and/or transition latency, and/or which may increase system throughput.

In some wireless communications technologies/systems, after transitioning to a power saving state (e.g., dormant state), the wireless device may transmit a CSI report for a cell in the power saving state. Before the transitioning from an active state to the power saving state, the wireless device may have ongoing transmission of a periodic CSI (P-CSI) report, an aperiodic CSI (A-CSI) report, and/or a semi-persistent CSI (SP-CSI) report. The wireless device may have difficulty in determining which one or more of the P-CSI/A-CSI/SP-CSI shall be continued, suspended, and/or stopped after transitioning to the power saving state. As described herein, CSI reporting mechanisms may be improved if power saving operation is supported, for example, by the wireless device continuing P-CSI report transmission after transitioning to the power saving state, suspending the SP-CSI report transmission after transitioning to the power saving state, and stopping the A-CSI report transmission (if triggered) after transitioning to the power saving state. As a result, the wireless device may align with a base station regarding whether a CSI report (P/A/SP) shall be stopped, continued, or suspended. Additionally or alternatively, the wireless device and the base station may be aligned with other reporting mechanisms that may continue, suspend, or stop one or more of a P/A/SP CSI report. The wireless device, by suspending the SP-CSI report, may maintain configuration parameters (e.g., RRC and/or MAC layer) of the activated SP-CSI report. With this CSI reporting mechanism, the base station and/or the wireless device may, for example, improve uplink resource allocation efficiency, reduce signaling overhead for triggering CSI reporting, and/or improve power consumption of a wireless device.

In some wireless communications technologies/systems, for a cell in a power saving state (e.g., dormant state), a wireless device may send (e.g., transmit) a first CSI report using a PUCCH resource on a PCell or a PUCCH SCell. The PUCCH resource may be configured to be shared with a PUCCH resource for a second CSI report if the wireless device sends (e.g., transmits) a second CSI report for the cell in another state (e.g., a normal power state, an active state, a non-power saving state, etc.). Transmitting CSI reporting in the power saving state by using a PUCCH resource allocated for another power state (e.g., a normal power state, an active state, a non-power saving state, etc.) may decrease uplink resource utilization efficiency. As described herein, transmission power for CSI report in a power saving state may be reduced, for example, by configuring a wireless device with first PUCCH resources for a CSI report in a normal power state and configuring the wireless device with second PUCCH resources for a CSI report in a power saving state. The second PUCCH resources may be smaller than the first PUCCH resources. A CSI report in a power saving state may occupy less PUCCH resources than a CSI report in another power state (e.g., a normal power state, an active state, a non-power saving state, etc.), for example, if multiple beams are configured. In a normal power state, the wireless device may send (e.g., transmit) a first CSI report via the first PUCCH resources. If switched or switching from the normal power state to the power saving state, the wireless device may send (e.g., transmit) a second CSI report via the second PUCCH resources. As a result, the base station may configure a smaller size of PUCCH dedicated for CSI of an SCell in a power saving state (e.g., dormant state), which may improve uplink resource efficiency.

In some wireless communications technologies/systems, a wireless device may operate on a single active wireless resource (e.g., single active BWP) of a cell, if the cell is in active state. Operating on the single active wireless resource of the cell may prevent a quick resource switching (e.g., BWP switching) on the cell. To improve wireless resource switching (e.g., BWP switching) latency, the wireless device may operate on multiple active wireless resources (e.g., multiple active BWPs), if the cell is in active state. Always operating on multiple active wireless resources (e.g., multiple active BWPs) of the cell may increase power consumption. As described herein, state management (e.g., BWP state management) may be improved to provide quicker wireless resource switching (e.g., BWP switching) and power saving. For example, a wireless device may activate a cell based on an RRC message or a MAC CE. Based on or in response to activating the cell, the wireless device may activate a first wireless resource (e.g., first BWP) of the cell and maintain a second wireless resource (e.g., second BWP) of the cell in dormant state. The wireless device may send (e.g., transmit) a first CSI report for the first BWP and a second CSI report for the second BWP, based on or in response to the first wireless resource (e.g., first BWP) being in an active state and the second BWP being in a power saving state (e.g., dormant state) at a time that the cell is in an active state. The base station may receive a first CSI report for an active wireless resource (e.g., active BWP) of a cell and a second CSI report for a power saving resource (e.g., dormant BWP) of the cell. Based on the second CSI report, the base station may be enabled to quickly switch from the first wireless resource (e.g., first BWP) to the second wireless resource (e.g., second BWP) of a cell if the cell is in an active state, which may reduce wireless resource switching (e.g., BWP switching) latency, and/or improve data transmission throughput.

In some wireless communications technologies/systems, if multiple transmission reception points (TRPs) are supported, a wireless device may spend more power for transmission or reception via the multiple TRPs. The wireless device may not be required to maintain connections with the multiple TRPs, for example, if the wireless device does not have much or any data traffic to transmit and/or receive. As described herein, TRP management may be improved, for example, for power saving purposes. A wireless device may maintain a connection with a base station on a first TRP of a cell. The wireless device may activate a second TRP of the cell, for example, if the wireless device receives a command via the first TRP of the cell. Based on or in response to activating the second TRP, the wireless device may start monitoring a downlink control channel of the second TRP. Based on the monitoring, the wireless device may receive one or more data packets via the second TRP. A base station may send (e.g., transmit) a command activating/deactivating a second TRP of a cell via a first TRP of the cell. The command-based activation/deactivation of a second TRP may improve power consumption of a wireless device and/or may provide improved system throughput (e.g., for a base station and/or a wireless device).

A base station may send (e.g., transmit), to a wireless device, one or more messages comprising configuration parameters of one or more cells. The one or more messages may comprise, for example, one or more RRC messages (e.g., RRC connection reconfiguration message, and/or RRC connection reestablishment message, and/or RRC connection setup message). A first cell of the one or more cells may be, for example, a PCell or a PSCell. A second cell of the one or more cells may be an SCell, for example, if carrier aggregation and/or dual connectivity is configured. The second cell may be associated with an SCell state indicator (e.g., sCellState), for example, if a second cell is an SCell configured without PUCCH. An SCell state indicator associated with an SCell may be set to one of an active state (e.g., "activated"), a dormant state (e.g., "dormant"), or an inactive state (e.g., "inactive"). An SCell state indicator associated with an SCell may be set to one of "activated" or "dormant" states. An SCell may be set to inactive state, for example, if the SCell is configured without the SCell state indicator (e.g., if the SCell state indicator is absent). An SCell may be set to dormant state, for example, if the SCell is configured without the SCell state indicator (e.g., if the SCell state indicator is absent). Configuration parameters, associated with at least one of the one or more cells, may further indicate a first value of a first SCell timer (e.g., sCellDeactivationTimer), a second value of a second SCell timer (e.g., sCellHibernationTimer), and/or a third value of a third SCell timer (e.g., dormantSCellDeactivationTimer).

A cell of one or more cells (e.g., an SCell) may comprise, for example, a plurality of DL BWPs, where each of the plurality of DL BWPs may be associated with a first BWP identifier (BWP ID) (e.g., a first BWP specific ID) and one or more first parameters. The cell may comprise, for example, a plurality of UL BWPs, where each of the plurality of UL BWPs may be associated with a second BWP ID (e.g., a second BWP specific ID) and one or more second parameters. The one or more first parameters may comprise at least one of: a CORESET indicated by a CORESET index, a subcarrier spacing, a cyclic prefix, a DM-RS scrambling sequence initialization value, a number of consecutive symbols, a set of resource blocks in frequency domain, a CCE-to-REG mapping, a REG bundle size, a cyclic shift for a REG bundle, an antenna port quasi-co-location, and/or an indication for a presence or absence of a TCI field for DCI format 1_0 or 1_1 transmitted on the CORESET.

Each of a plurality of DL BWPs may be in one of active state and inactive state, for example, if a wireless device and/or a base station does not support a BWP in dormant state. A wireless device may perform operations on a BWP (DL or UL) in an active state comprising: transmitting on an UL-SCH, transmitting on a RACH if configured, monitoring a PDCCH transmitting on a PUCCH; receiving on a DL-SCH, and/or (re-) initializing any suspended configured uplink grants of configured grant Type 1 according to a stored configuration, if any. On a BWP (DL or UL) in an inactive state, the wireless device: may not transmit on an UL-SCH, may not transmit on a RACH if configured, may not monitor a PDCCH, may not transmit on a PUCCH, may not transmit a SRS if configured, may not receive on a DL-SCH, may clear any configured downlink assignment and configured uplink grant of configured grant Type 2, and/or may suspend any configured uplink grant of configured Type 1.

Each of the plurality of the downlink BWPs may be, for example, in one of active state, inactive state, and dormant state. A wireless device may perform operations on a BWP (DL or UL) in an active state comprising: transmitting on an UL-SCH, transmitting on a RACH, monitoring a PDCCH, transmitting on a PUCCH, receiving on a DL-SCH, and/or (re-) initializing any suspended configured uplink grants of configured grant Type 1 according to a stored configuration, if any A wireless device (e.g., if a BWP (DL or UL) is deactivated (or in inactive state)): may not transmit on an UL-SCH on the BWP, may not transmit on a RACH on the BWP, may not monitor a PDCCH on the BWP, may not transmit a PUCCH on the BWP, may not transmit SRS on the BWP, may not receive a DL-SCH on the BWP, may clear any configured downlink assignment and configured uplink grant of configured grant Type 2 on the BWP, and/or may suspend any configured uplink grant of configured Type 1 on the (inactive) BWP. A wireless device (e.g., if a BWP (DL or UL) of an SCell is in dormant state): may transmit one or more CSI reports and/or RRM report for the BWP (e.g., DL) of the SCell, may transmit SRS, if configured, on the BWP (e.g., UL) of the SCell, may not transmit on a UL-SCH on the BWP, may not transmit on a RACH, if configured, on the BWP, may not monitor a PDCCH on the BWP, may not receive DL-SCH on the BWP, may clear any configured downlink assignment and configured uplink grant of configured grant Type 2, and/or may suspend any configured uplink grant of configured Type 1. A CSI report may be, for example, at least one of: channel quality indicator (e.g., CQI), precoding matrix indicator (e.g., PMI), CSI-RS resource indicator (e.g., CRI), SS/PBCH block resource indicator (e.g., SSBRI), layer indicator (e.g., LI), rank indicator (e.g., RI), and/or L1-RSRP. A wireless device may not transmit SRS (if configured) on a BWP of an SCell, for example, if a BWP (DL and/or UL) of the SCell is in dormant state. A base station may indicate, for example, in an RRC message, whether a wireless device transmits or does not transmit SRS if an SCell is in dormant state. A CSI report may be, for example, a periodic CSI report, a semi-persistent CSI (SP CSI) report, or an aperiodic CSI report, etc. A wireless device (e.g., if a BWP (DL or UL) of an SCell is in dormant state): may transmit one or more periodic CSI reports for the BWP (e.g., DL) of the SCell, may suspend one or more SP CSI reports for the BWP (e.g., DL) of the SCell, may suspend one or more SP CSI reports on the BWP (e.g., UL) of the SCell, and/or may suspend one or more SP SRS transmission on the BWP (e.g., UL) of the SCell. One or more RRM reports may be based on, for example, SS/PBCH block(s) intra/inter-frequency measurements, and/or CSI-RS intra/inter-frequency measurements. The one or more RRM reports, for example, may comprise at least one of: RSRP of SSB/PBCH blocks, RSRQ of SSB/PBCH blocks, SINR of SSB/PBCH blocks, RSRP of CSI-RSs, RSRQ of CSI-RSs, and/or SINR of CSI-RSs. SSB/PBCH blocks and/or CSI-RS resources for RRM report may be configured, for example, in one or more RRC messages. Suspending SP CSI report, rather than clearing or releasing SP CSI report, may allow the wireless device to maintain one or more configuration parameters (RRC or MAC layer) of the SP CSI report. Maintaining the one or more configuration parameters of the SP CSI report may enable, for example, a quick CSI report when the cell is reactivated from the dormant state. This may, for example, improve data transmission latency and/or reduce signal overhead.

Figure 25:
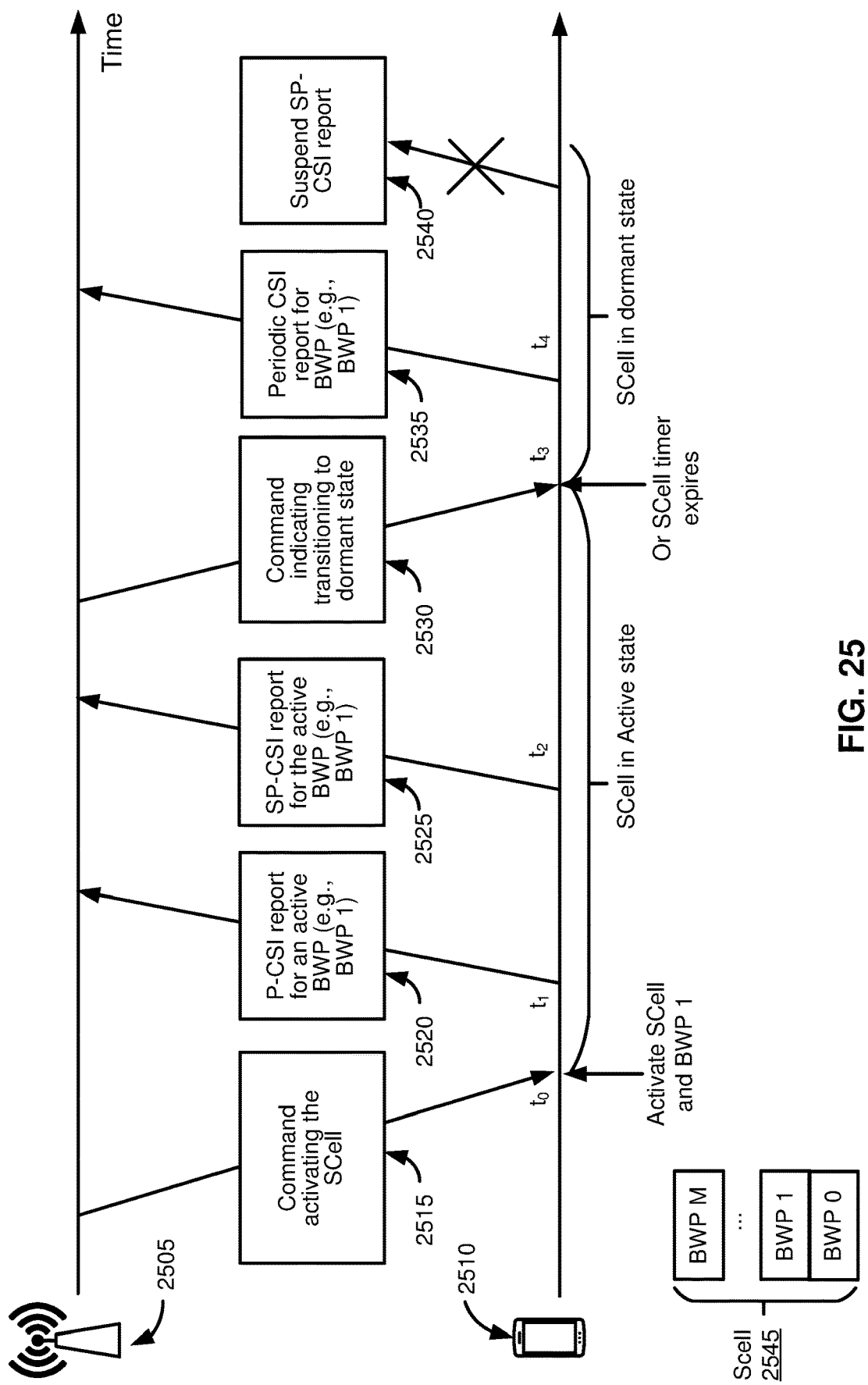
FIG. 25 shows an example for CSI reporting.

FIG. 25 shows an example of for CSI reporting. A base station 2505 may send (e.g., transmit), to a wireless device 2510 that may receive, a command 2515 (e.g., an RRC message, a MAC CE) for activating an SCell 2545. The wireless device 2510 may receive the command 2515 at or after time $t_0$. The command 2515 may indicate an active BWP (e.g., BWP 1). The wireless device 2510 may activate the SCell 2545 and further activate a BWP (e.g., the BWP 1), for example, based on the command 2515. At or after time $t_1$, the wireless device 2510 may send (e.g., transmit) a periodic CSI (P-CSI) report 2520 for the active BWP (e.g., BWP 1). At or after time $t_2$, the wireless device 2510 may send (e.g., transmit) a semi-persistent (SP-CSI) report 2525.

At or after time $t_3$, the wireless device 2510 may receive, from the base station 2505, a command 2530 (e.g., an RRC message, a MAC CE) indicating transitioning of the SCell 2545 to a power saving state (e.g., dormant state). Alternatively, or additionally, an SCell timer (e.g., sCellHibernationTimer) may expire at or after time $t_3$. The SCell 2545 may transition to a power saving state (e.g., dormant state), for example, based on receiving the command 2530 and/or based on the expiration of the SCell timer.

At or after time $t_4$, the wireless device 2510 may send (e.g., transmit), to the base station 2505 that may receive, a P-CSI report 2535 for a BWP (e.g., BWP 1). The P-CSI report 2535 may be associated with the BWP 1, for example, if the BWP 1 was active prior to transition of the SCell 2545 to dormant state at time $t_3$. The wireless device 2510 may suspend an SP-CSI report for the BWP. The wireless device 2510 may, for example, suspend transmission of the SP-CSI report but not deactivate the SP-CSI report. Suspending, and not deactivating, the SP-CSI report may allow the SP-CSI report to quickly resume, for example, if the SCell 2545 is reactivated (e.g., at a later time).

A wireless device may monitor a first PDCCH with one or more first DCI formats on one or more first common/UE-specific search spaces of a first CORESET of a cell, for example, if the cell is in dormant state, or a BWP of the cell is in dormant state. The wireless device may monitor a second PDCCH with one or more second DCI formats on one or more second common/UE-specific search spaces of a second CORESET of a cell, for example, if the cell is in active state, or a BWP of the cell is in active state. The one or more first DCI formats, the one or more first common/UE-specific search spaces, the first CORESET, the one or more second DCI formats, the one or more second common/wireless device-specific search spaces, and/or the second CORESET may be indicated by one or more RRC messages. The cell may be, for example, a PCell or an SCell. Monitoring different PDCCHs on a cell in dormant state and in active state may, for example, improve power consumption at a wireless device and provide a quick wakeup of the wireless device from the dormant state (or power-saving mode, sleep mode) to the active state (or active mode). The wireless device may monitor a PDCCH, periodically on a cell and/or for the cell, to detect a first DL signal (e.g., wake-up signal or activation signal) for the cell, for example, if the cell is in dormant state, or a BWP of the cell is in dormant state. The first signal may be transmitted, for example, on a PCell, or a PSCell, or the cell. The first signal may be transmitted, for example, on a BWP of the cell. The first DL signal may be, for example, at least one of: a reference signal, a preamble sequence, a DCI transmitted on a PDCCH addressed to a wireless device-specific RNTI or a group command RNTI, and/or MAC CE. The periodicity of the monitoring may be indicated, for example, in one or more RRC messages. Resources (e.g., time or frequency) for the first DL signal may be indicated, for example, in the one or more RRC messages. The wireless device may activate the cell and/or the BWP of the cell, for example, if the wireless device detects the first DL signal. Monitoring the first DL signal rather than PDCCHs configured for the SCell in active state may, for example, save power consumption of a wireless device and/or provide a quick wakeup of the wireless device from dormant state (or power-saving mode, sleep mode) to active state (or active mode).

Figure 26:
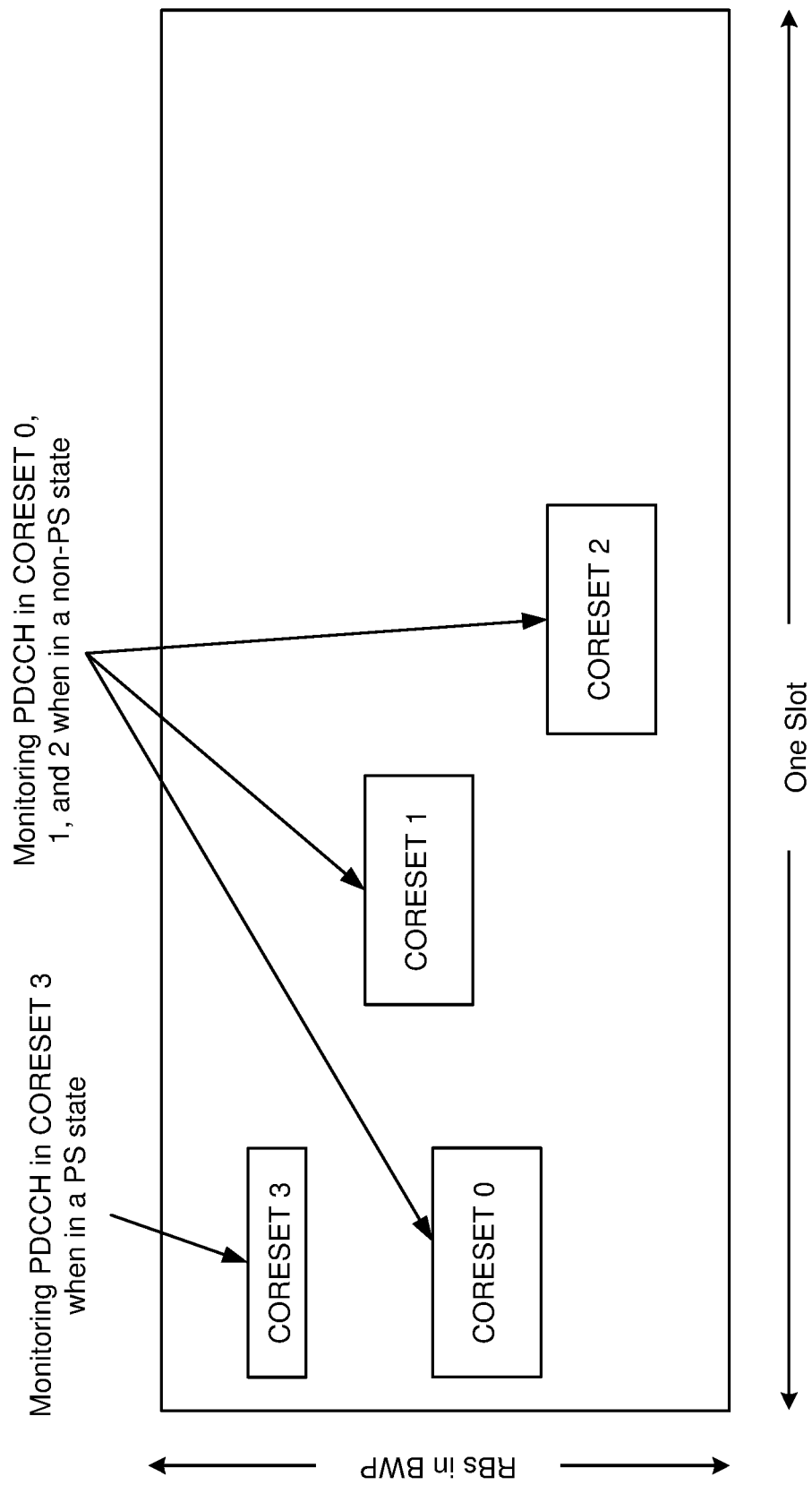
FIG. 26 shows an example for PDCCH monitoring.

FIG. 26 shows an example for PDCCH monitoring. First CORESETs (e.g., CORESET 0, CORESET 1, and CORESET 2) may be associated with active state operation, and a second CORESET (e.g., CORESET 3) may be associated with power saving state operation. A CORESET may correspond to a resource block and a time period within a slot. A wireless device may monitor PDCCHs in the first CORESETs, for example, if the wireless device is in an active state. The wireless device may monitor a PDCCH in the second CORESET, for example, if the wireless device is in a power saving state. The second CORESET may comprise, for example, less time and/or frequency resources than the first CORESET. The wireless device may reduce power consumption in the power saving state by only monitoring a CORESET (e.g., the second CORESET) of a reduced size relative to a CORESET for another state (e.g., a non-power saving state, a normal power state, an active state, etc.). The base station may improve downlink resource utilization efficiency by only using a CORESET (e.g., the second CORESET) of a reduced size relative to a CORESET for another state (e.g., a non-power saving state, a normal power state, an active state, etc.).

Figure 27:
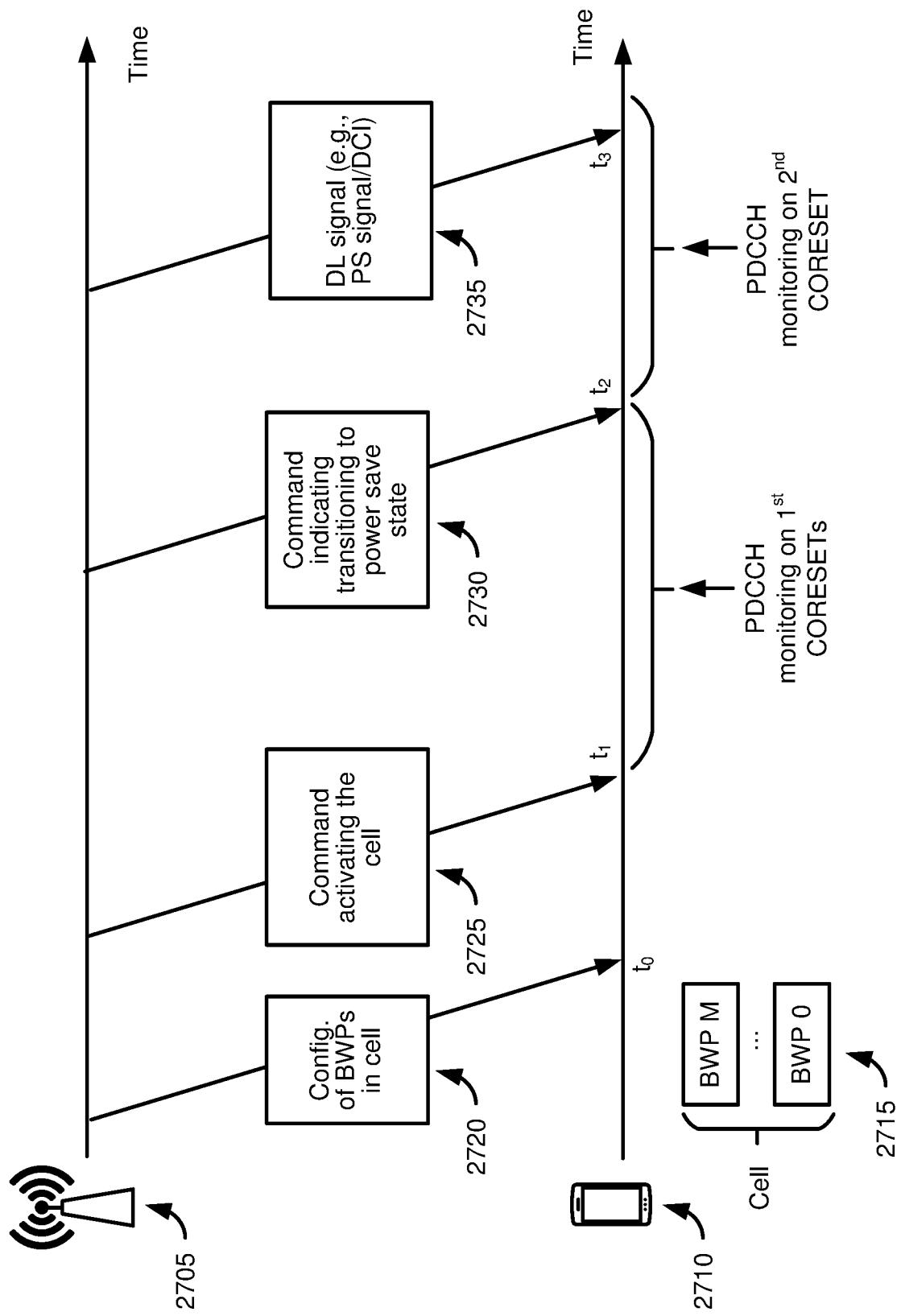
FIG. 27 shows an example for PDCCH monitoring.

FIG. 27 shows an example for PDCCH monitoring. A base station 2705 may send (e.g., transmit), to a wireless device 2710 that may receive, one or more messages. The one or more messages may comprise configuration parameters 2720 (e.g., an RRC message), 27 that may configure wireless resources (e.g., BWPs) associated with the cell 2715. The configuration parameters may indicate one or more first CORESETs and one or more second CORESETs. The one or more first CORESETs may be associated with an active state of operation, and the one or more second CORESETs may be associated with a power saving state (e.g., dormant state) of operation. At or after time $t_0$, the base station 2705 may send (e.g., transmit), to the wireless device 2710 which may receive, the configuration parameters 2720.

At or after time $t_1$, the wireless device 2710 may receive, from the base station 2705 which may send, a command 2725 (e.g., an RRC message, or a MAC CE) for activating the cell 2715. The command 2725 may indicate, for example, an active wireless resource (e.g., active BWP such as BWP 1). The wireless device 2710 may monitor a first PDDCH corresponding to one or more first CORESETs, for example, based on receiving the command 2725. The one or more first CORESETs may be configured on the active BWP.

At or after time $t_2$, the wireless device 2710 may receive, from the base station 2705 which may send, a command 2730 indicating setting (e.g., transitioning) the cell to the power saving state (e.g., dormant state). The wireless device 2710 may transition the cell to the power saving state, for example, based on receiving the command 2730. The wireless device 2710 may monitor a second PDDCH associated with one or more second CORESETs, for example, based on receiving the command 2730.

At or after time $t_3$, the wireless device 2710 may receive, from the base station 2705 which may send, a DL signal 2735 (e.g., DCI) via the second PDCCH associated with the one or more second CORESETs. The DL signal may be associated with a command indicating transition of the cell 2715 to active state. The wireless device 2710 may transition the cell to active state, for example, based on the DL signal 2735.

The one or more second CORESETs may comprise, for example, fewer resources (e.g., time resources, frequency resources, etc.) than the one or more first CORESETs. The wireless device 2710, in a power saving state, may monitor the second PDCCH using fewer resources and stop monitoring the first PDCCH using larger resources. The base station 2705 may allocate at least a portion of the larger resources to other wireless devices, for example, based on the power saving state of the cell for the wireless device 2710. This may enable the wireless device 2710 to reduce power consumption in the power saving state, and/or enable the base station 2705 to increase downlink spectrum efficiency.

Configuration parameters of an SCell may indicate, for example, at least one of: an initial active (DL and/or UL) BWP, a default (DL and/or UL) BWP, a first active (DL and/or UL) BWP, of a plurality of (DL and/or UL) BWPs of the SCell. Each of the plurality of (DL and/or UL) BWPs may be associated with, for example, a (DL and/or UL) BWP ID. The initial active DL BWP may be same as or different from the default DL BWP. The first active DL BWP may be same as or different from the initial active DL BWP. The first active UL BWP may be same as or different from the initial active UL BWP.

An initial active DL BWP may be associated with one or more CORESETs for one or more common search spaces (e.g., type0-PDCCH). A wireless device may monitor a first PDCCH on an initial active DL BWP on a PCell and/or a PSCell for detecting a DCI, for example, if switching from RRC idle state to RRC connected state. A wireless device may switch from an active (DL) BWP to a default (DL) BWP, for example, if there is no activity on the active (DL) BWP, and/or if a BWP inactivity timer associated with the active (DL) BWP expires.

A base station may send (e.g., transmit), to a wireless device that may receive, an RRC message. The RRC message may comprise parameters indicating configuration of an SCell with an SCell state indicator set to "activated". The wireless device may perform an RA procedure on the first active DL BWP and/or UL BWP of the SCell, for example, if the wireless device is configured with a first active DL/UL BWP for the SCell. A base station may send (e.g., transmit) an RRC message comprising, for example, parameters indicating addition of an SCell, and/or reconfiguration of an SCell. The wireless device may perform an RA procedure on a configured first active DL BWP and/or on a configured UL BWP of the SCell, for example, if the SCell is transitioned (e.g., switched and/or adjusted) to an active state. The SCell may be transitioned to the active state by, for example, an activation/deactivation MAC CE and/or a hibernation MAC CE.

Configuration parameters of an SCell may indicate, for example, one or more designated BWPs (DL and/or UL) of a plurality of BWPs of the SCell. One of the one or more designated DL BWPs may be, for example, the same as or different from a default BWP, an initial active DL BWP, and/or a first active DL BWP. One of the one or more designated UL BWPs may be, for example, the same as or different from an initial active UL BWP or a first active UL BWP. A wireless device (e.g., based on receiving one or more MAC CEs indicating setting and/or a transition of an SCell to dormant state, or expiration of an SCell hibernation timer (e.g., sCellHibernationTimer) associated with the SCell): may transmit one or more CSI reports for the one or more designated DL BWPs of the SCell, may not transmit on an UL-SCH on the SCell, may not transmit on a RACH (e.g., if configured) on the SCell, may not monitor a PDCCH on the SCell, may clear any configured downlink assignment and configured uplink grant of a configured grant (e.g., a configured grant Type 2), may flush all HARQ buffers associated with the SCell, and/or may suspend any configured uplink grant of a configured grant (e.g., configured grant Type 1). The one or more MAC CEs may comprise, for example, at least one of an activation/deactivation MAC CE and/or a hibernation MAC CE. Designating one or more BWPs for CSI reports for an SCell in a power saving state (e.g., dormant state) in RRC messages, for example, may allow a base station to flexibly indicate for which BWP a wireless device transmits one or more CSI reports if the SCell is transitioned (e.g., switched and/or adjusted) to the power saving state. Reporting CSI for one or more BWPs for an SCell in the power saving state may provide a base station channel information on the one or more BWPs of the SCell, for example, if the SCell is transitioned to the power saving state (e.g., dormant state). The channel information of the one or more BWPs may allow the base station to select a first BWP of the one or more BWPs to activate and schedule data on the first BWP.

Figure 28:
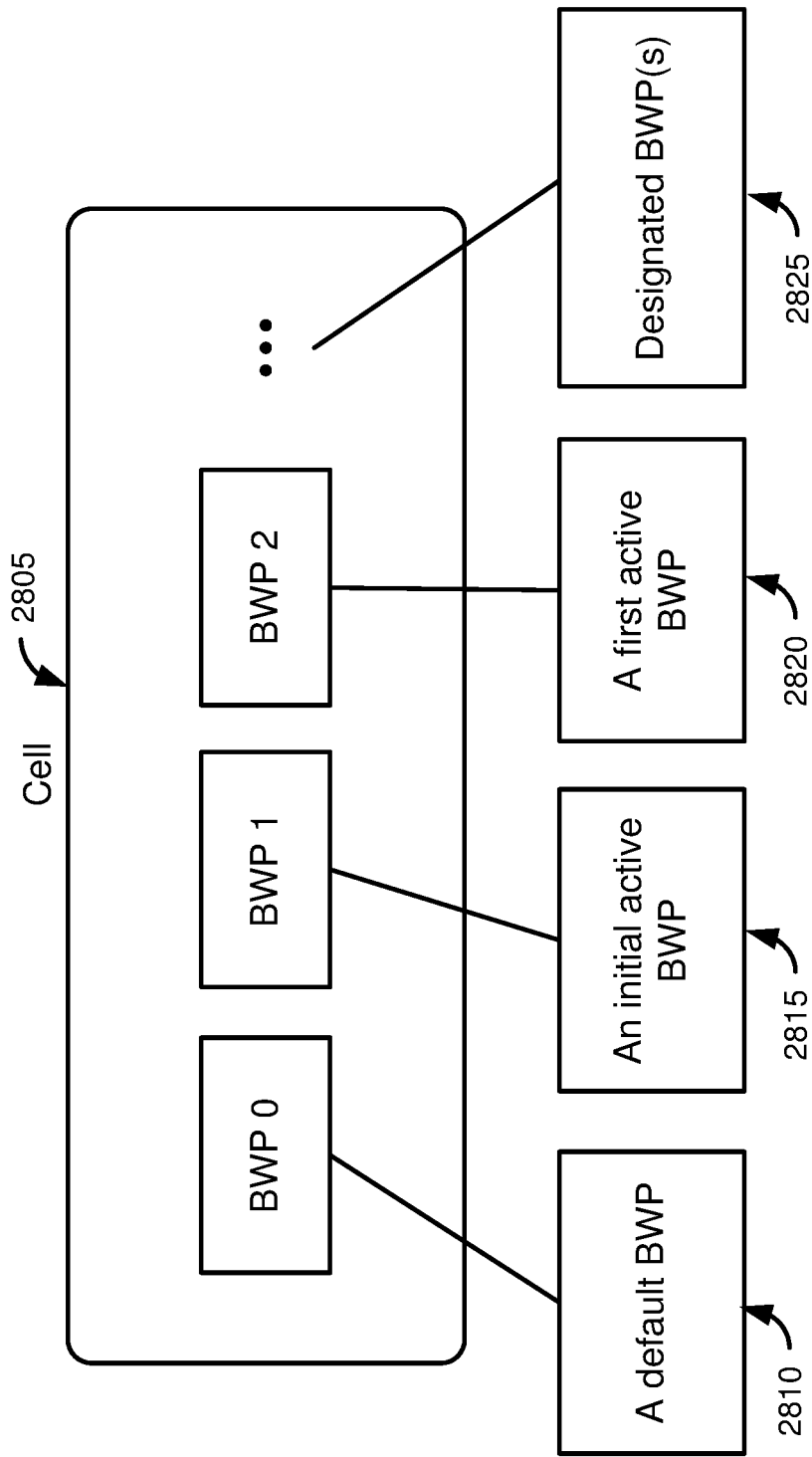
FIG. 28 shows an example of BWP configuration.

FIG. 28 shows an example configuration of BWPs 2805 for a cell. A base station may send (e.g., transmit) one or more RRC messages comprising parameters (e.g., configuration parameters) indicating a default BWP 2810 (e.g., BWP0), an initial active BWP 2815 (e.g., BWP 1), a first active BWP 2820 (e.g., BWP 2), and/or designated BWP(s) 2825, for an SCell that may be configured with multiple BWPs. The designated BWP(s) 2825 may correspond to BWP(s) for transmission of a CSI report for the cell, for example, if the cell is in a power saving state (e.g., dormant state). The one or more RRC messages may be transmitted, for example, if the SCell is in the power saving state. The default BWP may be same as the initial active BWP. The initial active BWP may be same as the first active BWP. The designated BWP(s) may be the same as the default BWP, the initial active BWP, and/or the first active BWP.

A base station may implicitly indicate a BWP for CSI reporting, for example, if an SCell is transitioned (e.g., switched and/or adjusted) to a power saving state (e.g., dormant state). A wireless device may (e.g., based on receiving one or more MAC CEs indicating setting and/or a transition of the SCell to dormant state): deactivate an active BWP of the SCell (and/or transition an active BWP to dormant state), transmit one or more CSI reports for a first BWP of multiple of BWPs of the SCell, may not transmit on an UL-SCH on the SCell, may not transmit on a RACH (e.g., if configured) on the SCell, may not monitor a PDCCH on the SCell, may clear any configured downlink assignment and/or configured uplink grant of a configured grant (e.g., configured grant Type 2), may flush all HARQ buffers associated with the SCell, and/or may suspend any configured uplink grant of a configured grant (e.g., configured grant Type 1). The first BWP may be predefined (and/or preconfigured and/or fixed), for example, as one of: the default BWP, the initial active DL BWP, and/or the first active DL BWP. The one or more MAC CEs may comprise, for example, at least one of an activation/deactivation MAC CE and/or a hibernation MAC CE. Predefining and/or fixing the first BWP for CSI reporting for the SCell in a power saving state (e.g., dormant state) may simplify signaling overhead transmission.

A base station and/or a wireless device may operate on a first BWP of an active SCell. The first BWP may be an active BWP of the active SCell. The wireless device may transition the active SCell to a power saving state (e.g., dormant state), for example, based on receiving first RRC messages, receiving first MAC CE(s), and/or an expiry of an SCell timer (e.g., sCellHibernationTimer). The wireless device may set (e.g., transition) the first BWP of the SCell to a power saving state (e.g., dormant state) based on setting (e.g., transitioning) the active SCell to the power saving state (e.g., dormant state). Transitioning the first BWP into the power saving state (e.g., dormant state) may comprise, for example, transmitting CSI reports for the first BWP of the SCell. The first BWP may be different from the default BWP, the initial active BWP, and/or the first active BWP configured for the SCell. Transmitting CSI reports for the first BWP may be beneficial for accurate and/or timely data scheduling, for example, if the SCell is transitioned (e.g., switched and/or adjusted) to active state later in time.

Figure 29:
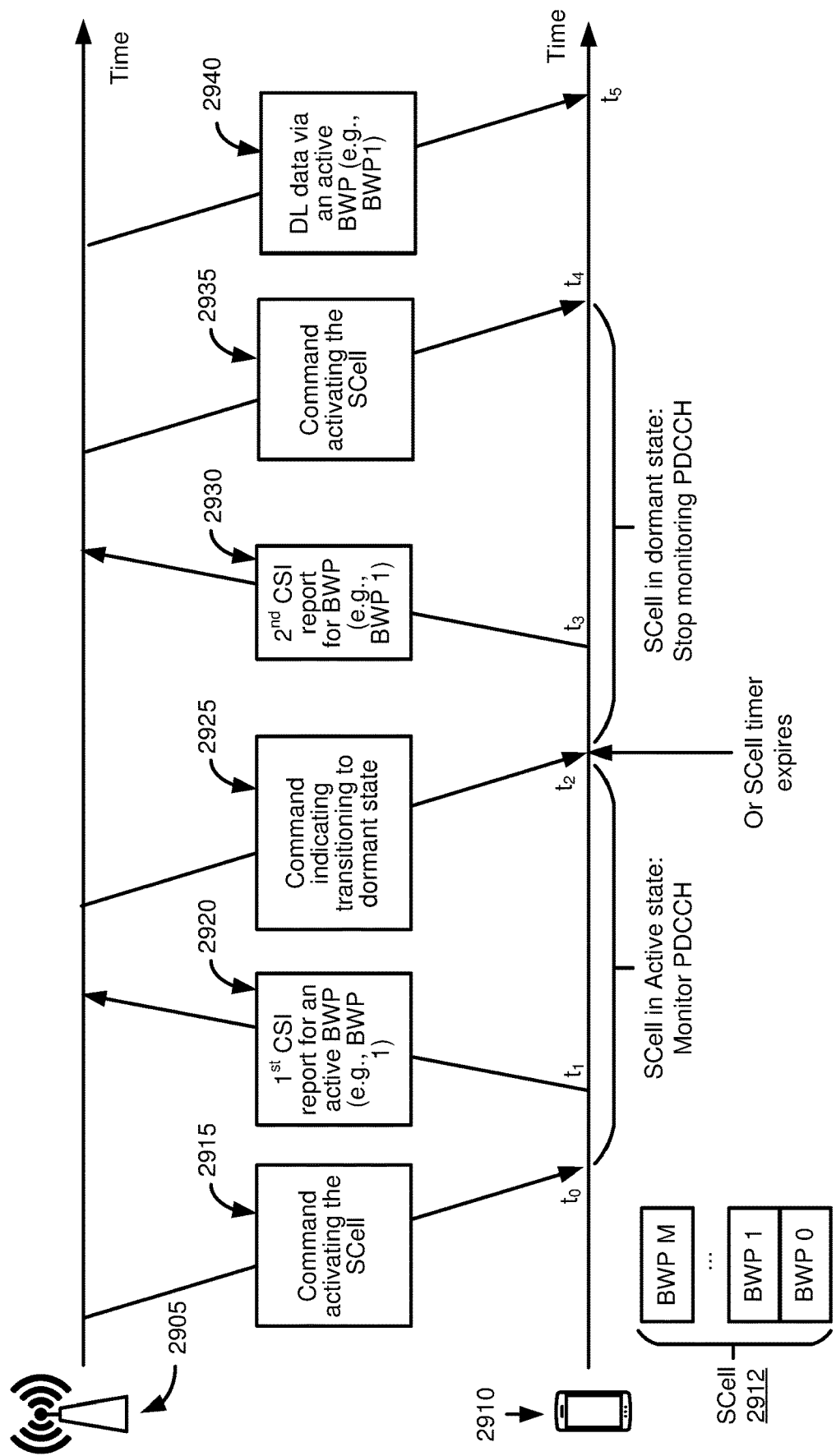
FIG. 29 shows an example for CSI reporting.

FIG. 29 shows an example for CSI reporting. A base station 2905 may send (e.g., transmit), to a wireless device 2910 that may receive, a command 2915 (e.g., an RRC message, a MAC CE, etc.) for activating an SCell 2912. The wireless device 2910 may receive the command 2915 at or after time $t_0$. The command 2915 may indicate an active BWP (e.g., BWP 1). The wireless device 2910 may activate the SCell 2912 and further activate a BWP (e.g., the BWP 1) based on the command 2915. At or after time $t_1$, the wireless device 2910 may send (e.g., transmit), to the base station 2905 which may receive, a first CSI report 2920 for an active BWP (e.g, the BWP 1)29. At or after time $t_2$, the wireless device 2910 may receive, from the base station 2905 that may send, a command 2925 (e.g., an RRC message, a MAC CE, etc.) indicating transitioning of the SCell 2912 to a power saving state (e.g., dormant state). Alternatively, or additionally, an SCell timer (e.g., sCellHibernationTimer) may expire at or after time $t_2$. The SCell 2912 may transition to a power saving state (e.g., dormant state), for example, based on receiving the command 2925 and/or based on the expiration of the SCell timer.

At or after time $t_3$, the wireless device 2910 may send (e.g, transmit), to the base station 2905 that may receive, a second CSI report 2930 associated with a BWP, for example, after or in response to an expiry of the SCell timer. The BWP may be a BWP that was active prior to transition of the SCell 2912 to a power saving state (e.g., dormant state). The second CSI report 2930 may be associated with the BWP 1, for example, if the BWP 1 was active BWP prior to transition of the SCell 2912 to the power saving state (e.g., dormant state) at time $t_2$. Transmitting the second CSI report corresponding to the BWP that was active prior to transition of the SCell 2912 to a power saving state (e.g., dormant state) may enable the base station 2905 to quickly reactivate the SCell (e.g., with a same active BWP as the BWP that was active prior to transition of the SCell 2912 to the power saving state). The base station 2905 may use the information in the second CSI report for activating a BWP (e.g., the BWP 1). The base station 2905 may send (e.g., transmit) data to the wireless device 2910 over the BWP 1, for example, based on the base station 2905 already having an updated CSI associated with the BWP 1.

At or after time $t_4$, the wireless device 2910 may receive, from the base station 2905, a command 2935 (e.g., an RRC message, a MAC CE, etc.) for activating the SCell 2912. The command 2935 may indicate an active BWP (e.g., BWP 1). The wireless device 2910 may activate the SCell 2912 and further activate the BWP (e.g., the BWP 1), for example, based on the command 2935. At or after time $t_5$, the wireless device 2910 may receive data 2940 via the BWP (e.g., BWP 1) from the base station 2905. Availability of the second CSI report associated with the BWP (e.g., as transmitted at time $t_3$), at the base station 2905, may enable the base station 2905 to quickly activate the SCell 2912 and transmit the data 2940 without requiring additional CSI information associated with the BWP.

Figure 30:
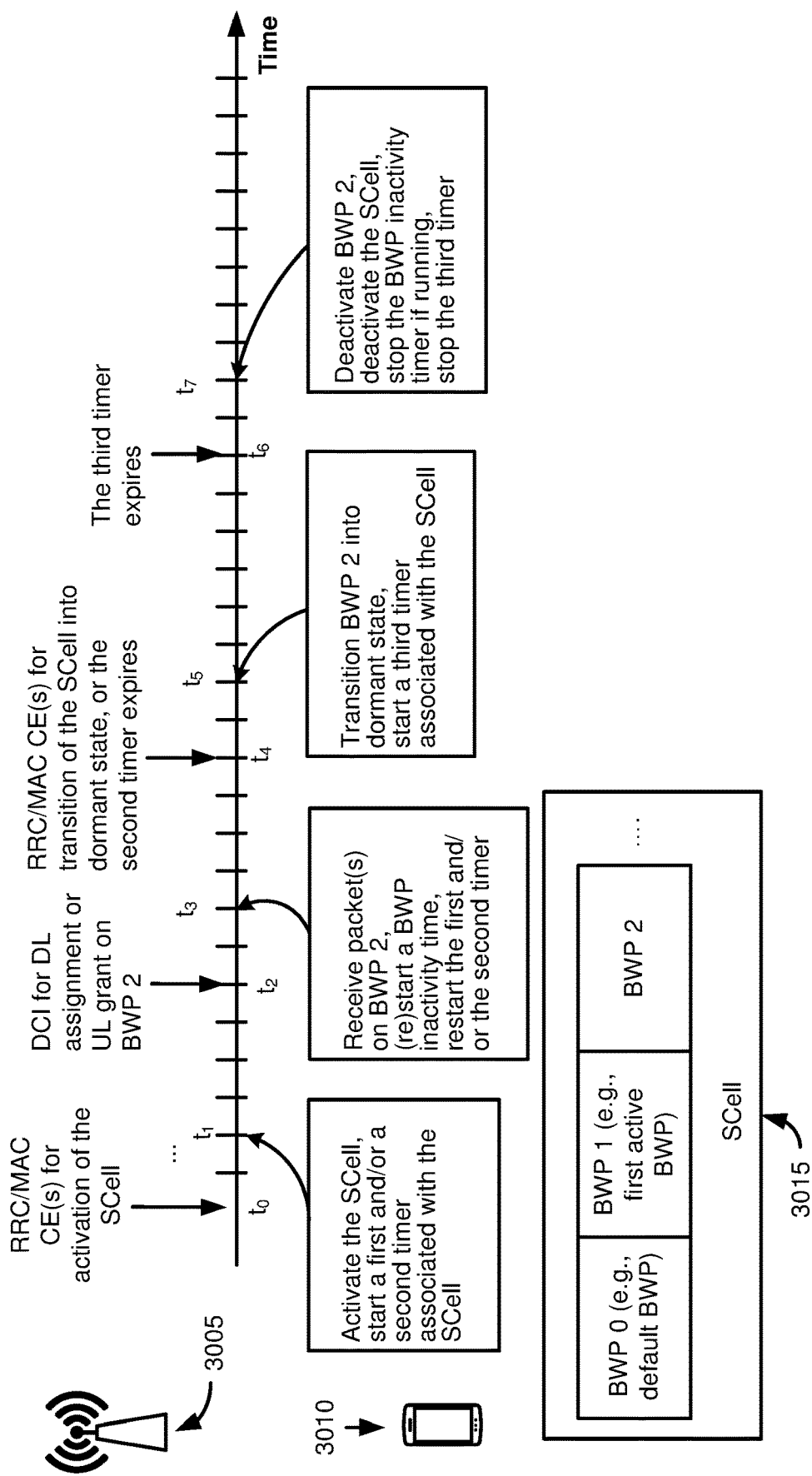
FIG. 30 shows an example of BWP state management in an SCell.

FIG. 30 shows an example of BWP state management in an SCell. A base station 3005 may send (e.g., transmit), to a wireless device 3010 that may receive, at or after time $t_0$, a first RRC message and/or one or more first MAC CE(s) for activation of an SCell 301530. The SCell 3015 may be associated with a default BWP (e.g., BWP 0) and a first active BWP (e.g., BWP 1). The wireless device 3010 may, at or after time $t_1$ (e.g., based on receiving the first RRC message or the one or more first MAC CE(s)): activate the SCell 3015, start a first SCell timer (e.g., sCellDeactivationTimer) associated with a first value, and/or start a second SCell timer (e.g., sCellHibernationTimer) associated with a second value. The second cell timer may take priority, for example, if both the first SCell timer and the second SCell timer are configured. At or after time $t_2$, the base station 3005 may send (e.g., transmit), to the wireless device 3010 that may receive, a DCI indicating downlink assignment or uplink grant on a BWP (e.g., BWP 2) of the activated SCell 301530. At or after time $t_3$, the wireless device 3010 may (e.g., based on receiving the DCI): start receiving/transmitting data packet(s) on or using BWP 2, (re)start a first BWP timer (e.g., bwp-InactivityTimer) associated with a BWP timer value, restart the first SCell timer, and/or restart the second SCell timer.

At or after time $t_4$, the base station 3005 may send (e.g., transmit), to the wireless device 3010 that may receive, a second RRC message and/or one or more second MAC CE(s) for transition of the SCell 3015 to a power saving state (e.g., dormant state). Alternatively or additionally, at or after time $t_4$, the second SCell timer (e.g., the sCellHibernationTimer) may expire. At or after time $t_5$, the wireless device 3010 may (e.g., based on the second RRC message, and/or the one or more second MAC CE(s), or the expiration of the sCellHibernationTimer): transition the BWP (e.g., BWP 2) to a power saving state (e.g., dormant state) and/or start a third SCell timer (e.g., dormantSCellDeactivationTimer) with a third value associated with the SCell 3015. Transitioning the BWP (e.g., BWP 2) to a power saving state (e.g., dormant state) may comprise at least one of: transmitting CSI/RRM reports for the BWP (e.g., BWP 2), not monitoring PDCCH on the BWP, not receiving DL-SCH on the BWP, clearing any configured downlink assignment and/or configured uplink grant (e.g., of a configured grant Type 2), and/or suspending any configured uplink grant (e.g., of configured Type 1). Transmitting CSI/RRM reports for the BWP (e.g., BWP 2) may be beneficial for accurate and timely data scheduling, for example, if the SCell 3015 (and BWP 2) is transitioned (e.g., switched and/or adjusted) to active state (e.g., at a later time).

At or after time $t_6$, the third timer may expire. At or after time $t_7$, the wireless device 3010 may (e.g., based on the third SCell timer expiry): deactivate the BWP (e.g., BWP2), deactivate the SCell 3015, stop the first BWP timer (e.g., if running), and/or stop the third SCell timer. Deactivating the BWP (e.g., BWP2) may comprise, for example: stopping the CSI/RRM reports for the BWP, not monitoring PDCCH on the BWP, not receiving DL-SCH on or using the BWP, clearing any configured downlink assignment and/or configured uplink grant (e.g., of configured grant Type 2), and/or suspending any configured uplink grant (e.g., of configured Type 1).

A first CSI/RRM report for an SCell in a power saving state (e.g., dormant state) may be different (e.g., correspond to a different format and/or configuration and/or protocol) from a second CSI/RRM report for the SCell in active state. The first CSI/RRM report may have, for example, shorter periodicity than the second CSI/RRM report. The first CSI/RRM report may be, for example, measured based on reference signals corresponding to a wider frequency bandwidth than the second CSI/RRM report. The first CSI/RRM report may comprise, for example, a lower number of report quantities than the second CSI/RRM report. The report quantities may comprise, for example, at least one of: channel quality indicator (e.g., CQI), precoding matrix indicator (e.g., PMI), CSI-RS resource indicator (e.g., CRI), SS/PBCH block resource indicator (e.g., SSBRI), layer indicator (e.g., LI), and/or L1-RSRP. It may be beneficial to configure different and/or independent parameters of a first CSI/RRM report for an SCell in power saving state (e.g., dormant state) and a second CSI/RRM report for the SCell in an active state.

Figure 31:
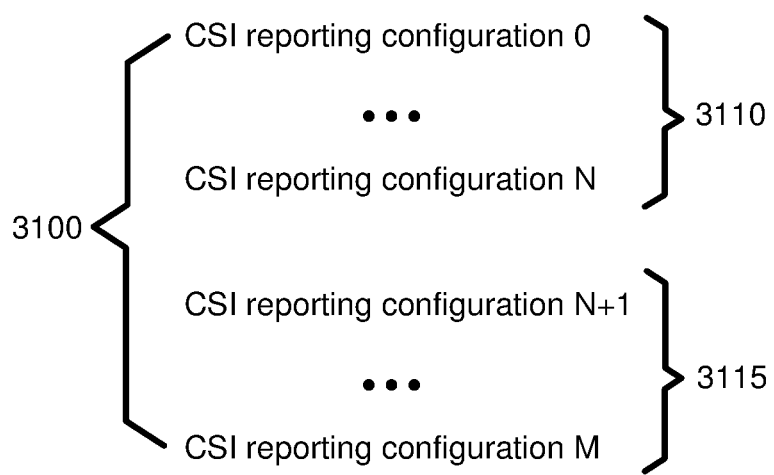
FIG. 31 shows an example of CSI reporting configurations for an SCell.

FIG. 31 shows an example of CSI reporting configurations 3100 associated with an SCell. CSI reporting configurations 3100 may comprise one or more first CSI reporting configurations 3110 that may be used, for example, if the SCell is in a power saving state (e.g., dormant state), and one or more second CSI reporting configurations 3115 that may be used, for example, if the SCell is in an active state. The CSI reporting configurations 3100 may be transmitted by a base station to a wireless device in one or more RRC messages.

A base station may send (e.g., transmit) one or more RRC messages comprising, for example, configuration parameters of an SCell. The configuration parameters may indicate at least one of: the one or more first CSI reporting configurations 3110, the one or more second CSI reporting configurations 3115, and/or one or more BWPs. The one or more first CSI reporting configurations 3110 may be used, for example, if the SCell is in a power saving state (e.g., dormant state). The one or more second CSI reporting configurations 3115 may be used, for example, if the SCell is in an active state. A first one of the one or more first CSI reporting configurations 3110 may be associated with, for example, at least one of: a first BWP ID, an SCell index, one or more first reference signal resource indexes, a first reporting configuration type (e.g, periodic, semi-persistent, or aperiodic), a first reporting periodicity value, one or more first report quantities (e.g., CRI/RI/PMI/CQI/CRI-RSRP/SSB-RSRP), a first frequency resource configuration, and/or a first time resource configuration. The one or more first reference signal resource indexes may be associated with a BWP ID. The first BWP ID may be implicitly indicated by, for example, reference signal resource configurations associated with the one or more first reference signal resource indexes.

A second one of the one or more second CSI reporting configurations 3115 may be associated with, for example, at least one of: a second BWP ID, a cell index, one or more second reference signal resource indexes, a second reporting configuration type (e.g, periodic, semi-persistence, or aperiodic), a second reporting periodicity value, one or more second report quantities (e.g., CRI/RI/PMI/CQI/CRI-RSRP/SSB-RSRP), a second frequency configuration, and/or a second time configuration. The one or more second reference signal resource indexes may be associated with a BWP ID. The second BWP ID may be implicitly indicated by, for example, reference signal resource configurations associated with the one or more second reference signal resource indexes.

One or more first PUCCH resources of one or more UL BWPs of a second cell (e.g., a PCell/PSCell or an SCell configured with a PUCCH resource, such as a PUCCH-SCell) may be associated with the first CSI reporting configuration, for example, if the first reporting configuration type associated with the first CSI reporting configuration is set to periodic report on a PUCCH or semi-persistent report on a PUCCH. One or more second PUCCH resources of the one or more UL BWPs of the second cell (e.g., the PCell/PSCell or the PUCCH-SCell) may be associated with the second CSI reporting configuration, for example, if the second reporting configuration type associated with the second CSI reporting configuration is set to a periodic report on a PUCCH or a semi-persistent report on a PUCCH. The first BWP ID may be the same as or different from the second BWP ID. The first BWP ID may be, for example, the same as a BWP ID of the default BWP, the initial BWP, and/or the first active BWP of the SCell.

A base station may send (e.g., transmit), to a wireless device, one or more first MAC CE(s), for setting (e.g., transition of) an SCell to a power saving state (e.g., dormant state). A base station may send (e.g., transmit) one or more first RRC messages comprising parameters. The parameters may indicate an SCell state indicator (e.g., sCellState) associated with an SCell is to be set to a power saving state (e.g., dormant state). The wireless device may (e.g., based on receiving the one or more first RRC messages, the one or more first MAC CE(s), and/or an expiry of an SCell timer (e.g., sCellHibernationTimer) associated with the SCell): set (e.g., transition) the SCell to the power saving state (e.g., dormant state), hibernate the SCell, and/or start one or more CSI reports for a first BWP for the SCell using at least one of one or more first CSI reporting configurations (e.g., the one or more first CSI reporting configurations 3110) associated with the first BWP. The first BWP may be indicated by, for example, the one or more first CSI reporting configurations. Starting one or more CSI reports for the first BWP for the SCell using the at least one of the one or more first CSI reporting configurations may comprise, for example, at least one of: measuring first CSI report quantities over one or more first reference signals on the first BWP, and/or transmitting the first CSI report quantities with the first reporting periodicity value via one or more first PUCCH resources of a second cell (e.g., PCell/PSCell or PUCCH-SCell).

A base station may send (e.g., transmit), to a wireless device that may receive, one or more second MAC CE(s) for setting (e.g., transition of) an SCell to an active state. A base station may send (e.g., transmit) one or more second RRC messages comprising parameters. The parameters may indicate an SCell state indicator (e.g., sCellState) associated with an SCell is to be set to "activated" or active state. The wireless device may (e.g., based on receiving the one or more second RRC messages or the one or more second MAC CE(s)): activate the SCell and/or start one or more CSI reports for a second BWP for the SCell using at least one of one or more second CSI reporting configurations (e.g., the one or more second CSI reporting configurations 3115) associated with the second BWP. The second BWP may be an active BWP. Starting one or more CSI reports for the second BWP for the SCell may comprise, for example, at least one of: measuring second CSI report quantities over one or more second reference signals on the second BWP, transmitting the second CSI report quantities with the second reporting periodicity value via one or more second PUCCH resources of the second cell (e.g., PCell/PSCell or PUCCH-SCell).

A first CSI reporting configuration for an SCell in dormant state that is separate and/or different from a second CSI reporting configuration for the SCell in active state may allow a base station to configure a simple and/or quick CSI measurement and reporting for the SCell in a power saving state (e.g., dormant state). It may be beneficial to configure less complex, less time-consuming, and/or less power-consuming CSI reports for the SCell in a power saving state (e.g., dormant state), than CSI reports for the SCell in an active state. A first BWP in the first CSI reporting configuration for an SCell in a power saving state (e.g., dormant state) may be different from a second BWP in the second CSI reporting configuration for the SCell in an active state. The first BWP and the second BWP may be configured by the base station using an RRC message. This configuring may enable the base station to flexibly control a BWP that may be used by a wireless device to report CSI if the SCell is in a power saving state (e.g., dormant state).

Configuring a separate CSI reporting configuration for an SCell in a power saving state (e.g., dormant state) may cause extra signaling overhead. Reusing at least some CSI reporting configurations for an SCell in active state, for example, for CSI reports for the SCell in a power saving state (e.g., dormant state) may reduce the signaling overhead. A base station and/or a wireless device may not align on which BWP a CSI report is for, and/or may not align about what the CSI report comprises such as in terms of report quantities (e.g., if reusing CSI reporting configurations), if a BWP or the report quantities, among other parameters, are not specified. The base station and the wireless device may be aligned based on information corresponding to CSI reports for the SCell in a power saving state (e.g., dormant state).

A base station may send (e.g., transmit) one or more RRC messages comprising configuration parameters of an SCell. The configuration parameters may indicate multiple CSI reporting configurations and parameters of one or more BWPs. Each of the multiple CSI reporting configurations may be indicated, for example, by a CSI reporting configuration index. Each of the multiple CSI reporting configurations may be associated with, for example, a DL BWP of the one or more BWPs of the SCell. Each of the multiple CSI reporting configurations may be associated with, for example, a CSI reporting indicator. A CSI reporting indicator set to a first value (e.g., "0" representing "used in dormant") may indicate, for example, that a CSI reporting configuration associated with the CSI reporting indicator may be used if the SCell is in a power saving state (e.g., dormant state). The CSI reporting indicator set to a second value (e.g., "1" representing "used in active"), for example, may indicate that a CSI reporting configuration associated with the CSI reporting indicator may be used if the SCell is in an active state.

A base station may send (e.g., transmit), to a wireless device that may receive, one or more first MAC CE(s) for setting (e.g., transition of) an SCell to an active state. A base station may send (e.g., transmit) one or more first RRC messages comprising parameters. The parameters may indicate an SCell state indicator (e.g., sCellState) associated with an SCell that is be set to "activated" or active state. The wireless device may start transmitting multiple CSI reports for a first BWP of the one or more BWPs of the SCell based on receiving, for example, the one or more first RRC messages and/or the one or more first MAC CE(s). The first BWP may be an active BWP of the SCell, for example, if the SCell is activated. The multiple CSI reports may be used based on at least one of the multiple CSI reporting configurations associated with the first BWP. The multiple CSI reports may be used based on at least one of the multiple CSI reporting configurations with CSI reporting indicator set to a second value (e.g., "1" representing "used in active state") associated with the first BWP. Starting the multiple CSI reports for the first BWP may comprise, for example, at least one of: measuring CSI report quantities over one or more reference signals associated with the at least one CSI reporting configuration, and/or transmitting the CSI report quantities with a reporting periodicity value via one or more PUCCH resources of a cell (e.g., PCell/PSCell or PUCCH-SCell). The reporting periodicity value and/or the one or more PUCCH resources may be associated with, for example, the at least one CSI reporting configuration.

A base station may send (e.g., transmit), to a wireless device that may receive, one or more second MAC CE(s) for setting (e.g., transition of) an SCell to a power saving state (e.g., dormant state). A base station may send (e.g., transmit) one or more second RRC messages comprising parameters. The parameters may indicate an SCell state indicator (e.g., sCellState) associated with an SCell that is to be set to a power saving state (e.g., dormant state). The wireless device may (e.g., based on receiving the one or more second RRC messages, or the one or more second MAC CE(s), or an expiry of an SCell timer (e.g., sCellHibernationTimer) associated with the SCell): set (e.g., transition) the SCell to a power saving state (e.g., dormant state), hibernate the SCell, determine/select at least one CSI reporting configuration from multiple CSI reporting configurations based on one or more criteria, and/or transmit one or more CSI reports for a second BWP for the SCell based on the at least one determined/selected CSI reporting configuration. Determining/selecting the at least one CSI report configuration based on the one or more criteria may comprise, for example, at least one of: determining/selecting the at least one CSI reporting configuration associated with the second BWP from the multiple CSI reporting configurations (wherein the second BWP may be, for example, the initial BWP, the default BWP, and/or the first active BWP configured with the SCell, or an active BWP before the SCell is transitioned (e.g., switched and/or adjusted) to dormant state from active state), determining/selecting at least one CSI reporting configuration with CSI reporting indicator set to a first value (e.g., "0" representing "used in dormant state"), determining/selecting at least one CSI reporting configuration with a lowest CSI reporting configuration index associated with the second BWP from the multiple CSI reporting configurations, determining/selecting at least one CSI reporting configurations with a highest CSI reporting configuration index associated with the second BWP from the multiple CSI reporting configurations, determining/selecting at least one CSI reporting configuration with wideband or narrow band reporting quantities associated with the second BWP from the multiple CSI reporting configurations, determining/selecting at least one CSI reporting configuration with one or more predefined reporting quantities (e.g., CQI/RI/PMI/CRI/SSB-RSRP/L1-RSRP/L1) associated with the second BWP from the multiple CSI reporting configurations, and/or determining/selecting at least one CSI reporting configuration with a shortest reporting periodicity value associated with the second BWP from the multiple CSI reporting configurations.

A base station may send (e.g., transmit) one or more RRC messages comprising configuration parameters of an SCell.

The configuration parameters may indicate multiple CSI reporting configurations and/or parameters of one or more BWPs. Each of the multiple CSI reporting configurations may be indicated, for example, by a CSI reporting configuration index. Each of the multiple CSI reporting configurations may be associated with a DL BWP of the one or more BWPs of the SCell. A first of the multiple CSI reporting configurations may be associated with one or more PUCCH resources, for example, if a CSI report configuration type of the first CSI reporting configuration is set to periodic or SP-CSI on a PUCCH. The one or more PUCCH resources may be associated with one or more UL BWPs of a PCell, a PSCell, and/or a PUCCH-SCell. A wireless device may occupy more PUCCH resources for reporting CSI for an active BWP of an SCell in active state than, for example, PUCCH resources occupied for reporting CSI for a BWP of the SCell in a power saving state (e.g., dormant state). It may be beneficial, for example, to allocate a dedicated PUCCH resource for reporting CSI for a BWP of the SCell in a power saving state (e.g., dormant state).

A base station may send (e.g., transmit) one or more RRC messages comprising configuration parameters of an SCell. The configuration parameters may comprise, for example, at least one of: one or more first PUCCH resources for the SCell and one or more second PUCCH resources for the SCell. The one or more first PUCCH resources may be used for a CSI report for the SCell, for example, if the SCell is in a power saving state (e.g., dormant state). The one or more second PUCCH resources may be used for a CSI report for the SCell, for example, if the SCell is in an active state. Each of the one or more first PUCCH resources or the one or more second PUCCH resources may be indicated by, for example: a PUCCH resource index, parameters of frequency configuration, a PUCCH format indicator, and/or other time configuration parameters. Each of the one or more first PUCCH resources and/or the one or more second PUCCH resources may be configured, for example, on a PCell, a PSCell, and/or a PUCCH SCell. The one or more first PUCCH resources may be associated with, for example, at least a first CSI reporting configuration of a first BWP of the SCell. The first BWP may be a default BWP, an initial active BWP, and/or a first active BWP configured with the SCell. The at least first CSI reporting configuration may be used for a CSI report for the first BWP, for example, if the SCell is in dormant state. The one or more second PUCCH resources may be associated with, for example, one or more second CSI reporting configurations of one or more second BWPs of the SCell. The one of the one or more second BWPs may comprise an active BWP, for example, if the SCell is in an active state. The one or more second CSI reporting configurations may be used for a CSI report for the one or more second BWPs, for example, if the SCell is in an active state.

A base station may send (e.g., transmit), to a wireless device that may receive, one or more first MAC CE(s) to set (e.g., transition) an SCell to a power saving state (e.g., dormant state). A base station may send (e.g., transmit) one or more first RRC messages comprising parameters. The parameters may indicate an SCell state indicator (e.g., sCellState) associated with an SCell be set to a power saving state (e.g., dormant state). The wireless device may (e.g., based on receiving the one or more first RRC messages, the one or more first MAC CE(s), and/or an expiry of an SCell timer (e.g., sCellHibernationTimer) associated with the SCell): set (e.g., transition) the SCell to a power saving state (e.g., dormant state), hibernate the SCell, and/or transmit one or more CSI reports for a first BWP of the SCell via a PUCCH resource of one or more first PUCCH resources. The first BWP may be the default BWP, the initial active BWP, and/or the first active BWP configured for the SCell. The PUCCH resource may be associated with the first BWP.

A base station may send (e.g., transmit), to a wireless device, one or more second MAC CE(s) for setting (e.g., transition of) an SCell to an active state. A base station may send (e.g., transmit) one or more second RRC messages comprising parameters indicating an SCell state indicator (e.g., sCellState) associated with an SCell be set to "activated" or active state. The wireless device may (e.g., based on receiving the one or more second RRC messages or the one or more second MAC CE(s)) start transmitting one or more CSI reports for a second BWP of the one or more BWPs of the SCell via a PUCCH resource of one of more second PUCCH resources. The second BWP may be an active BWP of the SCell if the SCell is activated. The PUCCH resource of the one or more second PUCCH resources may be associated with the second BWP of the one or more BWPs.

At least some of the one or more PUCCH resources and the one or more second PUCCH resources may be identical (e.g., same PUCCH resources). Sharing same PUCCH resources for a CSI report for adormant SCell and for a CSI report for active SCell may reduce PUCCH resource consumption.

A base station may send (e.g., transmit) one or more messages comprising configuration parameters of an SCell. The configuration parameters may comprise, for example, a PUCCH resource for the SCell. The wireless device may send (e.g., transmit) a first CSI report for the SCell via the PUCCH resource, for example, based on receiving first command(s) indicating activation of the SCell. The wireless device may send (e.g., transmit) a second CSI report for the SCell via the PUCCH resource, for example, based on receiving second command(s) indicating setting (e.g., transition) of the SCell to a power saving state (e.g., dormant state).

A base station may send (e.g., transmit) one or more RRC messages comprising configuration parameters of an SCell. The configuration parameters may indicate multiple PUCCH resources associated with multiple CSI reporting configurations. Each of the multiple PUCCH resources may be associated with, for example: a PUCCH resource index, parameters of frequency configuration, a PUCCH format indicator, and/or other time configuration parameters. Each of the multiple CSI reporting configurations may be associated with a DL BWP of the one or more BWPs of the SCell.

A base station may send (e.g., transmit), to a wireless device that may receive, one or more first MAC CE(s) for setting (e.g., transition of) an SCell to an active state. A base station may send (e.g., transmit) one or more first RRC messages comprising parameters indicating an SCell state indicator (e.g., sCellState) associated with an SCell that is be set to "activated" or active state. The wireless device may start transmitting multiple CSI reports for a first BWP of the one or more BWPs of the SCell, for example, based on receiving the one or more first RRC messages or the one or more first MAC CE(s). The first BWP may be, for example, an active BWP of the SCell if the SCell is activated. The multiple CSI reports may be used based on at least one CSI reporting configuration of the multiple CSI reporting configurations associated with the first BWP. Starting the multiple CSI reports for the first BWP may comprise, for example, at least one of: measuring CSI report quantities over one or more reference signals associated with the at least one CSI reporting configuration and transmitting the CSI report quantities with a reporting periodicity value via one or more PUCCH resources of multiple PUCCH resources. The one or more PUCCH resources may be associated, for example, with the at least one CSI reporting configuration associated with the first BWP.

A base station may send (e.g., transmit), to a wireless device that may receive, one or more second MAC CE(s) for setting (e.g., transition of) an SCell to a power saving state (e.g., dormant state). A base station may send (e.g., transmit) one or more second RRC messages comprising parameters indicating an SCell state indicator (e.g., sCellState) associated with an SCell that is to be set to a power saving state (e.g., dormant state). The wireless device may (e.g., based on receiving the one or more second RRC messages, or the one or more second MAC CE(s), or an expiry of an SCell timer (e.g., sCellHibernationTimer) associated with the SCell: setting (e.g., transition) the SCell to a power saving state (e.g., dormant state), hibernate the SCell, determine/select at least one PUCCH resource from the multiple PUCCH resources based on one or more criteria, and/or send (e.g., transmit) one or more CSI reports for a second BWP for the SCell via the at least one PUCCH resource. Determining/selecting the at least one PUCCH resource based on the one or more criteria may comprise, for example, at least one of: determining/selecting the at least one PUCCH resource associated with the second BWP from the multiple PUCCH resources, wherein the second BWP is an initial BWP, a default BWP, and/or a first active BWP configured with the SCell; determining/selecting at least one PUCCH resource with a lowest PUCCH resource index associated with the second BWP from the multiple PUCCH resources; determining/selecting at least one PUCCH resource with a highest PUCCH resource index associated with the second BWP from the multiple PUCCH resources; determining/selecting at least one PUCCH resource which is a first available PUCCH resource associated with the second BWP in time domain among the multiple PUCCH resources.

Figure 32:
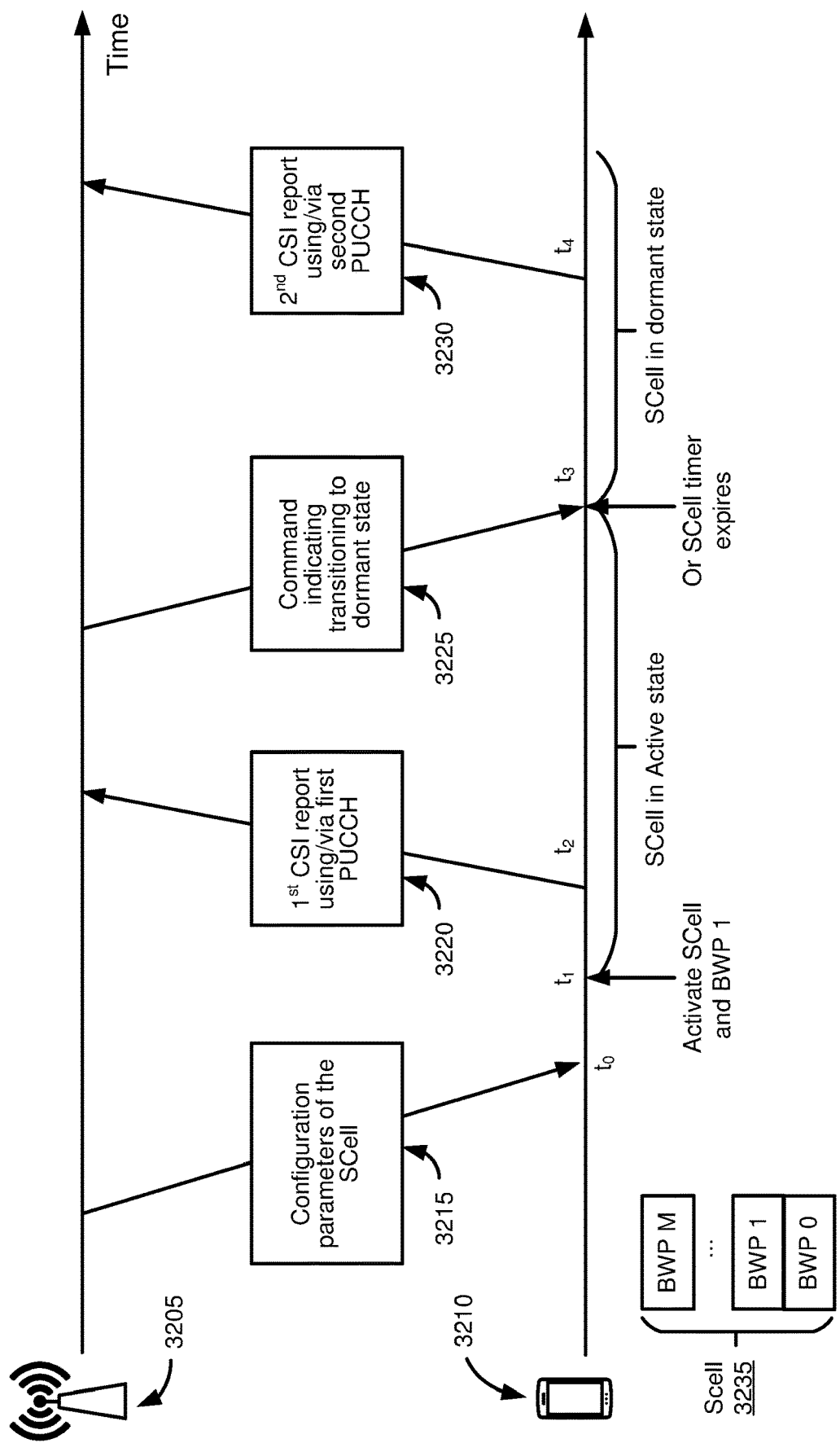
FIG. 32 shows an example for CSI reporting.

FIG. 32 shows an example for CSI reporting. At or after time $t_0$, a wireless device 3210 may receive, from a base station 3205, configuration parameters of an SCell 3235. The configuration parameters may indicate multiple CSI reporting configurations of one or more BWPs. The CSI reporting configurations may comprise one or more first PUCCH resources that are to be used if the SCell 3235 is in a power saving state (e.g., dormant state) and one or more second PUCCH resources that are to be used if the SCell 3235 is in an active state. At or after time $t_1$, the wireless device 3210 may activate the SCell 3235 and a BWP 1 associated with the SCell 3235. The wireless device 3210 may activate the SCell 3235, for example, based on receiving one or more first RRC messages and/or first MAC CEs. At or after time $t_2$, the wireless device 3210 may send (e.g., transmit) a first CSI report 3220 using one or more first PUCCH resources.

At or after time $t_3$, the wireless device 3210 may receive, from the base station 3205, a command 3225 indicating transitioning of the SCell 3235 to a power saving state (e.g., dormant state). The command 3225 may be, for example, one or more second RRC messages and/or second MAC CEs. Alternatively, or additionally, an SCell timer (e.g., sCellHibernationTimer) may expire at time $t_3$. The SCell 3235 may transition to a power saving state (e.g., dormant state) based on receiving the command 3225 and/or based on the expiration of the SCell timer. At or after time $t_4$, the wireless device 3210 may send (e.g., transmit) a second CSI report 3230 using at least one second CSI reporting configuration from the one or more second CSI reporting configurations. The wireless device 3210 may use, for example, a second PUCCH resource associated with the at least one second CSI reporting configuration. The second PUCCH resource may be a smaller resource (e.g., smaller bandwidth resource, smaller time resource, etc.) than the first PUCCH resource. The use of a smaller PUCCH resource as the second PUCCH resource may result in a more efficient usage of uplink resources, for example, if SCell 3235 is in a power saving state (e.g., dormant state).

A base station may send (e.g., transmit), to a wireless device, one or more messages, comprising parameters indicating an SCell. The SCell may comprise one or more BWPs. The base station and/or the wireless device may maintain at least one BWP of the one or more BWPs of the SCell in an active state, for example, if the SCell is in active state. The base station and/or the wireless device may maintain a first number of BWP(s) of the one or more BWPs in a power saving state (e.g., dormant state), for example, if the SCell is in active state. The base station may send (e.g., transmit), for example, a first command indicating the first number of BWP(s) being transitioned (e.g., switched and/or adjusted) to a power saving state (e.g., dormant state), for example, if the SCell is in active state. The first command may be at least one of: an RRC message, a MAC CE, and/or DCI. The first number (e.g., 0, or 1, or >=2) may be indicated, for example, in the first command. The first number may be, for example, predefined to a first value (e.g., 0, 1, or any number equal to or greater than 2).

A wireless device may send (e.g., transmit), for example, at least a first CSI report for at least one active BWP of the active SCell. The wireless device may send (e.g., transmit) at least a second CSI report for at least one dormant BWP, for example, if the SCell is in active state and if the wireless device is configured with at least one dormant BWP in the active SCell. Configuring a number of dormant BWPs for an active SCell may enable a wireless device to report CSI for the number of dormant BWPs and provide, to a base station, extra channel information corresponding to the number of dormant BWPs. The extra channel information may be in addition to the first CSI report for the at least one active BWP of the SCell. The extra channel information may allow the base station to execute quick BWP switching and adaption.

A base station and/or a wireless device may maintain a second number of BWPs of the one or more BWPs of the SCell in a power saving state (e.g., dormant state), for example, if the SCell is in the power saving state (e.g., dormant state). The base station may send (e.g., transmit) a second command indicating the second number of BWP(s) being transitioned (e.g., switched and/or adjusted) to a power saving state (e.g., dormant state), for example, if the SCell is in the power saving state (e.g., dormant state). The second command may be at least one of: an RRC message, a MAC CE, and/or DCI. The second number (e.g., 1 or any number greater than or equal to 2) may be indicated by the second command. The second number may be, for example, predefined to a second value (e.g., 1 or any number greater than or equal to 2). The wireless device may send (e.g., transmit) at least one CSI report for the second number of BWPs, for example, if the SCell is in a power saving state (e.g., dormant state). A base station and/or a wireless device may maintain all of the one or more BWPs of the SCell in an inactive state, for example, if the SCell is in an inactive state.

Figure 33:
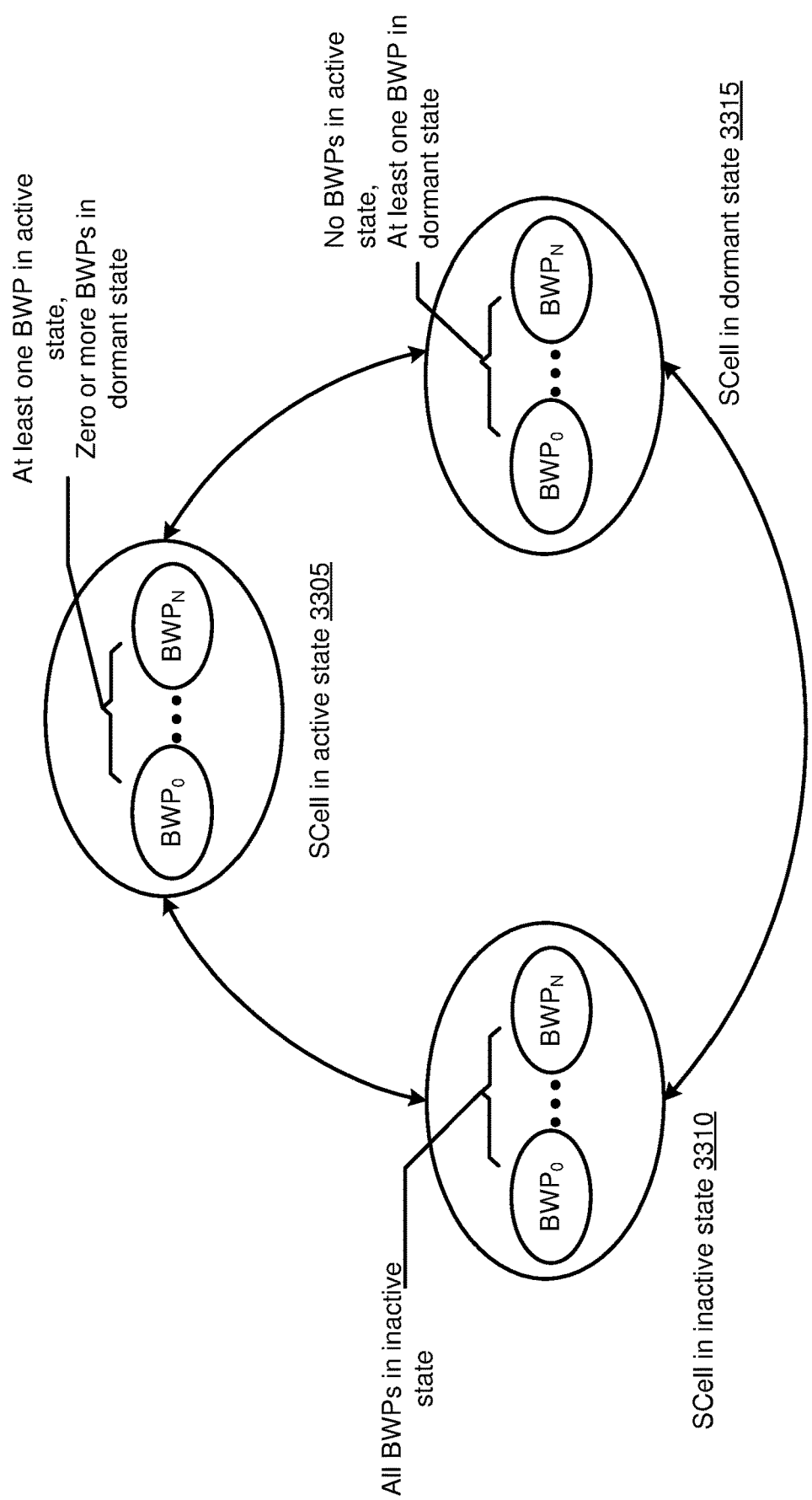
FIG. 33 shows an example of BWP state management in an SCell.

FIG. 33 shows an example of BWP state management in an SCell that comprises one or more BWPs (e.g., $BWP_0$, $BWP_1, \ldots BWP_N$). A base station and/or a wireless device may maintain at least one BWP in active state, and zero or more BWPs in a power saving state (e.g., dormant state) if the SCell is in active state 3305. The base station and/or the wireless device may maintain at least one BWP in a power saving state (e.g., dormant state), and zero BWPs in active state if the SCell is in a dormant state 3315. The base station and/or the wireless device may maintain all BWPs in an inactive state if the SCell is in an inactive state 3310. Transitions between active state, dormant state, and inactive state may be initiated, for example, using RRC messages, MAC CEs, and/or timers.

Maintaining at least one BWP in dormant state 3315 if the SCell is in active state 3305 may enable the wireless device to send (e.g., transmit), to the base station, extra channel information corresponding the at least one BWP. The wireless device may provide, to the base station, the extra channel information (e.g., a CSI report) corresponding to the at least one BWP, for example, if the at least one BWP is in dormant state 3315. The extra channel information may allow the base station to execute quick BWP switching and adaption (e.g., switch the at least one second BWP to active state).

Figure 34:
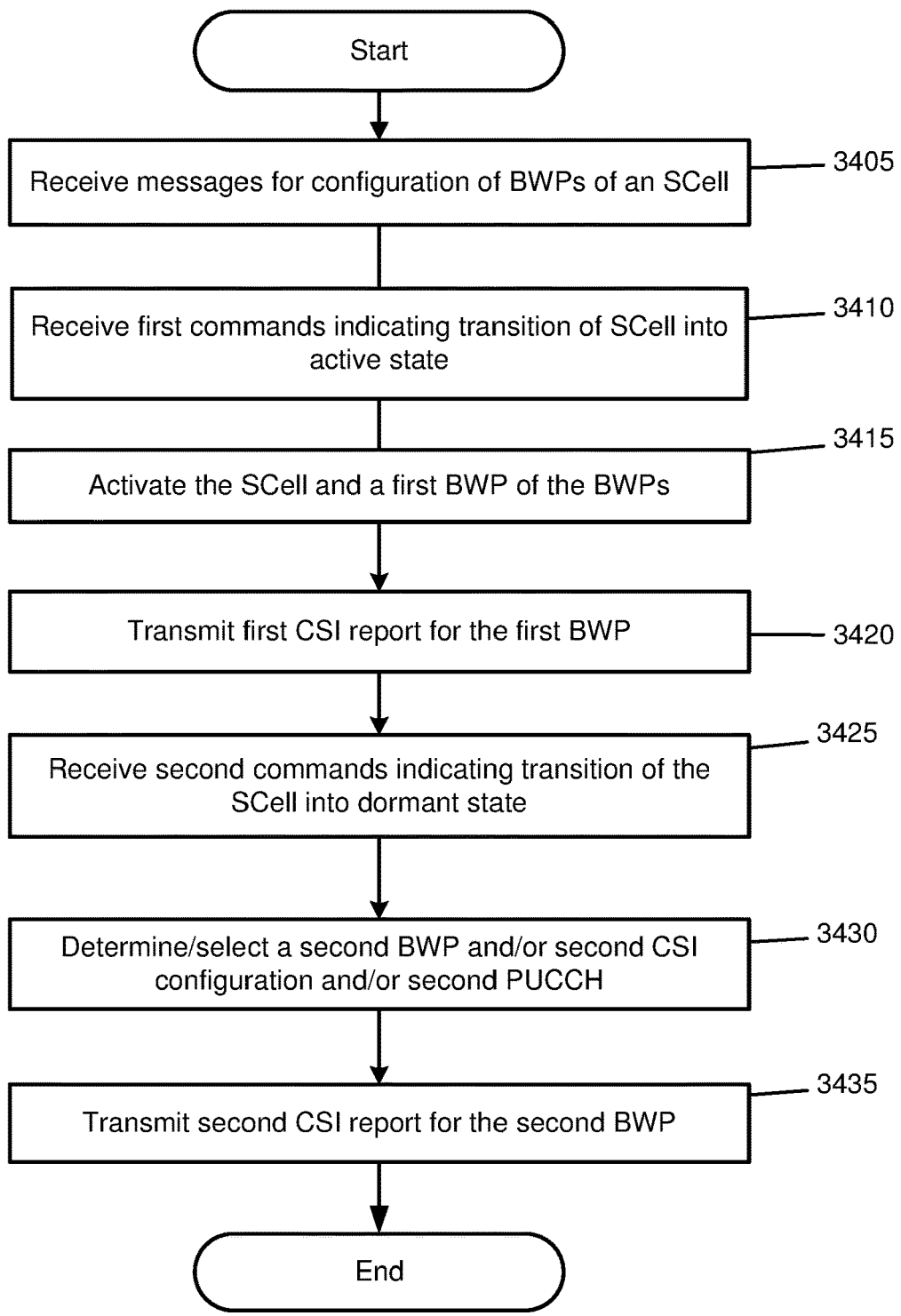
FIG. 34 shows an example for CSI reporting.

FIG. 34 shows an example for CSI reporting. At step 3405, a wireless device may receive, from a base station, one or more messages (e.g., configuration parameters), for configuration of one or more BWPs of an SCell. The one or more messages may comprise, for example, first CSI configurations and second CSI configurations of the BWPs of the SCell. At step 3410, the wireless device may receive, from a base station that may send, one or more first commands indicating setting (e.g., transition of) SCell to active state. The one or more first commands may be at least one of: one or more RRC messages, one or more MAC CEs, and/or one or more DCI. At step 3415, the wireless device may activate the SCell and a first BWP of the BWPs, for example, based on receiving the one or more first commands. At step 3420, the wireless device may send (e.g., transmit), to a base station that may receive, a first CSI report for the first BWP. The wireless device may use the first CSI configurations and/or a first PUCCH resource for transmission of the first CSI report. At step 3425, the wireless device may receive, from the base station that may send, one or more second commands (e.g., one or more RRC messages, one or more MAC CEs, and/or one or more DCIs) indicating setting (e.g., transition of) the SCell to a power saving state (e.g., dormant state). At step 3430, the wireless device may determine/select: a second BWP of the BWPs, a second CSI configuration, and/or a second PUCCH resource, based on one or more criteria. At step 3435, the wireless device may send (e.g., transmit), to the base station that may receive, a second CSI report for the second BWP. The wireless device may use the second CSI configurations and/or a second PUCCH resource for transmission of the second CSI report. The second BWP may be the same as the first BWP.

Figure 35:
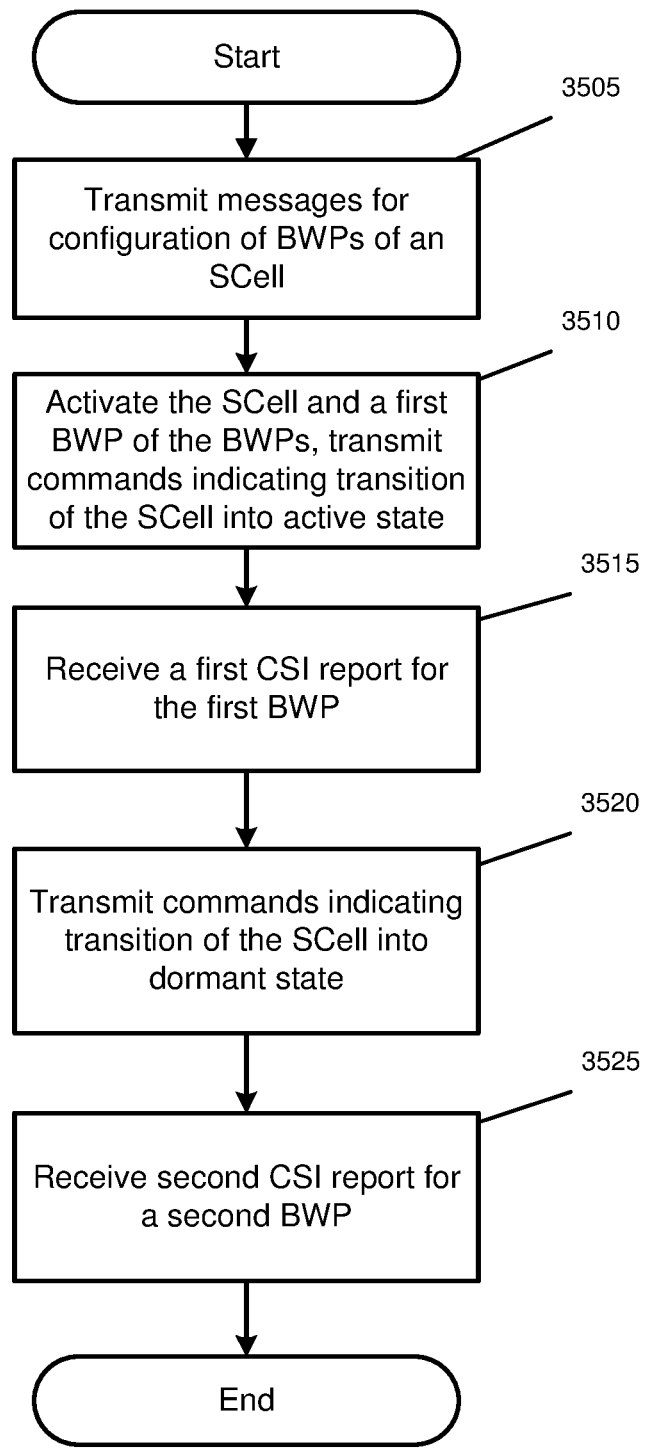
FIG. 35 shows an example for CSI reporting.

FIG. 35 shows an example for CSI reporting. At step 3505, a base station may send (e.g., transmit), to a wireless device, one or more messages (e.g., configuration parameters), for configuration of one or more BWPs of an SCell. The one or more messages may comprise, for example, first CSI configurations and second CSI configurations of the BWPs of the SCell. At step 3510, the base station may activate the SCell and a first BWP of the one or BWPs of the SCell. The base station may send (e.g., transmit) one or more first commands indicating setting (e.g., transition of) SCell to an active state. The one or more first commands may be at least one of: one or more RRC messages, one or more MAC CEs, and/or one or more DCI. At step 3515, the base station may receive a first CSI report for the first BWP. The first CSI report may be sent (e.g., transmitted) by the wireless device using the first CSI configurations and/or a first PUCCH resource. At step 3520, the base station may send (e.g., transmit), to the wireless device that may receive, second one or more commands (e.g., one or more RRC messages, one or more MAC CEs, and/or one or more DCI) indicating setting (e.g., transition) of the SCell to a power saving state (e.g., dormant state). At step 3525, the base station may receive a second CSI report for a second BWP. The second CSI report may use the second CSI configurations and/or a second PUCCH resource for transmission of the second CSI report. The second BWP may be the same as the first BWP.

Figure 36A:
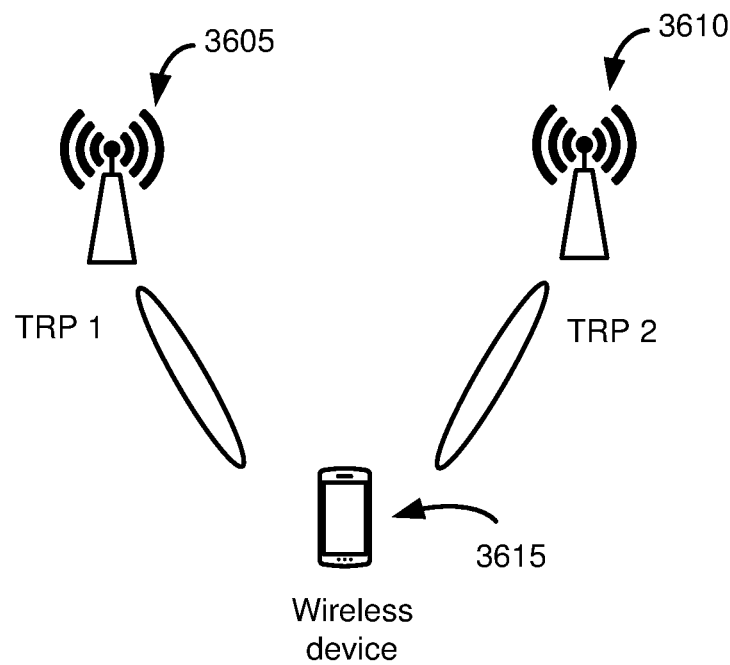
FIG. 36A shows an example of multiple transmission and reception points (TRPs).

FIG. 36A shows an example of multiple TRPs. A base station may send (e.g., transmit), to a wireless device that may receive, one or more messages comprising parameters indicating configuration parameters of one or more transmission reception points (TRPs). Each of the one or more TRPs may be associated with at least one of: a MAC entity and/or one or more physical functions. Each of the one or more TRPs may be, for example, indicated by and/or associated with at least one of: one or more reference signals (e.g., SSBs, CSI-RSs, and/or DMRSs), one or more PDCCH CORESETs, and/or one or more radio network temporary identifiers (e.g., RNTIs). The one or more TRPs may be associated with a cell. The cell may comprise the one or more TRPs. The one or more TRPs may be associated with different cells. The one or more TRPs may be identified by a single identifier (e.g., a Cell ID). Each of the one or more TRPs may be identified by a TRP-specific identifier (e.g., a Cell ID, a Cell-TRP ID, or a TRP ID). The one or more TRPs may be grouped to at least one TRP groups, each of the at least one TRP groups being associated with a TRP group identifier.

The base station may send (e.g., transmit), to a wireless device, one or more first commands indicating activation of at least a first TRP of the one or more TRPs (or a first group of TRPs). The wireless device may (e.g., based on receiving the one or more first commands): monitor a PDCCH on an active BWP of the at least first TRP, send (e.g., transmit) CSI report and/or RRM report for the active BWP of the at least first TRP, send (e.g., transmit) SRS (e.g., if configured) on the at least first TRP, send (e.g., transmit) on an UL-SCH of the at least first TRP, and/or send (e.g., transmit) PUCCH on the at least first TRP. The one or more first commands may be, for example, at least one of: one or more first RRC messages, one or more first MAC CEs, and/or one or more first DCI.

The base station may send (e.g., transmit), to a wireless device, one or more second commands indicating transition of at least a second TRP of the one or more TRPs (or a second group of TRPs) to a power saving state (e.g., dormant state). A first TRP timer may be associated with the at least second TRP. The first TRP timer may expire based on not receiving DCI via a PDCCH, and/or based on not receiving a MAC PDU. The wireless device may (e.g., based on receiving the one or more second commands and/or an expiration of the first TRP timer): not monitor a PDCCH on the at least second TRP, send (e.g., transmit) CSI report and/or RRM report for a first BWP associated with the at least second TRP, not transmit SRS (if configured) on the at least second TRP, not transmit on an UL-SCH of the at least second TRP, not transmit PUCCH on the at least one second TRP, clear one or more configured downlink assignment and/or one or more configured uplink grant (e.g., Type 2)

associated with the at least second TRP, and/or suspend one or more configured uplink grant (e.g., Type 1) associated with the at least second TRP. The one or more second commands may be, for example, at least one of: one or more second RRC messages, one or more second MAC CEs, and/or one or more second DCI. The first BWP associated with the at least second TRP may be a default BWP, an initial active BWP, and/or a first active BWP configured for the at least second TRP.

The base station may send (e.g., transmit), to a wireless device that may receive, one or more third commands indicating deactivation of at least a third of the one or more TRPs (or a third group of TRPs). A second TRP timer may be associated with the at least third TRP. The second TRP timer may expire, for example, based on not receiving DCI via a PDCCH, and/or based on not receiving a MAC PDU. The wireless device may (e.g., based on not receiving the one or more third commands and/or an expiration of the second TRP timer): not monitor a PDCCH on the at least third TRP, not transmit CSI report and/or RRM report for the at least third TRP, not transmit SRS (if configured) on the at least third TRP, not transmit on an UL-SCH of the at least third TRP, not transmit PUCCH on the at least one third TRP, clear one or more configured downlink assignment and/or one or more configured uplink grant (e.g., Type 2) associated with the at least third TRP, and/or suspend one or more configured uplink grant (e.g., Type 1) associated with the at least third TRP. The one or more third commands may be at least one of: one or more third RRC messages, one or more third MAC CEs, and/or one or more third DCIs.

Figure 36B:
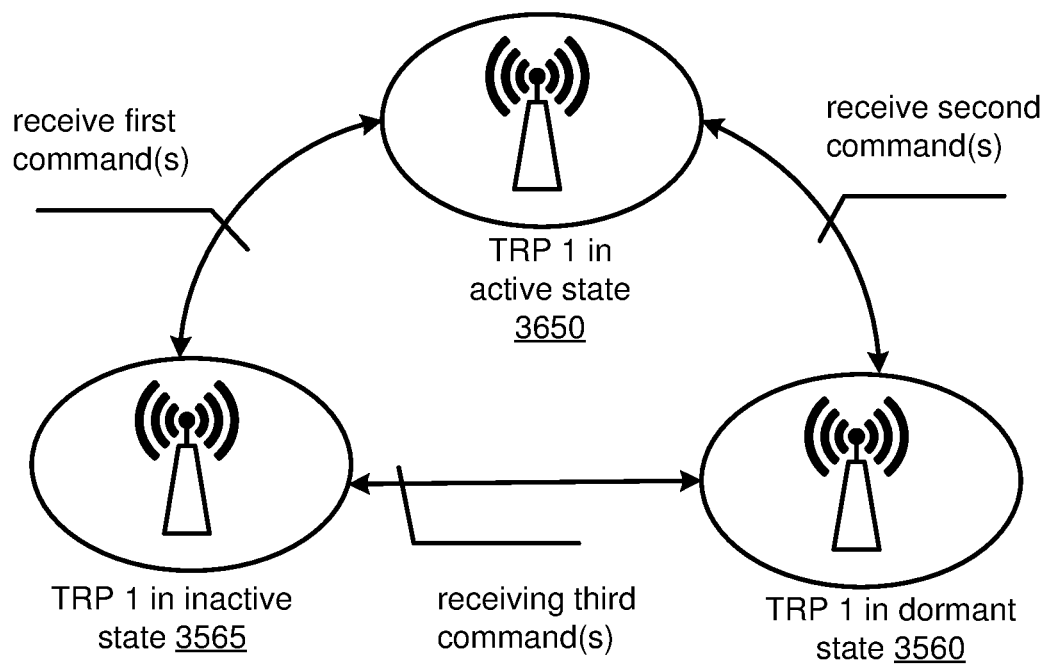
FIG. 36B shows an example of TRP state management.

FIG. 36B shows an example of TRP state management. A wireless device may execute the TRP state management, for example, based on reception of one or more first command(s), second command(s), and/or third command(s). The wireless device may transition a TRP (e.g., TRP 1) to active state 3650 (or inactive state 3665), from inactive state 3665 (or active state 3650), based on reception of first command(s). The wireless device may transition the TRP to active state 3650 (or dormant state 3660), from dormant state 3660 (or active state 3650), based on reception of second command(s). The wireless device may transition the TRP to inactive state 3665 (or dormant state 3660), from dormant state 3660 (or inactive state 3665), based on reception of third command(s).

Figure 37:
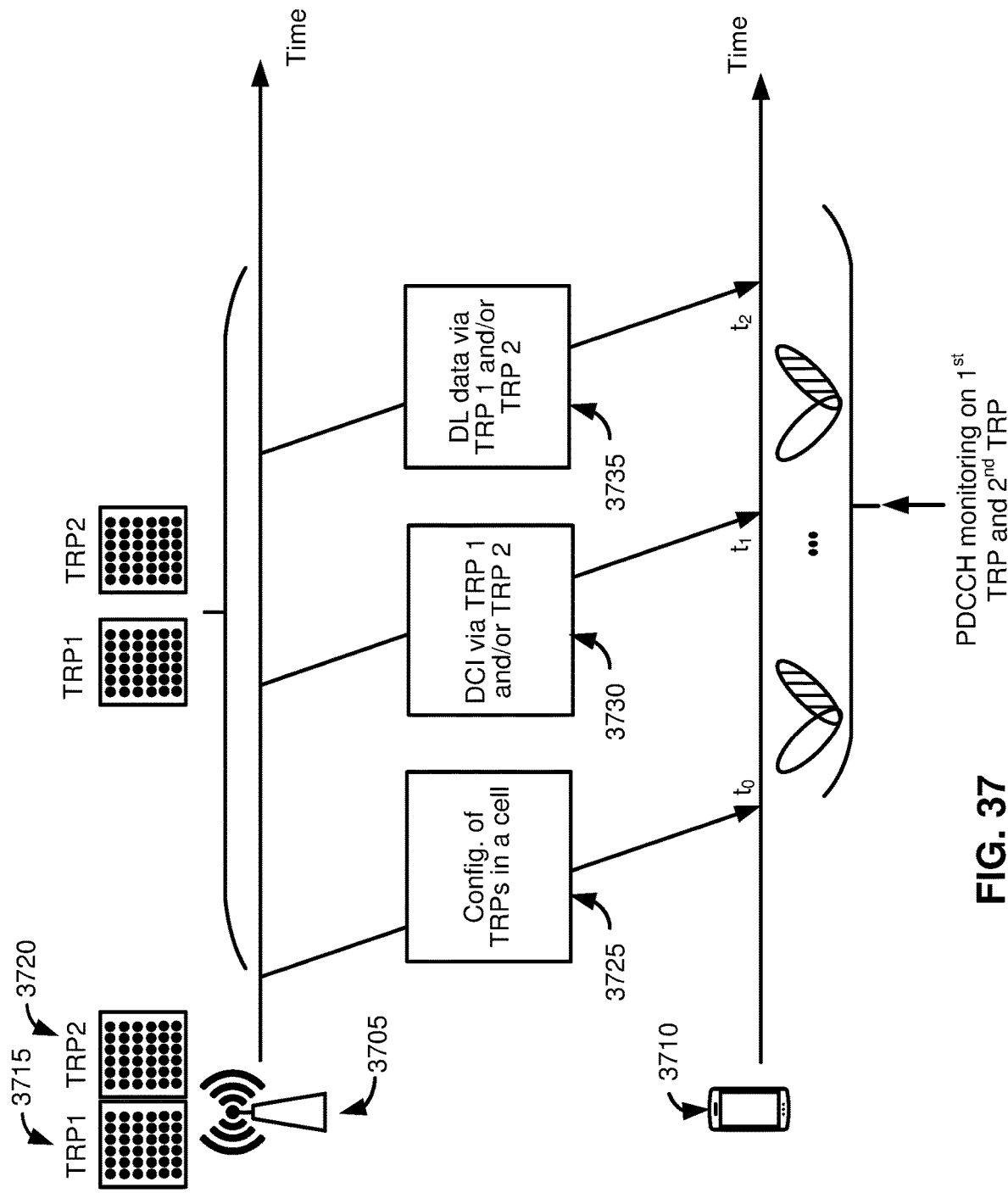
FIG. 37 shows an example of a TRP configuration.

FIG. 37 shows an example of a TRP configuration. A base station 3705 may send (e.g., transmit), to a wireless device 3710 that may receive, configuration parameters (e.g., RRC messages), corresponding to multiple TRPs. The multiple TRPs may comprise at least a first TRP (e.g., TRP 1 3715) and a second TRP (e.g., TRP 2 3720). The wireless device 3710 may receive the configuration parameters 3725 at or after time $t_0$. The base station 3705 may send (e.g., transmit), to the wireless device 3710, a command indicating activation of at least the TRP 1 3715. The wireless device 3710 may (e.g., based on receiving the command) monitor a PDCCH on an active BWP of the TRP 1 3715 and monitor a PDCCH on an active BWP of the TRP 37 3720. At or after time $t_1$, the wireless device 3710 may receive DCI 3730, from the base station 3705, via the TRP 1 3715 and/or via TRP 2 3720. At or after time $t_3$, the wireless device 3710 may receive DL data 3735, from the base station 3705, via the TRP 1 3715 and/or via the TRP 2 3720.

The wireless station 3710 may continue to monitor the PDCCHs in both the TRP 1 3715 and the TRP 2 3720, for example, irrespective of amount of data to be transmitted by the base station 3705 and/or a number of TRPs being used by the based station 3705. Monitoring PDCCHs in both the TRP 1 3715 and the TRP 2 3720 may result in increased power consumption at the wireless device 3710, for example, if the amount of data to be transmitted by the base station 3705 is low and/or if the base station 3705 only requires use of a single TRP (e.g., TRP 1 3715 or TRP 2 3720).

Figure 38:
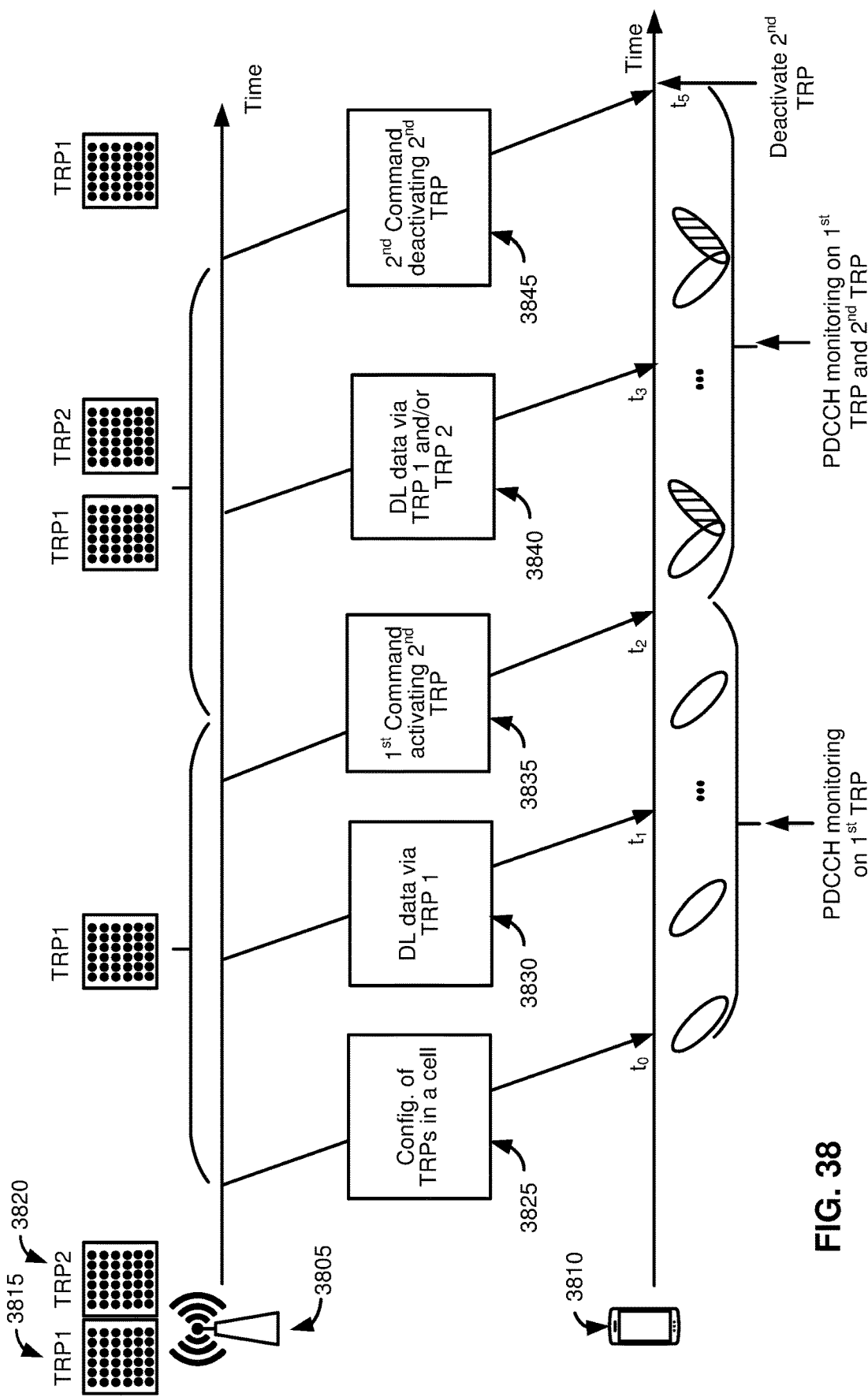
FIG. 38 shows an example for TRP switching.

FIG. 38 shows an example for TRP switching. A base station 3805 may send (e.g., transmit), to a wireless device 3810, configuration parameters 3825 (e.g., RRC messages), corresponding to multiple TRPs. The multiple TRPs may comprise at least a first TRP (e.g., TRP 1 3815) and a second TRP (e.g., TRP 2 3820). The wireless device 3810 may receive the configuration parameters 3825 at or after time $t_0$. The base station 3805 may send (e.g., transmit), to the wireless device 3810, a command indicating activation of at least the TRP 1 3815. The wireless device 3810 may (e.g., based on receiving the command) monitor a PDCCH on an active BWP of the TRP 1 3815. At or after time $t_1$, the wireless device 3810 may receive DL data 3830, from the base station 3805, via the TRP 1 3815.

At or after time $t_2$, the wireless device 3810 may receive a first command 3835 indicating activation of at least the TRP 2 3820. The wireless device 3810 may (e.g., based on receiving the first command 3835) start monitoring PDCCH on an active BWP of the TRP 2 3820. The wireless device 3810 may, for example, monitor the PDCCH on the active BWP of the TRP 2 3820 and continue to monitor the PDDCH on the active BWP of the TRP 1 3815. At or after time $t_3$, the wireless device 3810 may receive DL data 3840, from the base station 3805, via the TRP 1 3815 and/or via the TRP 2 3820.

At or after time $t_4$, the wireless device 3810 may receive a second command 3845 indicating deactivation of at least the TRP 2 3820. The wireless device 3810 may (e.g., based on receiving the second command 3835) stop monitoring the PDCCH on the TRP 2 3820. The wireless device 3810 may, for example, stop monitoring the PDDCH on the TRP 2 3820 but continue monitoring PDCCH on the active BWP of the TRP 1 3815. Alternatively, the second command 3835 may indicating deactivation of at least the TRP 1 3815.

A base station and/or wireless device may activate and/or deactive TRPs based on an amount of data to be transmitted to a wireless device and/or received from the wireless device. A first number of TRP(s) may be used, for example, if the wireless device is transmitting/receiving a smaller amount of data. A second number of TRPs may be used, for example, if the wireless device is transmitting/receiving larger amount of data to/from the wireless device. The first number of TRPs may be smaller than the second number of TRPs. Flexible activation and/or deactivation of TRPs may improve power consumption at a wireless device if, for example, a large number of TRPs are not required for transmission/reception of data to/from the wireless device.

A base station may transmit, to a wireless device, one or more messages comprising configuration parameters of a cell. The configuration parameters may indicate, for example: a first CSI reporting configuration for the cell in a power saving state (e.g., dormant state), second CSI reporting configurations for the cell in an active state, and/or one or more BWPs. The configuration parameters may indicate, for example: a first RRM configuration for the cell in a power saving state (e.g., dormant state), and/or a second RRM configuration for the cell in an active state.

The base station may send (e.g., transmit), to the wireless device, one or more first commands indicating transition of the cell to dormant state. The wireless device may send (e.g., transmit) a first CSI report for a first BWP of the one or more BWPs of the cell, based on a reception of the one or more first commands. The first CSI report may be based on, for example, the first CSI reporting configuration. The wireless device may send (e.g., transmit) a first RRM report for a first BWP of the one or more BWPs of the cell, for example, based on the reception of the one or more first commands. The first RRM report may be based on the first RRM configuration.

The base station may send (e.g., transmit) one or more second commands indicating activation of the cell. The wireless device may send (e.g., transmit) at least one second CSI reports for a second BWP of the one or more BWPs of the cell, for example, based on a reception of the one or more second commands. The at least one second CSI report may be, for example, based on the second CSI reporting configurations.

The first CSI report may be a periodic CSI report, a semi-persistent CSI report, and/or an aperiodic CSI report. The first BWP may be indicated, for example, by first parameters of the first CSI reporting configuration. The first BWP may be the same as the second BWP. The one or more first commands may be at least one of: one or more first RRC messages, one or more first MAC CEs, and/or one or more first DCI. The one or more second commands may be, for example, at least one of: one or more second RRC messages, one or more second MAC CEs, and/or one or more second DCI.

A base station may send (e.g., transmit), to a wireless device, one or more messages comprising configuration parameters of a cell. The cell may comprise one or more BWPs. The wireless device may activate the cell and/or a BWP of the one or more BWPs of the cell, for example, based on receiving one or more first commands. The wireless device may transition a BWP to a power saving state (e.g., dormant state), for example, based on receiving one or more second commands. The wireless device may send (e.g., transmit) at least one CSI report for the BWP, for example, based on transitioning the BWP to dormant state.

A base station may send (e.g., transmit), to a wireless device, one or more messages comprising configuration parameters of a cell. The cell may comprise one or more BWPs. The wireless device may receive one or more data packets via a first BWP of the one or more BWPs, for example, based on the cell being in active state. The base station may transmit one or more commands indicating setting (e.g., transition) of the cell to dormant state, to the wireless device. The wireless device may (e.g., based on the one or more commands): setting (e.g., transition) of the cell to a power saving state (e.g., dormant state), deactivate the first BWP, and/or transmit at least one CSI report for a second BWP of the one or more BWPs. The second BWP may be, for example, at least one of: a default BWP, an initial active BWP, and/or a first active BWP. The one or more commands may be, for example, at least one of: one or more RRC messages, one or more MAC CEs, and/or one or more DCI.

A wireless device may receive, from a base station that may send, configuration parameters of a cell. The configuration parameters may indicate one or more first control resource sets and one or more second control resource sets. The wireless device may receive, from the base station that may send, a first command indicating an activation of the cell. The wireless device may monitor (e.g., during an active state of the cell) first control channel candidates of the one or more first control resource sets of the cell. The wireless device may receive, from the base station that may send, a command (e.g., a second command) indicating a setting (e.g., transition of) the cell to a power saving state. Based on the command, the wireless device may stop the monitoring of the one or more first control resource sets, and/or start monitoring, during the power saving state, second control channel candidates of the one or more second control resource sets. Based on the command, the wireless device may switch the monitoring from the first control channel candidates to second control channel candidates of the one or more second control resource sets of the cell. The switching may comprise the wireless device stopping the monitoring of the one or more first control resource sets, and/or starting monitoring, during the power saving state, second control channel candidates of the one or more second control resource sets. The wireless device may receive, from the base station that may send, during the monitoring the second control channel candidates, downlink control information (DCI). The wireless device may receive the DCI via the one or more second control resource sets. During the power saving state, the wireless device may perform at least one of: stop transmitting via a physical uplink shared channel of the cell; stop transmitting via a physical random access channel of the cell; and/or stop receiving downlink transport blocks via the cell. During the power saving state, the wireless device may perform at least one of: transmit one or more sounding reference signals; and/or transmit one or more channel state information reports for the cell. During the active state of the cell, the wireless device may not monitor the second control channel candidates of the one or more second control resource sets of the cell. During the active state of the cell, the wireless device may monitor the second control channel candidates of the one or more second control resource sets of the cell. Based on the DCI indicating setting (e.g., a transition of) the cell from the power saving state to the active state, the wireless device may: stop the monitoring of the one or more second control resource sets; and/or restart the monitoring of the one or more first control resource sets. Based on the command, the wireless device may set (e.g., transition) a bandwidth part (BWP) of a plurality of BWPs of the cell to the power saving state. The may BWP comprise at least one of: a default BWP indicated by a radio resource control message; an active BWP; and/or an initial active BWP indicated by the radio resource control message. The monitoring the first control channel candidates of the one or more first control resource sets may be associated with an active BWP of the plurality of BWPs in the cell. The wireless device may receive, prior to monitoring the first control channel candidates of the one or more first control resource sets of the first cell, a first command indicating an activation of the cell. The command indicating a setting (e.g., transition) of the cell to the power saving state may comprise at least one of: a radio resource control message; a medium access control (MAC) control element (CE); and/or downlink control information. The configuration parameters may indicate, for at least one of the one or more first control resource sets or the one or more second control resource sets, at least one of: a control resource set identification; a number of symbols; a set of resource blocks; and/or a control channel element-to-resource element group mapping indicator. The cell may comprise at least one of: a primary cell; and/or a secondary cell. The DCI may indicate uplink radio resource allocation of the cell. The wireless device may receive, from the base station that may transmit, a downlink transport block. The DCI may indicate downlink radio resource allocation of the cell. The cell may comprise a plurality of bandwidth parts. A computing device may comprise one or more processors; and/or memory storing instructions that, when executed, cause the computing device to perform a method of any of the above features. A system may comprise a first computing device configured to perform the method of any one of the above features; and a second computing device configured to send the DCI. A computer-readable medium (e.g., non-transitory computer-readable medium) may store instructions that, when executed, may cause the performance of the method of any one of the above features.

A base station may send, to a wireless device that may receive, configuration parameters of a cell. The configuration parameters may indicate one or more first control resource sets and one or more second control resource sets. The base station may send, to the wireless device that may receive, a first command indicating an activation of the cell. The base station may send, to the wireless device that may receive, a second command indicating setting (e.g., a transition of) the cell to a power saving state. The setting (e.g., transition) may comprise switching from monitoring first control channel candidates of the one or more first control resource sets to monitoring second control channel candidates of the one or more second control resource sets of the cell. The base station may send (e.g., to the wireless device that may receive) downlink control information (DCI). The base station may send the DCI after the switching. The base station may receive, from the wireless device that may send, based on the DCI, an uplink transport block. The DCI may indicate uplink radio resource allocation of the cell. The base station may send, to the wireless device that may receive, a downlink transport block. The DCI may indicate downlink radio resource allocation of the cell. The second command may comprise at least one of: a radio resource control message; a medium access control (MAC) control element (CE); and/or downlink control information. The configuration parameters may indicate, for at least one of the one or more first control resource sets or the one or more second control resource sets, at least one of: a control resource set identification; a number of symbols; a set of resource blocks; and/or a control channel element-to-resource element group mapping indicator. The cell may comprise at least one of: a primary cell; and/or a secondary cell. A computing device may comprise one or more processors; and/or memory storing instructions that, when executed, cause the computing device to perform the method of any one of the above features. A system may comprise: a first computing device configured to perform the method of any one of the above features; and a second computing device configured to send the uplink transport block. A computer-readable medium (e.g., non-transitory computer-readable medium) may store instructions that, when executed, cause the performance of the method of any one of the above features.

A wireless device may activating a first bandwidth part of a cell. The wireless device may send (e.g., transmit), to a base station that may receive, a first channel state information (CSI) report for the first bandwidth part, wherein the cell is in active state. The wireless device may receive, from the base station, a command indicating transitioning the cell from the active state to a dormant state. The wireless device may transition, based on the command, the first bandwidth part to a dormant state. The wireless device may send (e.g., transmit), based on or in response to the transitioning, a second CSI report for the first bandwidth part in the dormant state.

A wireless device may activate a cell to active state. The wireless device may send (e.g., transmit), to a base station that may receive, a periodic channel state information (CSI) report for the cell and a semi-persistent CSI report for the cell. The wireless device may receive, from the base station that may send (e.g., transmit), a command indicating transitioning the cell from the active state to a dormant state. The wireless device may set (e.g., transition), based on or in response to the command, the cell to the dormant state. Based on or in response to the transitioning, the wireless device may: send (e.g., transmit) the periodic CSI report for the cell; and/or suspend sending (e.g., transmitting) the semi-persistent CSI report for the cell.

A wireless device may receive, from a base station that may send (e.g., transmit), one or more messages comprising configuration parameters of a cell. The configuration parameters may indicate first plurality of uplink control channel resources and second plurality of uplink control channel resources. The wireless device may send (e.g., transmit) first channel state information (CSI) reports, for a bandwidth part (BWP) of the cell, via at least one of the first plurality of uplink control channel resources, wherein the cell is in active state. The wireless device may receive, from the base station, a command indicating transitioning the cell to a dormant state. The wireless device may transition, based on the command, the BWP into the dormant state. The wireless device may send (e.g., transmit), based on or in response to the transitioning, second CSI reports, for the BWP, via at least one of the second plurality of uplink control channel resources.

A wireless device may receive, from a base station that may send (e.g., transmit), one or more messages comprising configuration parameters of a plurality of bandwidth parts (BWPs) of the cell. The wireless device may receive, from the base station, a command indicating transitioning the cell from a dormant state into an active state. Based on the command, the wireless device may transition a first BWP of the plurality of BWPs into the active state and/or maintain a second BWP of the plurality of BWPs into the dormant state. The wireless device may monitor, based on the first BWP being in the active state, downlink control channel candidates on the first BWP. The wireless device may send (e.g., transmit), based on the second BWP being in the dormant state, channel state information reports for the second BWP.

A wireless device may receive, from a base station that may send (e.g., transmit), one or more messages comprising configuration parameters of a first transmission and reception point (TRP) of a cell and a second TRP of the cell. The wireless device may monitor first downlink control channel candidates on the first TRP of the cell. The wireless device may receive, via the first TRP of the cell, a first downlink control information indicating activating the second TRP. The wireless device may monitor, based on the first downlink control information, second downlink control channel candidates on the second TRP of the cell. The wireless device may receive, during the monitoring the second downlink control channel candidates, a second downlink control information via the second TRP. The wireless device may receive at least one downlink transport block based on the second downlink control information indicating downlink resource resources of the cell.

A wireless device may receive, from a base station that may send (e.g., transmit), one or more messages comprising configuration parameters of a first transmission and reception point (TRP) of a cell and a second TRP of the cell. The wireless device may monitor a first downlink control channel of the first TRP and a second downlink control channel on the second TRP. The wireless device may receive (e.g., from the base station) a medium access control control element indicating deactivation of the first TRP. The wireless device may stop monitoring, based on the command, the first downlink control channel on the first TRP. The wireless device may receive (e.g., from the base station) second downlink control information in the second downlink control channel via the second TRP. The wireless device may receive (e.g., from the base station) at least one downlink transport block based on the second downlink control information.

A wireless device may monitor downlink control channel of a transmission reception point (TRP) on an active bandwidth part (BWP) of a cell, wherein the TRP is in active state. The wireless device may send (e.g., transmit), to a base station, first channel state information reports of the TRP for the active BWP. The wireless device may receive (e.g., from the base station) a first command indicating transitioning of the TRP from the active state to a dormant state. The wireless device may transition the TRP from the active state into the dormant state. Based on or in response to the transitioning, the wireless device may: stop the monitoring; and/or send (e.g., transmit) second channel state information reports of the TRP for the active BWP if the TRP is in the dormant state.

A computing device may comprise one or more processors; and/or memory storing instructions that, when executed, cause the computing device to perform the method of any one of the above features. A system may comprise: a first computing device configured to perform the method of any one of the above features; and a second computing device configured to send or receive an uplink transport block. A computer-readable medium (e.g., non-transitory computer-readable medium) may store instructions that, when executed, cause the performance of the method of any one of the above features.

Figure 39:
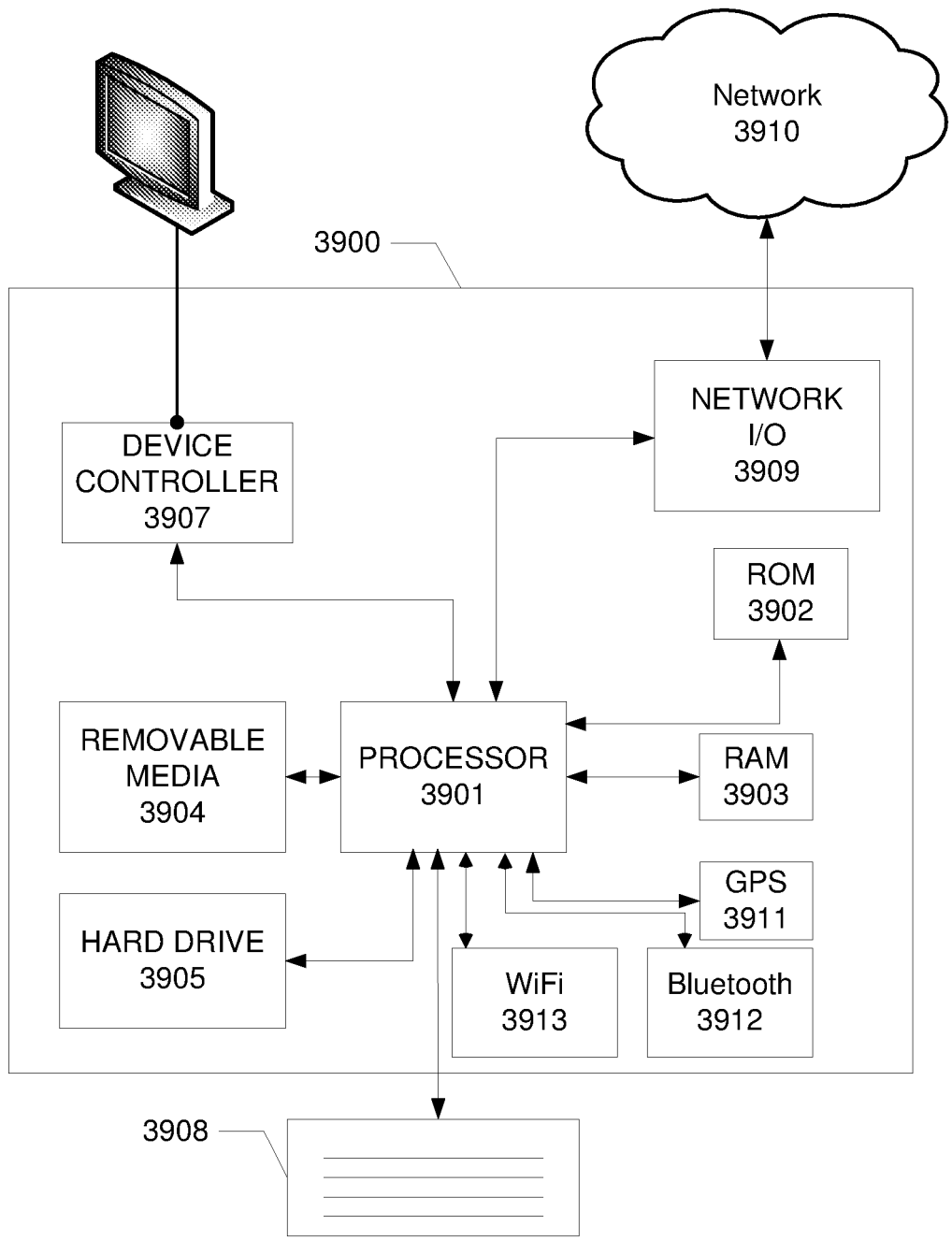
FIG. 39 shows example elements of a computing device that may be used to implement any of the various devices described herein.

FIG. 39 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3900 may include one or more processors 3901, which may execute instructions stored in the random access memory (RAM) 4103, the removable media 3904 (such as a Universal Serial Bus (USB) drive, compact disk (CD) or digital versatile disk (DVD), or floppy disk drive), or any other desired storage medium. Instructions may also be stored in an attached (or internal) hard drive 3905. The computing device 3900 may also include a security processor (not shown), which may execute instructions of one or more computer programs to monitor the processes executing on the processor 3901 and any process that requests access to any hardware and/or software components of the computing device 3900 (e.g., ROM 3902, RAM 3903, the removable media 3904, the hard drive 3905, the device controller 3907, a network interface 3909, a GPS 3911, a Bluetooth interface 3912, a WiFi interface 3913, etc.). The computing device 3900 may include one or more output devices, such as the display 3906 (e.g., a screen, a display device, a monitor, a television, etc.), and may include one or more output device controllers 3907, such as a video processor. There may also be one or more user input devices 3908, such as a remote control, keyboard, mouse, touch screen, microphone, etc. The computing device 3900 may also include one or more network interfaces, such as a network interface 3909, which may be a wired interface, a wireless interface, or a combination of the two. The network interface 3909 may provide an interface for the computing device 3900 to communicate with a network 3910 (e.g., a RAN, or any other network). The network interface 3909 may include a modem (e.g., a cable modem), and the external network 3910 may include communication links, an external network, an in-home network, a provider's wireless, coaxial, fiber, or hybrid fiber/coaxial distribution system (e.g., a DOCSIS network), or any other desired network. Additionally, the computing device 3900 may include a location-detecting device, such as a global positioning system (GPS) microprocessor 3911, which may be configured to receive and process global positioning signals and determine, with possible assistance from an external server and antenna, a geographic position of the computing device 3900.

The example in FIG. 39 may be a hardware configuration, although the components shown may be implemented as software as well. Modifications may be made to add, remove, combine, divide, etc. components of the computing device 3900 as desired. Additionally, the components may be implemented using basic computing devices and components, and the same components (e.g., processor 3901, ROM storage 3902, display 3906, etc.) may be used to implement any of the other computing devices and components described herein. For example, the various components described herein may be implemented using computing devices having components such as a processor executing computer-executable instructions stored on a computer-readable medium, as shown in FIG. 39. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, $C_i$ C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    receiving, by a wireless device, configuration parameters indicating frequency resources, of a bandwidth part (BWP) of a cell, comprising:
        first frequency resources associated with one or more first search space sets; and
        second frequency resources, different from the first frequency resources, associated with one or more second search space sets;
    receiving, via the one or more first search space sets of the BWP, one or more downlink signals;
    receiving first downlink control information (DCI), associated with a plurality of wireless devices, indicating switching from the one or more first search space sets of the BWP to the one or more second search space sets of the BWP;
    based on the first DCI, switching, for downlink reception, from a first resource associated with the one or more first search space sets of the BWP to a second resource associated with the one or more second search space sets of the BWP, wherein, for downlink reception, the one or more second search space sets of the BWP are activated and the one or more first search space sets of the BWP are deactivated; and
    receiving, based on the switching and via the one or more second search space sets of the BWP, second DCI.

2. The method of claim 1, wherein, during a power saving state, at least one of:
    uplink data is not transmitted via a physical uplink shared channel of the cell;
    a preamble is not transmitted via a physical random access channel of the cell; or
    downlink transport blocks are not received via the cell.

3. The method of claim 1, further comprising performing, during a power saving state, at least one of:
    transmitting one or more sounding reference signals; or
    transmitting one or more channel state information reports for the cell.

4. The method of claim 1, wherein one or more downlink signals via the one or more second search space sets of the BWP are not monitored during the receiving of the one or more downlink signals via the one or more first search space sets of the BWP.

5. The method of claim 1, further comprising:
    based on the second DCI, switching, for downlink reception, from the second resource associated with the one or more second search space sets of the BWP to the first resource associated with the one or more first search space sets of the BWP; and
    receiving, based on the switching from the second resource and via the one or more first search space sets of the BWP, third DCI.

6. The method of claim 1, further comprising:
based on the first DCI, setting the BWP of the cell to a power saving state, wherein the BWP comprises at least one of:
a default BWP indicated by a radio resource control message;
an active BWP; or
an initial active BWP indicated by the radio resource control message.

7. The method of claim 6, wherein the receiving the one or more downlink signals comprises receiving the one or more downlink signals via the one or more first search space sets of the BWP during an active state of the BWP.

8. The method of claim 1, wherein the first DCI further comprises a slot format indicator indicating a slot format.

9. The method of claim 1, wherein the switching from the first resource associated with the one or more first search space sets of the BWP to the second resource associated with the one or more second search space sets of the BWP comprises:
stopping monitoring first control channel candidates via the one or more first search space sets of the BWP; and
starting monitoring second control channel candidates via the one or more second search space sets of the BWP.

10. A method comprising:
receiving, by a wireless device, configuration parameters indicating frequency resources, of a bandwidth part (BWP) of a cell, comprising:
first frequency resources associated with one or more first search space sets; and
second frequency resources, different from the first frequency resources, associated with one or more second search space sets;
receiving a first command indicating an activation of the cell;
receiving, via the one or more first search space sets of the BWP, one or more downlink signals;
receiving first downlink control information (DCI), associated with a plurality of wireless devices, indicating switching from the one or more first search space sets of the BWP to the one or more second search space sets of the BWP;
based on the first DCI, switching, for downlink reception, from a first resource associated with the one or more first search space sets of the BWP to a second resource associated with the one or more second search space sets of the BWP, wherein, for downlink reception, the one or more second search space sets of the BWP are activated and the one or more first search space sets of the BWP are deactivated; and
receiving, via the one or more second search space sets of the BWP and after the switching, second DCI.

11. The method of claim 10, wherein, during a power saving state, at least one of:
uplink data is not transmitted via a physical uplink shared channel of the cell;
a preamble is not transmitted via a physical random access channel of the cell; or
downlink transport blocks are not transmitted via the cell.

12. The method of claim 10, further comprising performing, during a power saving state, at least one of:
transmitting one or more sounding reference signals; or
transmitting one or more channel state information reports for the cell.

13. The method of claim 10, wherein one or more downlink signals via the one or more second search space sets of the BWP are not monitored during the receiving of the one or more downlink signals via the one or more first search space sets of the BWP.

14. The method of claim 10, wherein the switching comprises:
stopping monitoring first control channel candidates via the one or more first search space sets of the BWP; and
starting monitoring second control channel candidates via the one or more second search space sets of the BWP.

15. The method of claim 10, wherein the first DCI further comprises a slot format indicator indicating a slot format.

16. A method comprising:
sending, by a base station, configuration parameters indicating frequency resources, of a bandwidth part (BWP) of a cell, comprising:
first frequency resources associated with one or more first search space sets; and
second frequency resources, different from the first frequency resources, associated with one or more second search space sets;
sending a first command indicating an activation of the cell;
sending at least one packet via at least one first downlink channel associated with the one or more first search space sets of the BWP;
sending first downlink control information (DCI), associated with a plurality of wireless devices, indicating switching from the one or more first search space sets of the BWP to the one or more second search space sets of the BWP, wherein, for downlink reception, the one or more second search space sets of the BWP are activated and the one or more first search space sets of the BWP are deactivated;
sending, after sending the first DCI, second DCI via at least one second downlink channel associated with the one or more second search space sets of the BWP; and
receiving, based on the second DCI, an uplink transmission associated with at least one wireless device of the plurality of wireless devices.

17. The method of claim 16, wherein the second DCI indicates uplink radio resource allocation of the cell.

18. The method of claim 16, further comprising sending a downlink transport block, wherein the second DCI indicates downlink radio resource allocation of the cell.

19. The method of claim 16, wherein the configuration parameters indicate, for the one or more first search space sets of the BWP and the one or more second search space sets of the BWP, at least one of:
a control resource set identification;
a number of symbols;
a set of resource blocks; or
a control channel element-to-resource element group mapping indicator.

20. The method of claim 16, wherein the cell comprises at least one of:
a primary cell; or
a secondary cell.

21. The method of claim 16, wherein the first DCI further comprises a slot format indicator indicating a slot format.

* * * * *